United States Patent
Challenger et al.

(10) Patent No.: US 6,256,712 B1
(45) Date of Patent: Jul. 3, 2001

(54) SCALEABLE METHOD FOR MAINTAINING AND MAKING CONSISTENT UPDATES TO CACHES

(75) Inventors: James Robert Harold Challenger, Garrison; Paul Michael Dantzig, Scarsdale; Arun K. Iyengar, Yorktown Heights; Gerald A. Spivak, Mohegan Lake, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/905,225

(22) Filed: Aug. 1, 1997

(51) Int. Cl.$^7$ .................................................. G06F 12/00

(52) U.S. Cl. .................... 711/141; 711/119; 707/103; 707/201

(58) Field of Search ......................... 711/118, 124, 711/133, 141, 119, 120; 395/200.43, 200.46, 200.47, 200.49, 683, 200.33; 707/10, 201, 203, 103, 202; 709/203, 213, 216, 217, 219, 303

(56) References Cited

U.S. PATENT DOCUMENTS

| | | | |
|---|---|---|---|
| 4,325,120 | 4/1982 | Colley et al. | 711/202 |
| 5,058,185 | 10/1991 | Morris et al. | 382/305 |
| 5,261,069 | * 11/1993 | Wilkinson et al. | 711/145 |
| 5,305,389 | 4/1994 | Palmer | 382/305 |
| 5,355,477 | 10/1994 | Strickland et al. | 707/8 |
| 5,357,618 | 10/1994 | Mirza et al. | 711/3 |
| 5,390,318 | 2/1995 | Ramakrishnan et al. | 711/158 |
| 5,396,614 | 3/1995 | Khalidi et al. | 711/118 |
| 5,542,078 | 7/1996 | Martel et al. | 707/101 |
| 5,544,345 | 8/1996 | Carpenter et al. | 711/150 |
| 5,546,579 | 8/1996 | Josten et al. | 707/8 |

(List continued on next page.)

OTHER PUBLICATIONS

Challenger et al., "A Publishing System for Efficiently Creating Dynamic Web Content", 19th Annual Joint Conference of the IEEE Computer and Communications Societies, vol. 2, pp. 844–853, Mar. 2000.*

IBM Technical Disclosure Bulletin, vol. 39, No. 06, Jun. 1996, "Serialization of Disk Configuration Record Updates" pp. 1–5.

*Primary Examiner*—Do Hyun Yoo
*Assistant Examiner*—Gary J. Portka
(74) *Attorney, Agent, or Firm*—F. Chau & Associates, LL

(57) ABSTRACT

A determination can be made of how changes to underlying data affect the value of objects. Examples of applications are: caching dynamic Web pages; client-server applications whereby a server sending objects (which are changing all the time) to multiple clients can track which versions are sent to which clients and how obsolete the versions are; and any situation where it is necessary to maintain and uniquely identify several versions of objects, update obsolete objects, quantitatively assess how different two versions of the same object are, and/or maintain consistency among a set of objects. A directed graph called an object dependence graph, may be used to represent the data dependencies between objects. Another aspect is constructing and maintaining objects to associate changes in remote data with cached objects. If data in a remote data source changes, database change notifications are used to "trigger" a dynamic rebuild of associated objects. Thus, obsolete objects can be dynamically replaced with fresh objects. The objects can be complex objects, such as dynamic Web pages or compound-complex objects, and the data can be underlying data in a database. The update can include either: storing a new version of the object in the cache; or deleting an object from the cache. Caches on multiple servers can also be synchronized with the data in a single common database. Updated information, whether new pages or delete orders, can be broadcast to a set of server nodes, permitting many systems to simultaneously benefit from the advantages of prefetching and providing a high degree of scaleability.

25 Claims, 47 Drawing Sheets

U.S. PATENT DOCUMENTS

| | | | |
|---|---|---|---|
| 5,560,007 | 9/1996 | Thai | 707/3 |
| 5,574,902 | 11/1996 | Josten et al. | 707/1 |
| 5,689,711 * | 11/1997 | Bardasz et al. | 395/701 |
| 5,787,470 * | 7/1998 | DeSimone et al. | 711/124 |
| 5,842,216 * | 11/1998 | Anderson et al. | 707/203 |
| 5,852,717 * | 12/1998 | Bhide et al. | 395/200.33 |
| 5,862,325 * | 1/1999 | Reed et al. | 709/201 |
| 5,881,229 * | 3/1999 | Singh et al. | 395/200.31 |

\* cited by examiner

| | |
|---|---|
| 410 — | cache_object (object_id, object, cache_id) |
| 415 — | lookup_object (object_id, cache_id) |
| 420 — | delete_object (object_id, cache_id) |
| 430 — | add_dependency (object_id, cache_id, record_id) |
| 440 — | delete_dependency (object_id, cache_id, record_id) |
| 450 — | invalidate_record (cache_id, record_id) |
| 460 — | show_dependent_objects (cache_id, record_id) |
| 470 — | show_associated_records (cache_id, object_id) |

Fig. 4

| | |
|---|---|
| 181 | create_node (obj_id, initial_version_num, thresh_weight) |
| 182 | add_dependency (source_object_id, target_object_id, dep_weight) |
| 183 | define_consistency_list (obj_id, list_of_objects) |
| 184 | delete_node (obj_id) |
| 185 | cache_latest_version (obj_id, cache) |
| 186 | copy_object (obj_id, to_cache_id, from_cache_id) |
| 187 | delete_object (obj_id, cache) |
| 188 | object_has_changed (obj_id) |
| 189 | objects_have_changed (list_of_objects) |
| 190 | create_sro_node (obj_id, initial_version_num, thresh_weight, relation_name, list_of_attribute_values) |
| 191 | create_mro_node (obj_id, initial_version_num, thresh_weight, list_of_attribute_conditions, rel_default_weight, rel_default_threshold) |
| 192 | compare_objects (obj_id, cache_id1, cache_id2) |
| 193 | update_cache (cache) |
| 194 | define_relation (relation_name, list_of_attributes) |
| 195 | record_has_changed (relation_name, list_of_attributes_values) |
| 196 | records_have_changed (relation_name, list_of_attribute_conditions) |

3026 ⟶ Send_Trigger (Message Parameters, ...)

Fig. 30E

| ID | Transaction Name | Transaction Source | Transaction Target | API Usage |
|---|---|---|---|---|
| 3020 | Trigger Event | External Data Sources 3050 And Databases 3010 | Trigger Monitor | Send_Trigger |
| 3021 | Forward Trigger Request | Trigger Monitor 3000 | Trigger Monitor | (No API Provided) |
| 3022 | Update Object Request | Trigger Monitor 3000 | Remote Cache | Cache_Object 410 |
| 3023 | Delete Local Object Request | Trigger Monitor 3000 | Local Cache | Delete_Object 420 |
| 3024 | Show Dependent Objects Request | Trigger Monitor 3000 | Local Cache | Show_Dependent_Object |
| 3025 | Delete Remote Object Request | Trigger Monitor 3000 | Remote Cache | Delete_Object 420 |

SCALEABLE METHOD FOR MAINTAINING AND MAKING CONSISTENT UPDATES TO CACHES

CROSS REFERENCE TO RELATED PATENT APPLICATIONS

The present invention is related to co-pending U.S. patent application Ser. No. 08/905,114, filed of even date herewith, entitled: "Determining How Changes to Underlying Data Affect Cached Objects," by Challenger et al. This co-pending application, which is commonly assigned with the present invention to the International Business Machines Corporation, Armonk, N.Y., is hereby incorporated herein by reference in its entirety.

BACKGROUND OF THE INVENTION

1. Field of the Invention

The present invention is related to an improved data processing system. Particular aspects relate to the World Wide Web, databases, and transaction processing systems. A more particular aspect is related to the caching of dynamic documents on the World Wide Web.

2. Related Art

Complex objects can be expensive and time-consuming to create. Caching complex objects reduces the cost of creation by minimizing the frequency of regeneration of identical objects. The cost of generating objects in the absence of caching is reflected to end-users in terms of: (a) increased response time; and (b) inconsistent response time.

Consider a Web-based server with a very high frequency of access, whose content contains a high ratio of dynamic to static pages. Assume further that the content of the dynamic pages change frequently. When a page becomes obsolete and is flushed from cache: the first user who requests that page will experience a cache-miss, causing regeneration of that page. Because the cost (and therefore, the physical wall-clock time) of creating that page is great, there may be a significant probability of several other requests for that same page arriving before it is replaced in cache. This can result in many simultaneous regenerations of the same page, and resultant wasted resources. A specific instance of this scenario is a sports server, for example, serving the Olympics. Results for the currently active sports are arriving at a high rate, causing the pages that reflect scores to change frequently; at the same time users are requesting those pages at a high rate to see the status of the event. Because the pages are being invalidated frequently, a significant number of requests cause the page to be regenerated. Thus there is a need for a system which maintains the validity of the page in one or more caches at all times, and automatically replaces it when the underlying data changes, thereby reducing system loading and significantly improving response time. The present invention addresses such a need.

Another problem is manifested on web servers where consistency of response time is critical. Once users have accessed a site, or a location within a site, keeping their attention may be of prime importance. For example, a Web-based mail-order catalog may want to encourage browsing; if the user gets bored waiting for pages he or she may well leave for other entertainment.

The present invention is of particular importance to proxy caches (see "Caching Proxies: Limitations and Potentials" by M. Abrams et. al., Fourth International World Wide Web Conference Proceedings, Dec. 1996, pp. 119–133; and "World-Wide Web Proxies", A. Luotonen and K. Altis, in Computer Networks and ISDN Systems, vol. 27 (1994) pp. 147–154). One of the problems with most proxy caches on the Web today is that there is no way to determine if pages in the caches are obsolete. For this reason, most proxy caches do not store dynamic pages. The present invention solves this problem and provides a powerful method for maintaining current copies of both dynamic and static data in multiple caches distributed across a network.

Thus, there is a need for a method and system for automatically detecting changes in the underlying data and efficiently replacing objects dependent on that data in one or more caches as the primary mechanism for cache maintenance. The present invention addresses such a need. Existing cache invalidation schemes typically involve some variant of (a) aging, in which items which have not been referenced within some period of time are removed from cache, and (b) forceful deletion of items known to be obsolete.

A considerable amount of work has been done in the area of cache coherence for shared-memory multiprocessors (see "Computer Architecture: A Quantitative Approach" by J. Hennessy and D. Patterson, Morgan Kaufmann Publishers, Inc., 1996). In shared-memory multiprocessors, no caches are allowed to contain obsolete values. For example, suppose the variable x=99 is stored in caches belonging to processors p1, p2, and p3. Another processor p4 wishes to change the value of x to 255. Before p4 can update x, it must ensure that p1, p2, and p3 have invalidated x from their caches. It is only at this stage that p4 can update x.

However, Web caches operate in a different environment from the environment that processor caches operate in. In processor caches, incorrect behavior can result if a cache contains a value which is even a fraction of a second out of date. For Web caches, it is often acceptable for a cached Web document to be slightly out of date. For example, suppose that a Web document w is contained in three caches (c1, c2, and c3) and that the Web document w is managed and updated by a data source d. Using the multiprocessor cache coherence approach, the data source d must first invalidate the Web document w from c1, c2, and c3 before updating the Web document. Thus, the multiprocessor cache coherence approach would cause the Web document w to be absent from the cache for a certain period of time whenever the Web document was updated. Requiring the data source d to invalidate the Web document w in caches before performing the update, results in slower updates and cache misses during the extra time that the Web document w is not present in the cache. Thus, there is also a need for a method and system which provides faster updates and higher cache hit rates. The present invention addresses such a need.

SUMMARY OF THE INVENTION

In accordance with the aforementioned needs, the present invention is directed to a method and system for maintaining updated caches and making consistent updates.

The present invention has features for constructing and maintaining objects to associate changes in remote data with cached objects. In one embodiment, if data in a remote data source changes, database change notifications are used to "trigger" a dynamic rebuild of associated objects. The information communicated from the data source to the cache can be either an identifier of an object whose value has changed, or information about the initially changed data. In the latter case, the cache(s) receiving the information about the initially changed data would compute the identity of the objects affected. In either event, rather than deleting stale items from the cache when they become obsolete, they can be immediately replaced with fresh objects. According to another aspect of the present invention, the objects can be compound-complex objects, that is an object composed of multiple complex objects; and the data can be underlying data.

In a system including one or more caches storing objects and one or more remote data sources storing data which may affect the value of a cached object, a method having features of the present invention for coordinating updates to a cache includes the steps of: recognizing when at least part of the data stored in a remote data source has changed; communicating to a cache, one or more of: information about at least part of the data which has changed; and information which includes the identity of at least one object whose value has changed as the result of the changes to the data; and information which allows the identity to be determined of at least one object whose value has changed as the result of the changes to the data; and updating a cache, in response to the communicating step.

According to another aspect of the present invention, the update can include either: storing a new version of the object in the cache; or deleting an object from the cache.

The present invention has features which ensure that end-users never observe that an item is not in the cache, and that each item can be regenerated exactly once, regardless of the current rate of requests.

The present invention has still other features for synchronizing caches on multiple servers with the data in a single common database. Updated information, whether new pages or delete orders, can be broadcast to a set of server nodes, permitting many systems to simultaneously benefit from the advantages of prefetching and providing a very high degree of scaleability.

BRIEF DESCRIPTION OF THE DRAWINGS

These and other features and advantages will become apparent from the following detailed description and accompanying drawings, wherein:

FIG. 4 depicts an example of API functions in accordance with the present invention;

FIG. 12c depicts an example of the object manager of FIG. 12a;

FIG. 17 depicts another example of API functions in accordance with the present invention;

FIG. 30d depicts an example of the send_trigger API of FIG. 30b;

FIG. 30e depicts examples of transaction types in accordance with the present invention;

DETAILED DESCRIPTION OF A METHOD FOR DETERMINING

HOW CHANGES TO UNDERLYING DATA AFFECT CACHED OBJECTS

Glossary of Terms

Figure 1A:
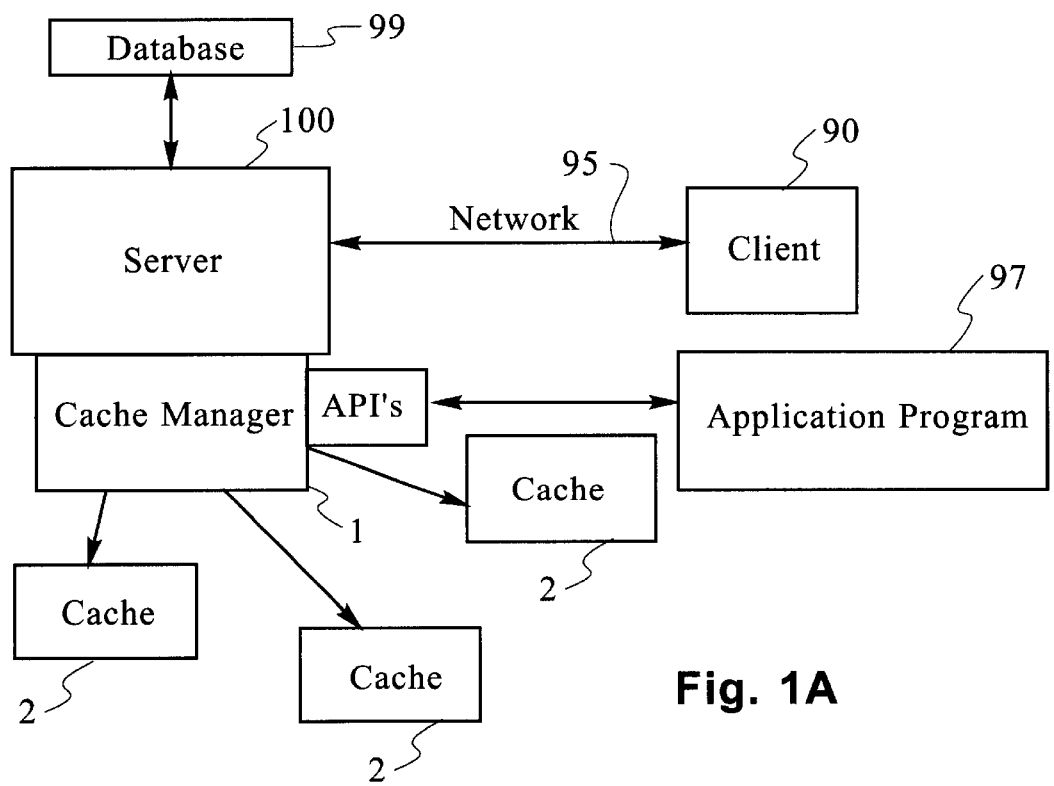
FIG. 1a depicts an example of a system having features of the present invention.

While dictionary meanings are also implied by terms used herein, the following glossary of some terms may be useful:

A cache is a storage area. It may be in memory, on disk, or partly in memory and partly on disk. The physical or virtual addresses corresponding to the cache may be fixed. Alternatively, they may vary over time. The definition of caches includes but is not limited to the following:

Caches for Web documents such as the proxy cache in the IBM Internet Connection Server or the browser cache in the Netscape Navigator;

Database caches such as in IBM's DB2 database;

Processor caches such as those in the IBM RS/6000 line of computers; and

Storage repositories for data written in a high-level programming language, wherein for at least some data, the storage repository program does not have explicit control of the virtual or physical addresses of where the data are stored.

A cache union is the combination of all caches in a system.

An object is data which can be stored in one or more caches.

A multiple version cache is a cache which is allowed to include multiple versions of the same object.

A single version cache is a cache which is only allowed to include one version of the same object.

A current version cache is a single version cache in which the version of any cached object must be current.

Underlying data include all data in the system which may affect the value of one or more objects. Underlying data are a superset of all objects in the system.

A complex object is an object with one or more dependencies on underlying data.

The object manager is a program which determines how changes to underlying data affect the values of objects.

A graph G=(V,E) consists of a finite, nonempty set of vertices V also known as nodes and a set of edges E consisting of pairs of vertices. If the edges are ordered pairs of vertices (v, w), then the graph is said to be directed with v being the source and w the target of the edge.

A multigraph is similar to a graph. The key difference is that multiple edges may exist between pairs of vertices. Multigraphs are supersets of graphs.

A weighted graph or weighted multigraph is one in which each edge may optionally have a number known as a weight associated with it.

The object dependence graph is a directed multigraph. Vertices of the object dependence graph are known as graph objects. Graph objects are supersets of objects and may include the following:

(1) objects;

(2) underlying data which are not objects; and (3) virtual objects.

These graph objects do not correspond to actual data. They are used as a convenience for propagating data dependencies. Virtual objects are not as frequently used as (1) and (2).

An edge from a graph object o1 to o2 indicates a data dependence (also called dependence or dependency) from o1 to o2. This means that a change to o1 might also change o2. Dependencies are transitive. Thus, if a has a data dependence on b and b has a data dependence on c, then a has a dependence on c.

A graph object may also be a relational object (RO). ROs have relational specifiers affiliated with them. 2 examples of RO's are:

1. Single record objects (SRO's); the relational specifier represents a single record.
2. Multiple record objects (MRO's); the relational specifier represents multiple records.

An RO r1 contains (includes) an RO r2 if all records represented by r2 are also represented by r1.

The outgoing adjacency list for a node v is a list containing all nodes w for which the edge (v, w) is contained in E.

The incoming adjacency list for a node v is a list containing all nodes w for which the edge (w, v) is contained in E.

A leaf node is a node which is not the target of any edges.

A proper leaf node is a leaf node which is the source of at least one edge.

A maximal node is a node which is not the source of any edges.

A proper maximal node is a maximal node which is the target of at least one edge.

A simple dependence graph is a directed graph in which each node is a leaf node or a maximal node.

Two objects o1 and o2 are consistent if either:

(1) Both objects are current; or (2) At some time t in the past, both objects were current.

A version number is data which allows different versions of the same object to be uniquely identified. One implementation would be to use integers for version numbers and to assign a newly created current version, the version number of the previous version plus 1. However, other implementations are also possible and version numbers do not necessarily have to be numbers. For example, text strings could also be used to implement version numbers.

The most recent version of an object is known as the current version.

Referring now to the drawings, FIG. 1a depicts an example of a client-server architecture having features of the present invention. As depicted, a client 90 communicates requests to a server 100 over a network 95. The server 100 maintains one or more caches 2. As is conventional, the server 100 uses the caches 2 to improve performance and lessen the CPU time for satisfying the client 90 requests. Although FIG. 1a shows the caches 2 associated with a single server, the caches 2 could be maintained across multiple servers as well. One skilled in the art could easily adapt the present invention for other applications which are not client-server based as well.

An application program 97 running on the server 100 creates objects and then stores those objects (e.g., dynamic pages which do not cause state changes upon a request therefor) on one or more caches 2. The server 100 can also be a proxy server wherein the source of the underlying data in the database 99 and the cache 2 are geographically separated. In this embodiment, an object is data which can be stored in one or more caches 2. The objects can be constructed from underlying data stored on a database 99. Underlying data include all data in the system which may affect the value of one or more objects stored in the cache 2. Underlying data are a superset of all objects in the system. A complex object is an object with one or more dependencies on the underlying data.

Also, let the caches 2 in the cache union all be current version caches. Recall that a current version cache is a single version cache in which the version of any cached object must be current, and that a single version cache is a cache which is only allowed to include one version of the same object.

According to the present invention, a cache manager 1 (which is an example of an object manager) determines how changes to underlying data affect the values of objects. Although FIG. 1a shows the cache manager 1 residing on a single server, it could be distributed across multiple servers as well. The cache manager 1 is preferably embodied as computer executable code tangibly embodied on a program storage device for execution on a computer such as the server 100 (or the client 90). Those skilled in the art will appreciate that the cache 2, cache manager 1, and database 99 can be similarly associated with the client 90, in accordance with the present invention.

The cache manager 1 provides APIs (FIG. 4) for specifying what underlying data, e.g., database records, a cached object depends upon. The cache manager 1 keeps track of these dependencies. Whenever a process modifies state which could affect the value of a complex object in a cache, the process specifies the underlying data which it is updating. The cache manager then invalidates all cached objects which depend on the underlying data being updated.

Figure 1B:
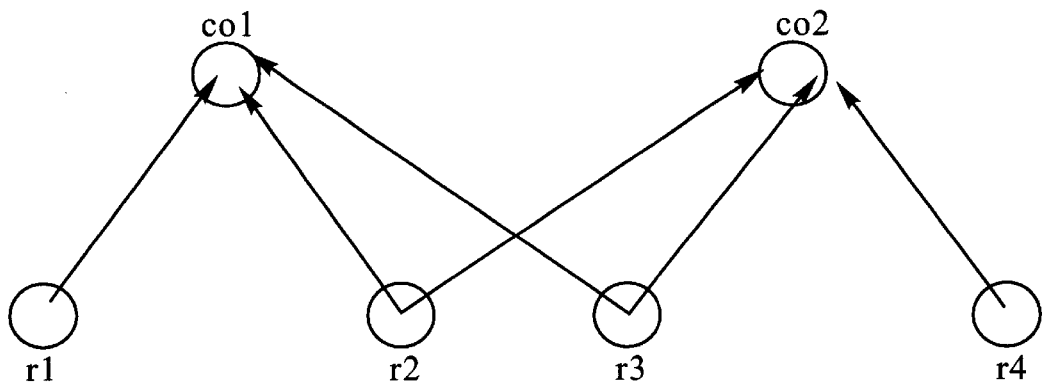
FIG. 1b depicts an example of an object dependence graph having features of the present invention.

FIG. 1b depicts an example of an object dependence graph (G) 121' having features of the present invention. Note that the object dependence graph (G) 121' in this embodiment is less complex than in the alternative embodiment (FIG. 12b). Here, the object dependence graph 121' is a simple dependence graph, i.e., a directed graph in which each node is a leaf node r1 . . . r3 or a maximal node co1, co2. Recall that a leaf node is a node which is not the target of any edges and a maximal node is a node which is not the source of any edges. Also note that every path is of length 1 and there is no need to specify weights for edges. Further, each proper maximal node (a maximal node which is the target of at least one edge) co1, co2 is an object; and each proper leaf node r1 . . . r4 (a leaf node which is the source of at least one edge) in G represents underlying data which is not an object. The underlying data represented by each proper leaf node r1 . . . r4 is referred to as a record (These records are not synonymous with records used in the second embodiment). The objects represented by proper maximal nodes co1, co2 are complex objects.

The cache manager 1 maintains the underlying data structures (see FIGS. 2–3) which represent the object dependence graph(s) 121'. Application programs 97 communicate the structure of object dependence graphs to the cache manager 1 via a set of cache APIs (see FIG. 4). The application also uses APIs to notify the object manager 1 of records r1 . . . r4 which have changed. When the cache manager 1 is notified of changes to a record r1 . . . r4, it must identify which complex objects co1,co2 have been affected and cause the identified complex objects to be deleted (or updated) from any caches 2 containing them. The cache manager 1 can determine which complex objects have changed by examining edges in G (see FIG. 11).

For example, suppose that the cache manager 1 is notified that r1 has changed. G 121' implies that co1 has also changed. The cache manager 1 must make sure that co1 is deleted (or updated) from any caches 2 containing it. As another example, suppose that r2 has changed. G 121' implies that co1 and co2 are also affected. Here, the cache manager must make sure that both co1 and co2 are deleted (or updated) from any caches 2 containing them.

In other words, the basic approach is to construct complex objects at the application level so that they are dependent on a set of records. The application must be able to specify which records r1 . . . r4 a complex object co1, co2 depends upon. For every process which modifies state in a manner which could affect the value of a cached complex object, the application program must be able to specify which records are affected. Complex objects of this type are said to be in normal form. Many preexisting Web applications create cacheable complex objects which are already in normal form. In order to use caching in these applications, it is only necessary to recognize the records underlying complex objects and to interface the application to the cache via the APIs provided. Other changes to the applications are not necessary.

Preferably, the cache manager 1 is a long running process managing storage for one or more caches 2. However, one skilled in the art could easily adapt the present invention for a cache manager which is one of the following:

1. Multiple distinct processes, none of which overlap in time.

2. Multiple distinct processes, some of which may overlap in time. This includes multiple concurrent cache managers so designed to improve the throughput of the cache system.

Figure 1C:
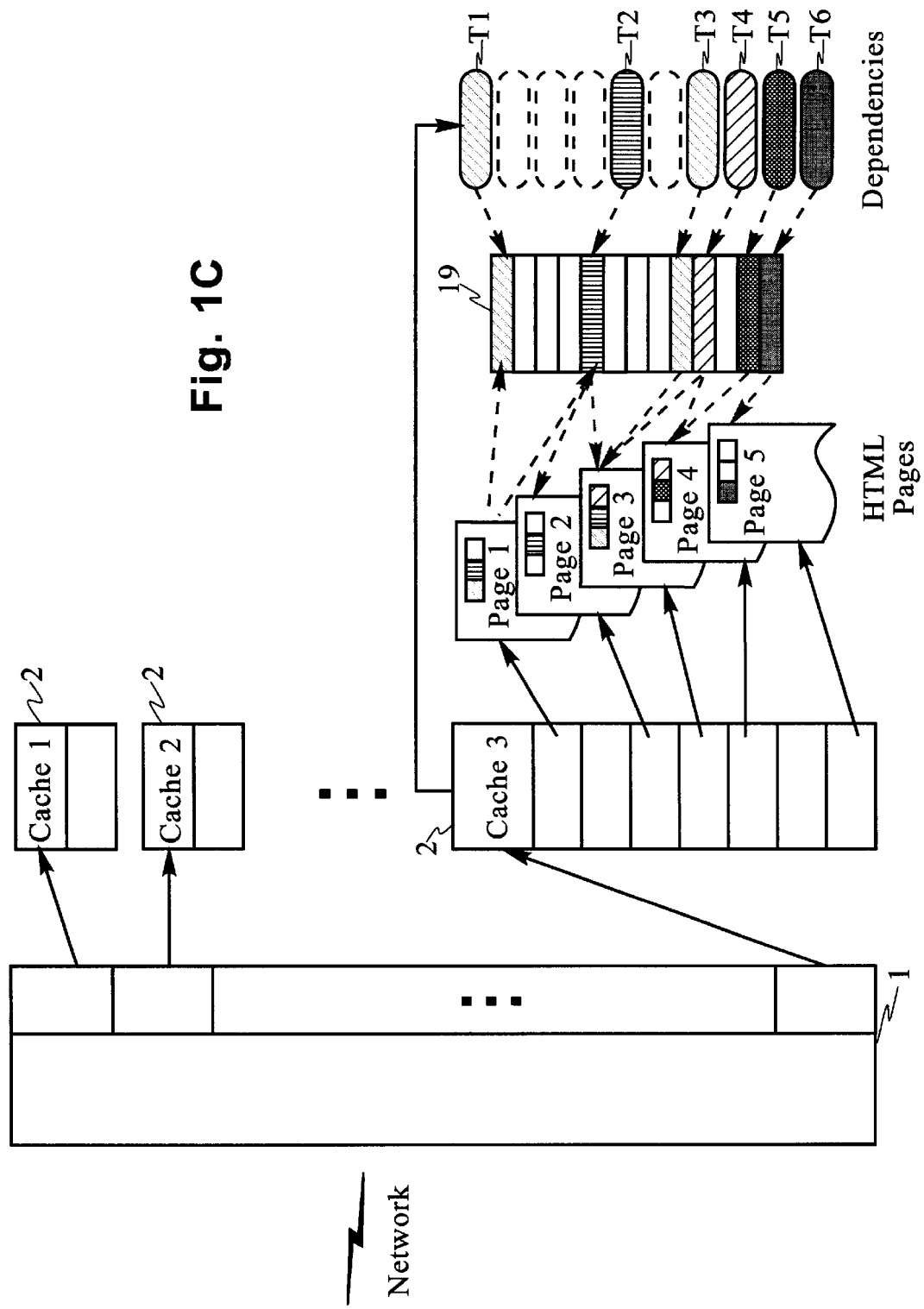
FIG. 1c depicts an example of a system having features of the present invention.

FIG. 1c depicts an example of a system in accordance with the present invention for caching dynamic Web pages. As depicted, consider a conventional Web site 100 where pages (page 1 . . . page 5) are created dynamically from one or more databases 99 and stored in one or more caches 2. An example of a database 99 and database management system adaptable to the present invention is that sold by the IBM Corporation under the trademark DB2. Here, the dynamic Web pages (page 1 . . . page 5) are objects and the underlying data (tables/records) include parts of databases 99.

According to the present invention, a cache manager 1 provides API's (FIG. 4) which allow an application 97 program to specify the records that a cached object depends upon. The cache manager 1 keeps track of these dependencies. Whenever an application program 97 modifies a record (s) or learns about changes to a record which could affect the value of a complex object in a cache, the application program 97 notifies the cache manager 1 of the record(s) which has been updated. The cache manager 1 then invalidates or updates all cached objects with dependencies on the record (s) which has changed.

For example, consider the HTML pages (page 1 . . . page 5) depicted in FIG. 1c. The HTML pages, which are complex objects, are constructed from a database 99 and stored in Cache3. Each HTML page may have dependencies on one or more records which are portions of the database denoted Table1, Table2, . . . , Table6. The correspondence between the tables and pages can be maintained by hash tables and record lists 19. For example, if the cache manager 1 were notified of a change to Table1 T1, it would invalidate (or update) Page1. Similarly, if the cache manager were notified of a change to Table2 T2, it would invalidate (or update) Page1, Page2, and Page3.

Figure 2:
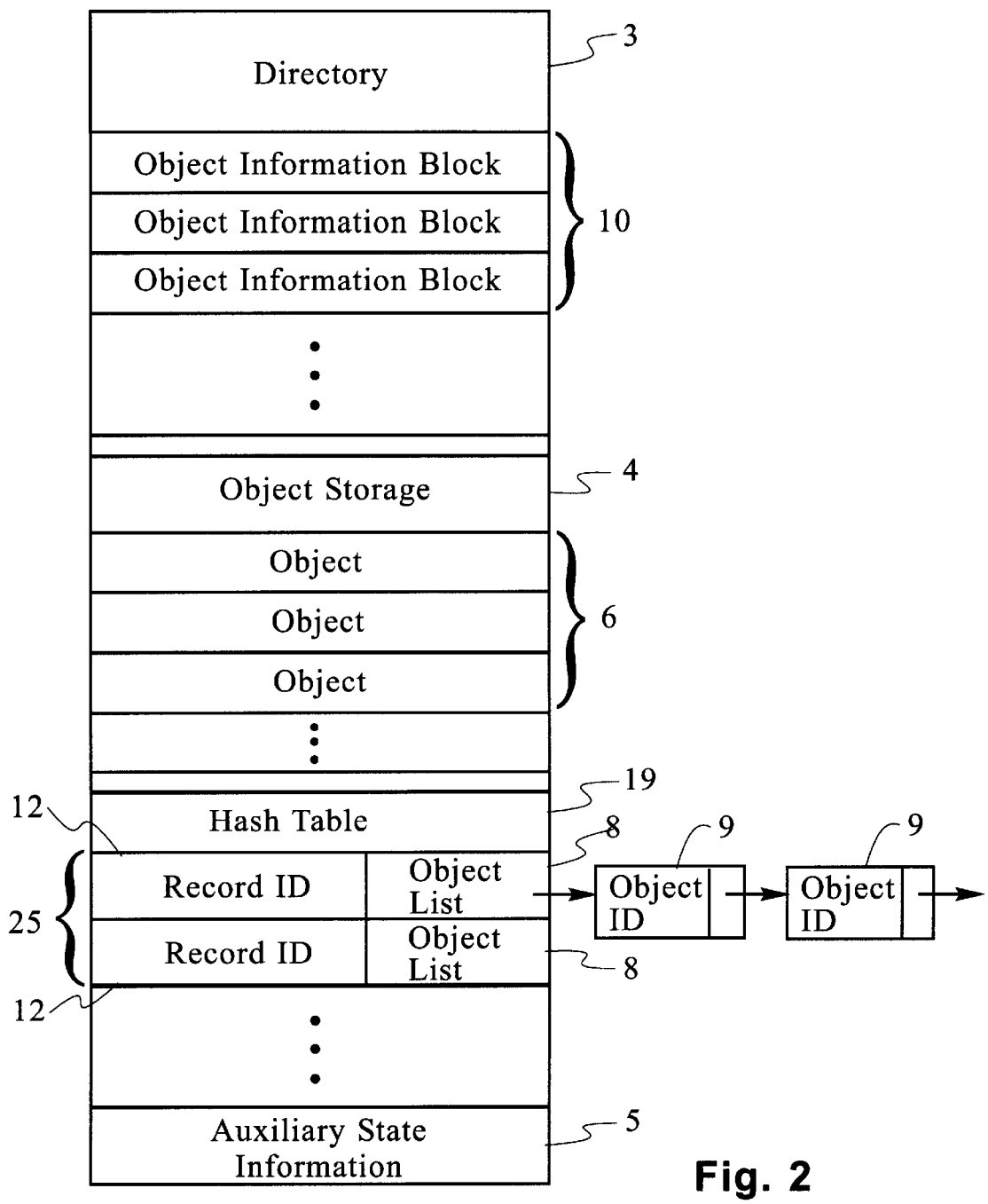
FIG. 2 depicts an example of a cache used in accordance with the present invention.
Figure 3:
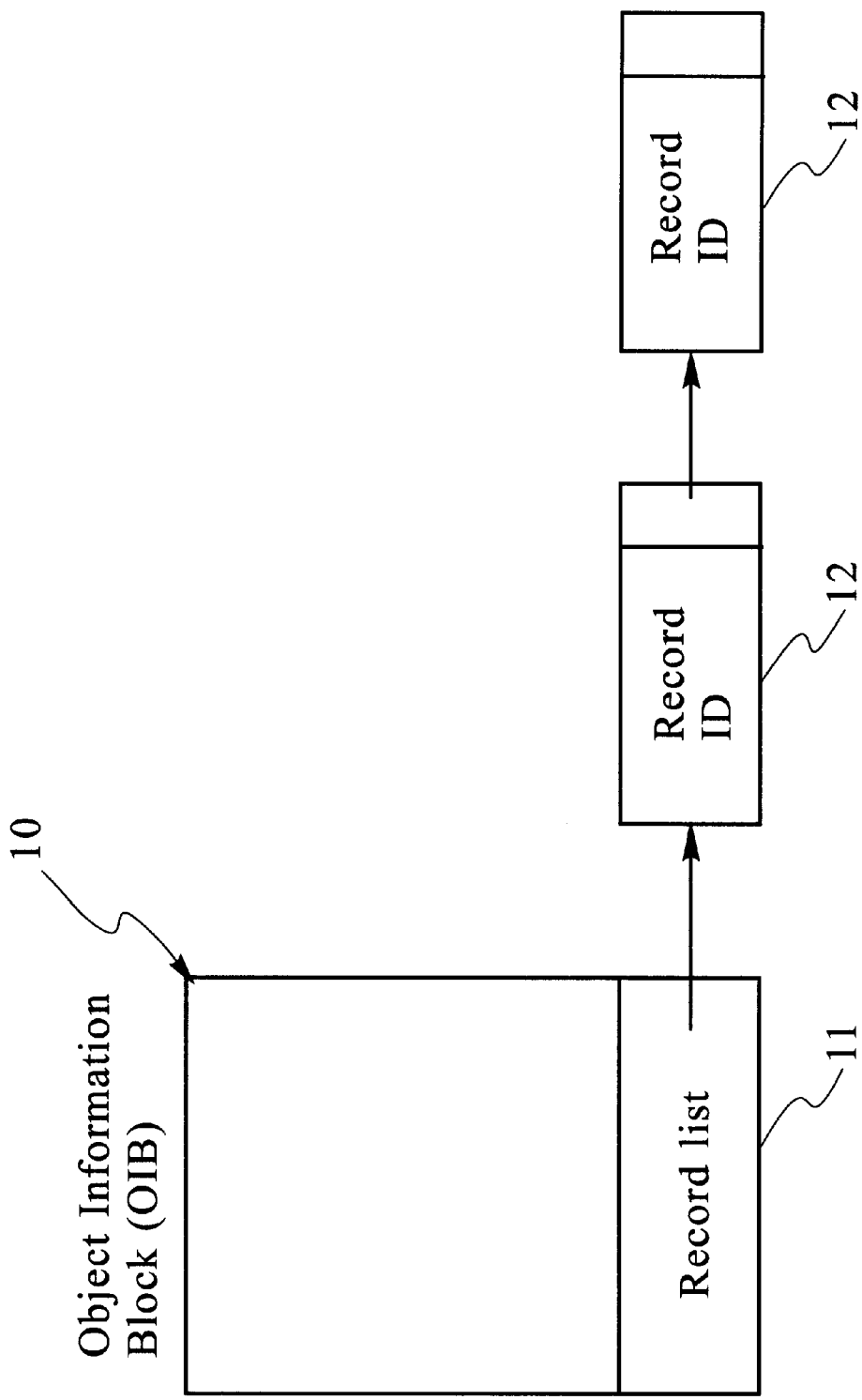
FIG. 3 depicts an example of an object information block (OIB) used in accordance with the present invention.

FIG. 2 depicts an example of the cache 2. As depicted, each cache 2 preferably has 4 storage areas: a directory 3, maintains information about each cached object; an object storage 4 for storing the objects 6; auxiliary state information 5 which includes other state information (e.g., statistics maintained by the cache); and a hash table 19, which stores information about records, in the hash table entries 25.

In a preferred embodiment, the hash table entries 25 comprise record IDs 12; and object lists 8, which include the list of objects, i.e., object id(s) 9, whose values depend on a record which may be part of a database 99. However, the present invention also allows other kinds of information to be stored in the hash table entries. The purpose of the hash table is to provide an efficient method for finding information about a particular table/record. Preferably hashing is keyed on the record ID 12. Hash tables are well known in the art (see e.g., "The Design and Analysis of Computer Algorithms", Aho, Hopcroft, Ullman, Addison-Wesley, 1974). Hash tables provide an efficient data structure for the present invention. However, the present invention is compatible with a wide variety of other data structures and is not limited to using hash tables.

The directory 3 includes an object information block (OIB) 10 for each object 6 stored in the cache. One of the components of the OIB 10 is a record list 11 (FIG. 3) which is used to store all of the record ID's 12 identifying records r1 . . . r4 associated with a complex object co1, co2. Here, the complex objects are dynamic web pages (page 1 . . . page 5) stored in the cache 2 and the records may be part of a database 99. Although the preferred embodiment uses text strings for record ID's, other methods are compatible as well.

An application program communicates with the cache manager 1 via a set of API functions. Examples of APIs in accordance with the present invention are shown in FIG. 4. Those skilled in the art will appreciate that many additional APIs can be implemented in a straightforward manner within the spirit and scope of the present invention. As depicted, the example APIs are:

cache_object (object_id, object, cache_id) 410: stores an object 6 identified by cache_id in the cache 2 (FIG. 2) identified by cache_id under a key object_id 9; overwriting any previous object 6 having the same key. The present invention is compatible with a wide variety of types for object_id, object, and cache_id. In the preferred embodiment, the object 6 may be of several types, the object_id is a byte string, and the cache_id is a character string. Here, although multiple items with the same key are preferably not allowed to exist in the same cache concurrently. However, it would be easy for one skilled in the art to use the present invention in a situation where multiple items with the same key could exist in the same cache concurrently.

lookup_object (object_id, cache_id) 415: look for an object 6 identified by cache_id with a key object_id 9 in the cache 2. If any such object 6 exists, return it to the application program.

delete_object (object_id, cache_id) 420: look for an object 6 identified by cache_id with a key object_id 9 in the cache. If any such object 6 exists, delete it.

add_dependency (object_id, cache_id, record_id) 430: look for an object 6 with a key object_id 9 in the cache 2 identified by cache_id. If any such object 6 exists and there is no dependency between the object 6 and a record identified by a record_id 12 associated with the record_id, add the dependency.

delete_dependency (object_id, cache_id, record_id) 440: look for an object 6 with a key object_id 9 in the cache identified by cache_id. If any such object 6 exists and there is a dependency between the object 6 and a record identified by record_id 12, delete the dependency.

invalidate_record (cache_id, record_id) 450: delete all cache objects from the cache 2 identified by cache_id which depend on the record identified by the record_id.

show_dependent_objects (cache_id, record_id) 460: return a list of object_ids 9 for all objects in the cache 2 identified by the cache_id which depend on the record identified by the record_id. This function can be implemented by returning the object list 8 for the hash table entry 25 corresponding to the record identified by record_id. A status variable can also be returned to indicate if either the cache 2 or the hash table entry 25 is not found.

show_associated_records (cache_id, object_id) 470: return a list of record_ids 12 for all records which the object 6, identified by object_id in the cache 2 identified by cache_id, depends on. This function can be implemented by returning the record list 11 (FIG. 3) for the object 6 identified by the object_id in the cache 2 identified by the cache_id. A status variable can also returned to indicate if either the cache or the object 6 is not found.

Figure 5:
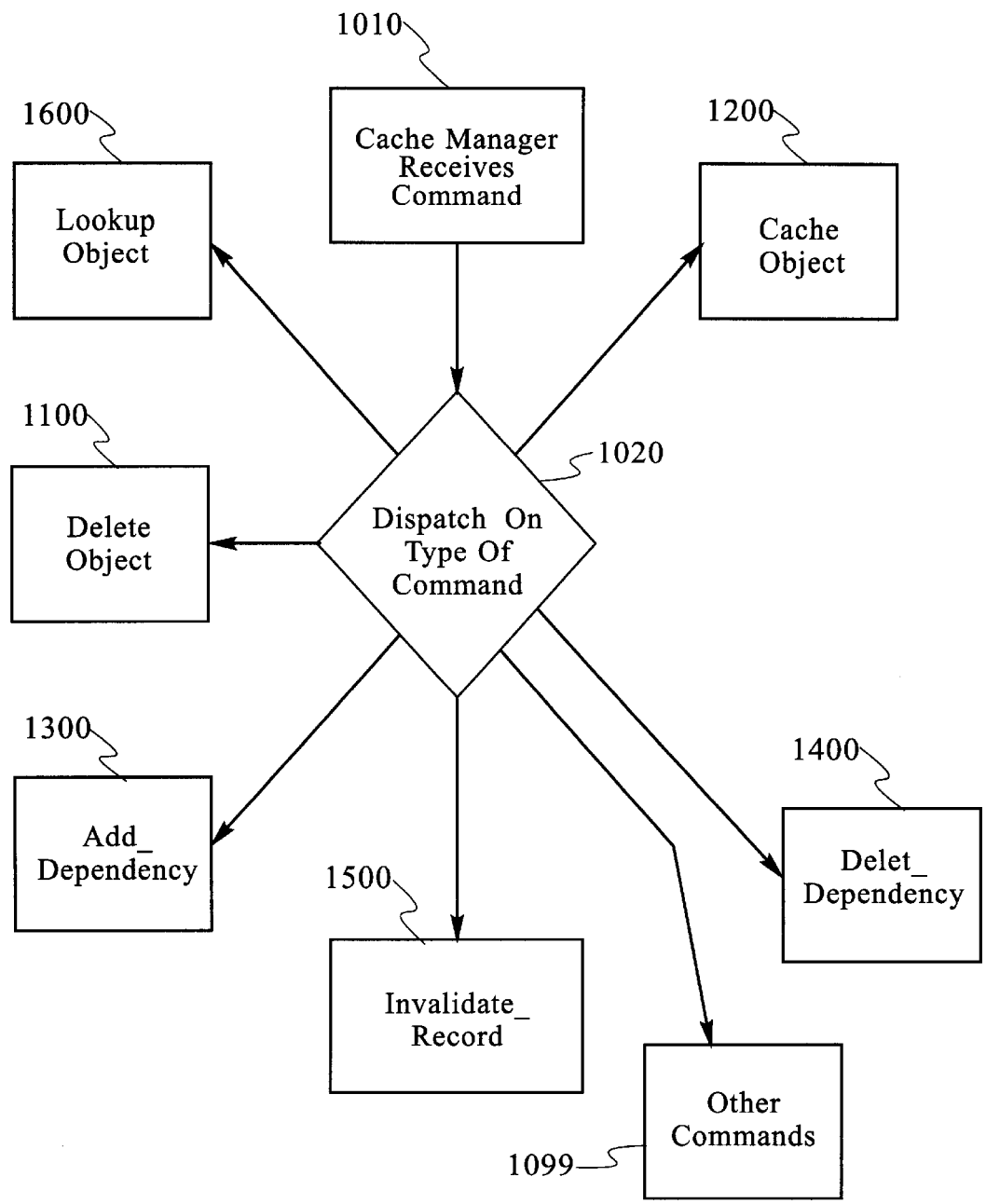
FIG. 5 depicts a block diagram of a method for implementing the API functions of FIG. 4.

FIG. 5 depicts an example of the cache manager 1 logic. As depicted, in step 1010 the cache manager receives a command (FIG. 4) from an application program. In step 1020, the cache manager reads the command (FIG. 4) and invokes different logic 1100 . . . 1600, described below, based on the command.

Figure 6:
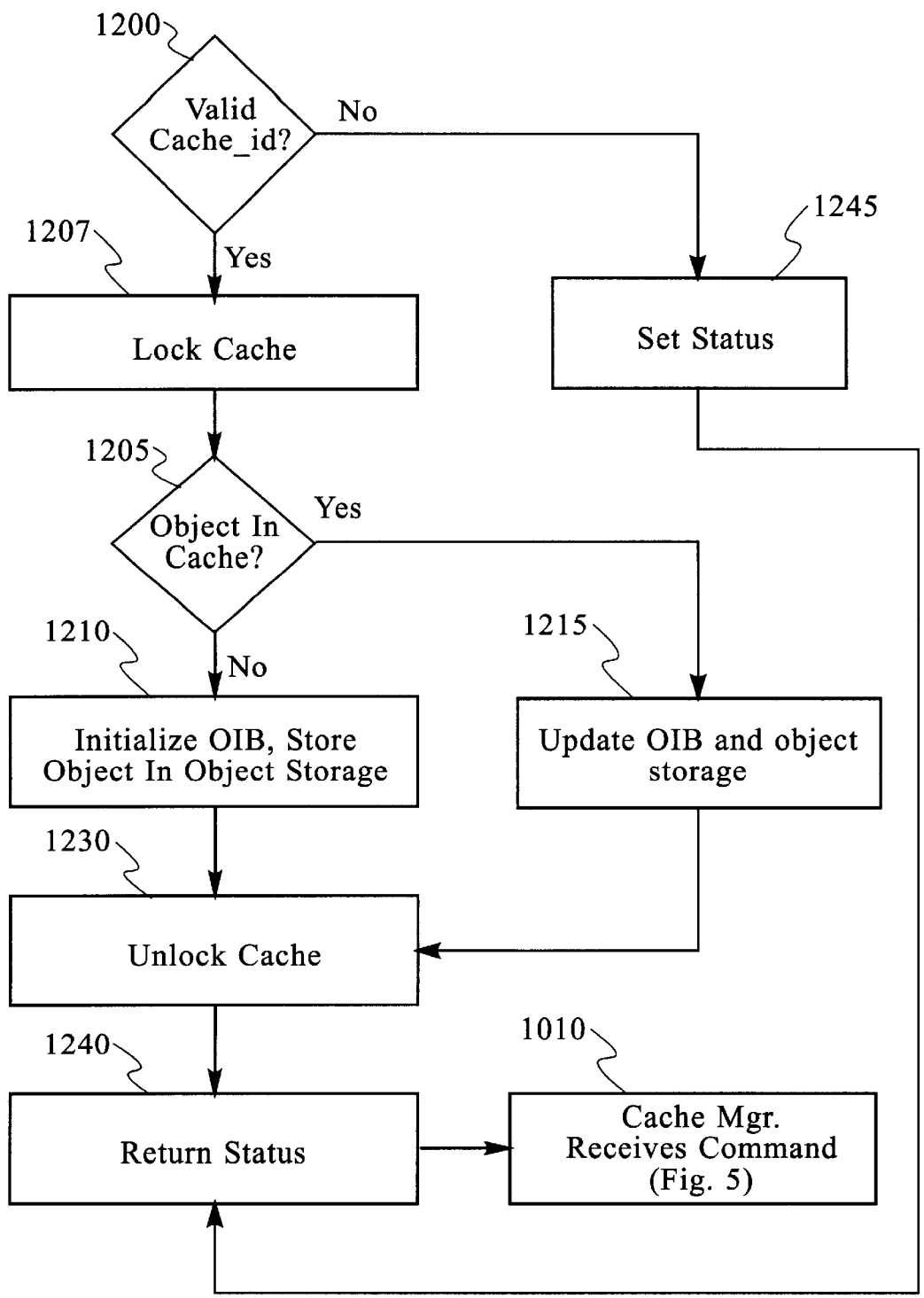
FIG. 6 depicts a block diagram of an API function which adds an object to a cache.

FIG. 6 depicts an example of the cache manager logic 1200 for a cache_object (object_id, object, cache_id) 410 command. As depicted, in step 1200, the cache manager 1 determines if the cache_id parameter specifies a valid cache 2. If not, the status variable to be returned to the application program is set appropriately, in step 1245. If the cache id specifies a valid cache 2, the cache 2 is preferably locked, to prevent multiple processes from accessing the cache concurrently. That way, consistency is preserved. Those skilled in the art will appreciate that other locking schemes could be used to provide higher levels of concurrency. The present invention is compatible with a wide variety of conventional locking schemes in addition to the example used in the preferred embodiment.

In step 1205, the cache manager 1 searches for the object 6 by examining the directory 3 (FIG. 2). If a previous copy of the object 6 is located, the OIB 10 for the object 6 is updated, the old version of the object 6 in object storage 4 is replaced by the new one, and the status variable is set appropriately, in step 1215. If, in step 1205, a previous copy of the object 6 is not found, a new OIB 10 for the object 6 is created, initialized, and stored in the directory 3, in step 1210. The cache manager 1 also stores the object 6 in the object storage 4 and sets the status variable appropriately.

In step 1230, the cache is unlocked to allow other processes to update it. In step 1240, the status variable indicating the result of the command is returned to the application program. Processing then returns to step 1010 (FIG. 5).

Figure 7:
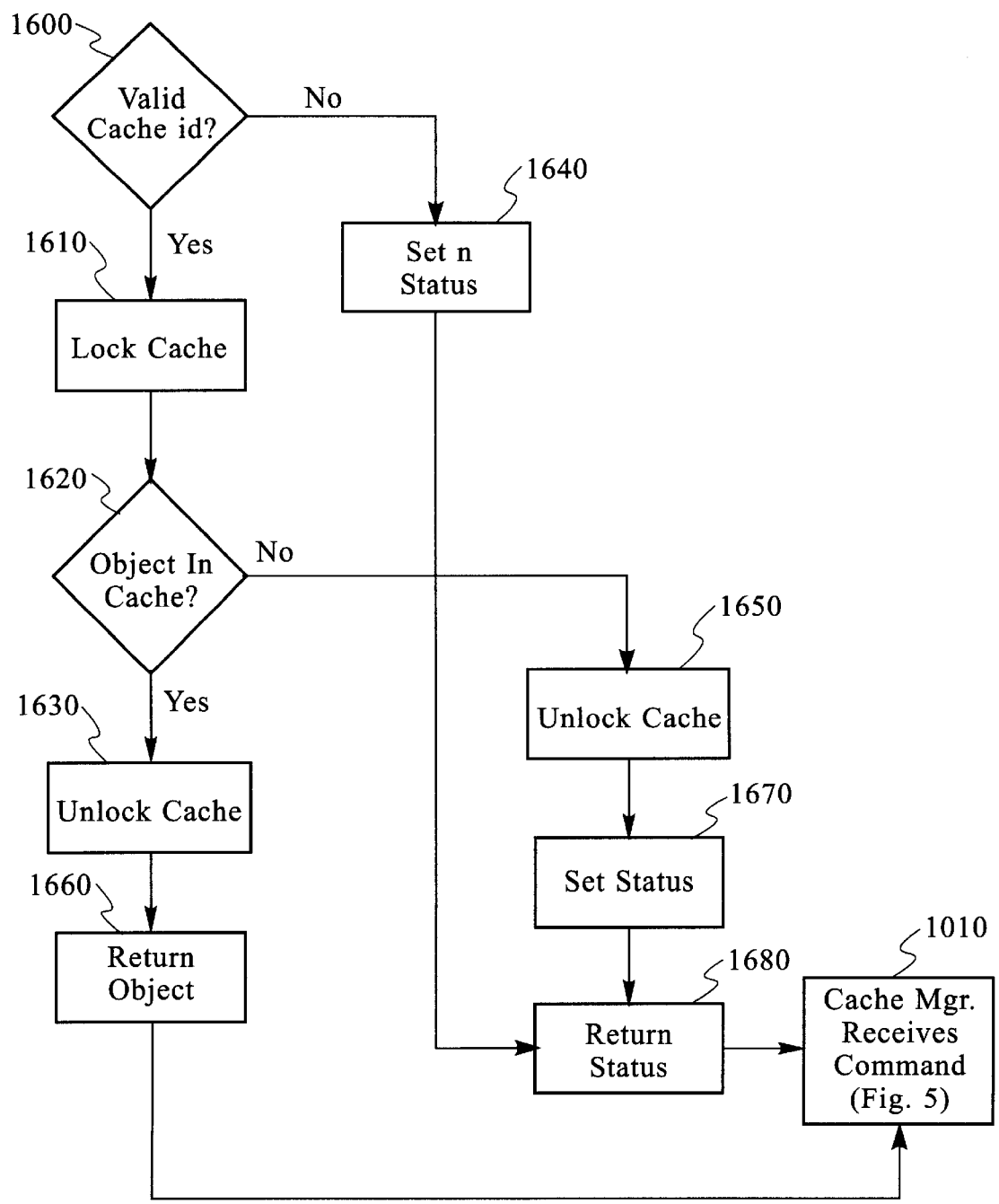
FIG. 7 depicts a block diagram of an API function which looks for an object in a cache.

FIG. 7 depicts an example of logic for the lookup_object (object_id, cache_id) 415 command. As depicted, in step 1600, the cache manager 1 determines if the cache_id parameter specifies a valid cache 2. If not, in step 1640 a status variable is set appropriately and returned, in step 1680, to the application program. If the cache_id specifies a valid cache, in step 1610 the cache 2 is locked.

In step 1620, the cache manager 1 searches for an object 6 corresponding to the object_id parameter by examining the directory 3 (FIG. 2). If the object 6 is not found: the cache 2 is unlocked in step 1650; the status variable is set in step 1670 and returned to the application program in step 1680. If in step 1620 the object 6 is found: the cache 2 is unlocked in step 1630; and the object 6 is returned to the application program in step 1660.

Figure 8:
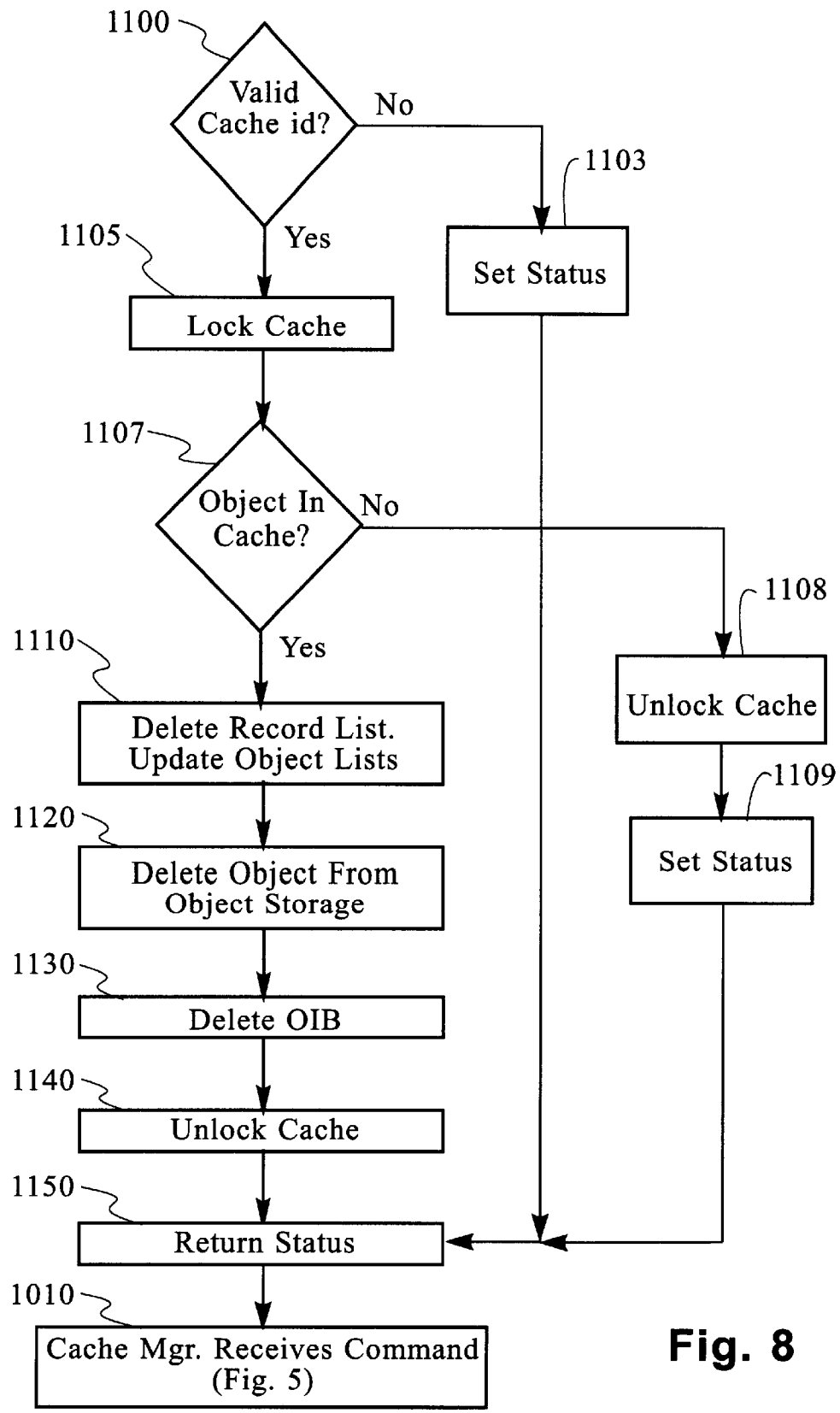
FIG. 8 depicts a block diagram of an API function which deletes an object from a cache.

FIG. 8 depicts an example of logic for the delete_object (object_id, cache_id) 420 command. As depicted, in step 1100 the cache manager 1 determines if the cache 2 corresponding to the cache_id parameter is valid. If not valid, in step 1103 a status variable is set appropriately, and in step 1150 the status variable is returned to the application program.

If in step 1100 the cache_id specifies a cache 2 which is valid, that cache is locked in step 1105. In step 1107, the cache manager 1 searches for an object 6 corresponding to the object_id parameter by examining the directory 3 (FIG. 2). If the object 6 is not found: the cache is unlocked in step 1108; the status variable is set in step 1109; and in step 1150 the status variable is returned to the application program. If in step 1107 the object 6 is found, in step 1110 the cache manager 1 deletes the objects' associated record list 11 (FIG. 3) and updates the corresponding objects lists 8 (FIG. 2). The cache manager 1 scans each record ID 12 of the record list 11 (FIG. 3) corresponding to the object 6. Note that each record ID 12 on the record list 11 has a corresponding object list 8 (FIG. 2). Pointers to object id(s) 9 (FIG. 2) corresponding to the object 6 being deleted are removed from all such object lists 8. If this results in any object list 8 becoming empty, the corresponding hash table entry 25 is also deleted. After each element of the record list 11 is examined, it can be deleted.

In step 1120, the object 6 is deleted from the object storage 4. In step 1130, the corresponding OIB 10 is deleted. Note that step 1120 can be performed concurrently with or before steps 1110 and 1130. In step 1140, the cache is unlocked and in step 1150, a status variable is returned to the application program.

Figure 9:
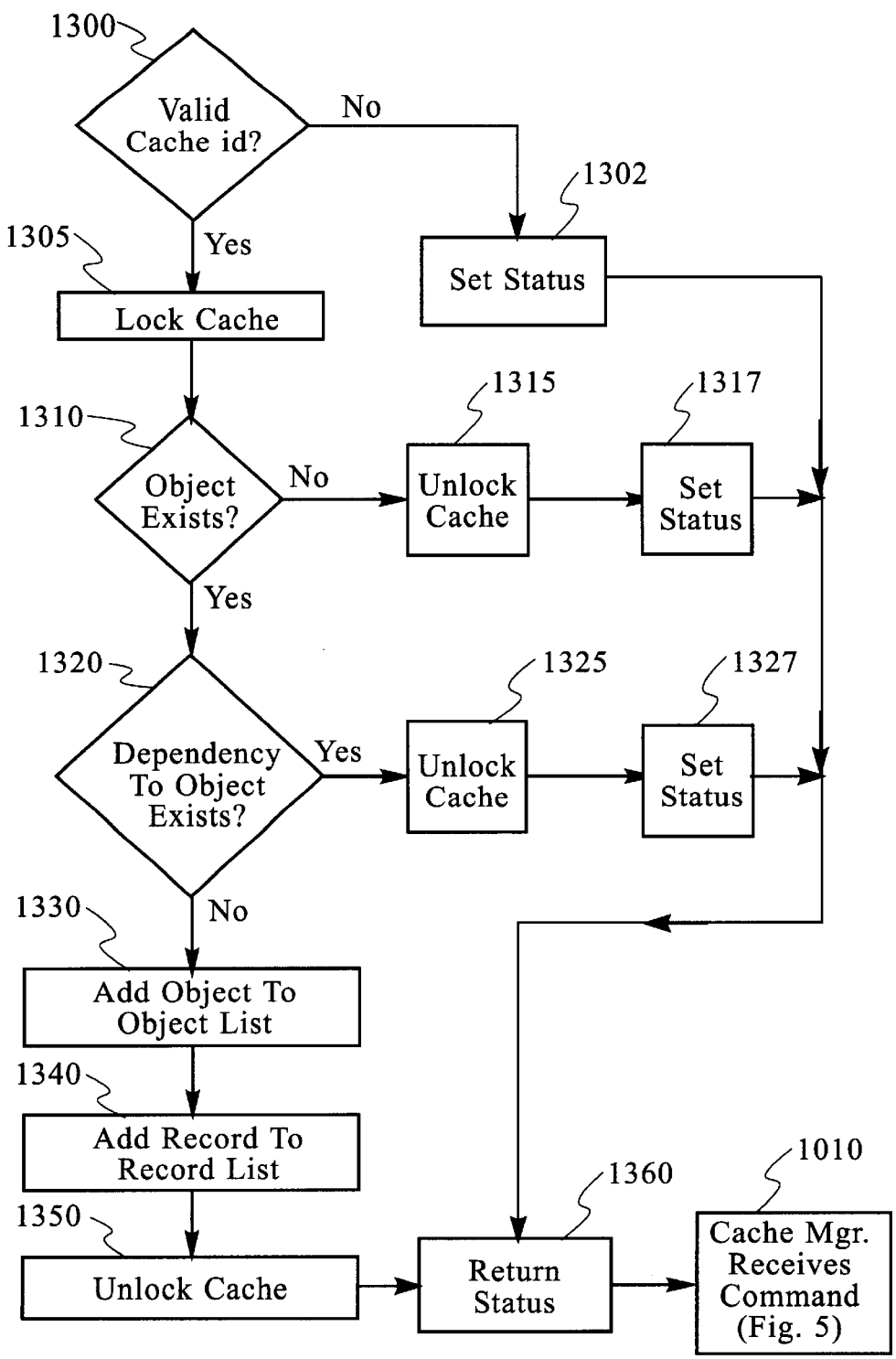
FIG. 9 depicts a block diagram of an API function which adds a dependency from a record to an object.

FIG. 9 depicts an example of logic for the add_dependency (object_id, cache_id, record_id) 430 command. As depicted, in step 1300, the cache manager determines if the cache_id parameter specifies a cache 2 which is valid. If not, a status variable is appropriately set, in step 1302 and returned to the application program, in step 1360.

If in step 1300, it is determined that the cache_id specifies a valid cache, the cache 2 is locked, in step 1305. In step 1310, the cache manager 1 searches for the object 6 corresponding to the object_id by examining the directory 3 (FIG. 2). If in step 1310, the object 6 is not found: the cache 2 is unlocked, in step 1315; the status variable is set in step 1317; and an appropriate status variable is returned to the application program, in step 1360. If in step 1310, the object 6 is found: the cache manager 1 examines the record list 11 (FIG. 3) in step 1320 to see if an association (i.e. the dependency information) between the object 6 and a record identified by the record_id already exists. Alternatively, it can be determined if the record corresponding to the record_id has a hash table entry 25 and if so, to search for the object_id 9 on the object list 8. If in step 1320, a dependency to the object exists, the cache 2 is unlocked in step 1325; the status variable is set appropriately in step 1327; and an appropriate status variable is returned to the application program, in step 1360. If in step 1320, no dependency to the object is found, in step 1330 an object_id 9 is added to the object list 8 for the record. A new hash table entry 25 and object list 8 are created for the record if needed. In step 1340, a record_id 12 is added to the record list 11 (FIG. 3) for the object 6. Note that step 1340 can be executed concurrently with or before step 1330. The cache 2 is unlocked, in step 1350 and the status variable is returned to the application program, in step 1360.

Figure 10:
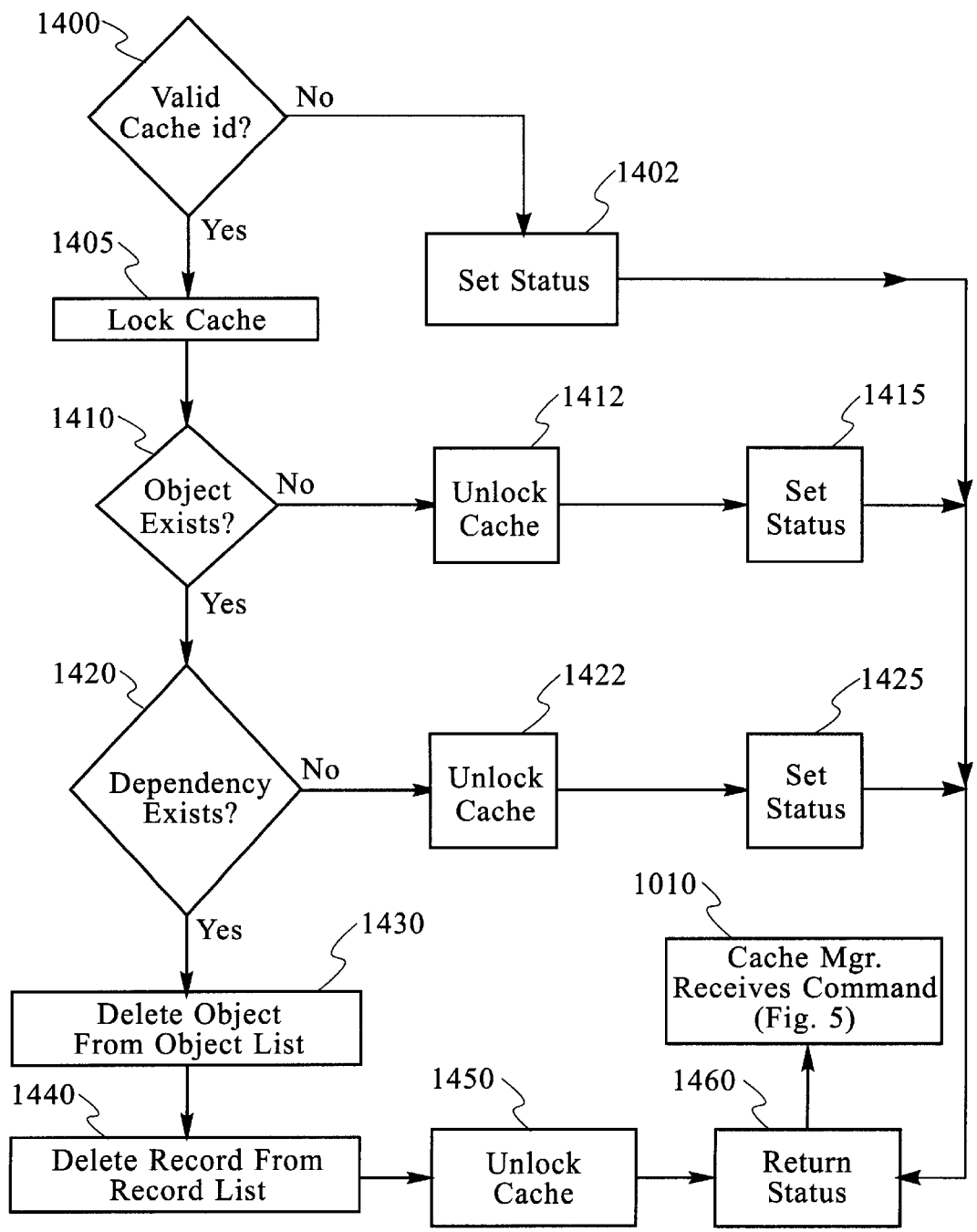
FIG. 10 depicts a block diagram of an API function which deletes a dependency from a record to an object.

FIG. 10 depicts an example of logic for the delete_dependency (object_id, cache_id, record_id) 440 command. As depicted, in step 1400, the cache manager 1 determines if the cache_id parameter specifies a cache 2 which is valid. If not, in step 1402 a status variable is set appropriately and returned to the application program, in step 1460.

In step 1400, if it is determined that the cache_id specifies a valid cache, in step 1405 the cache is locked. In step 1410, the cache manager 1 searches for the object 6 corresponding to the object_id by examining the directory 3 (FIG. 2). If in step 1410 the object 6 is not found: the cache 2 is unlocked, in step 1412; the status variable is set in step 1415 and returned to the application program, in step 1460. If in step 1410, the object 6 is found: the cache manager 1 examines the record list 11 (FIG. 3), in step 1420 to see if an association (i.e. the dependency information) between the object 6 and a record identified by the record_id already exists. Alternatively, it can be determined if the record corresponding to the record_id has a hash table entry 25 and if so, to search for object_id 9 on the object list 8. If in step 1420, no dependency is found, in step 1422 the cache 2 is unlocked; the status variable is set appropriately in step 1425; and an appropriate status variable is returned to the application program, in step 1460. If in step 1420, a dependency to the object is found, in step 1430 the object_id 9 is deleted from the object list 8 for the record. If this makes the object list empty, the hash table entry 25 for the record is deleted. In step 1440, the record_id 12 is removed from the record list 11 (FIG. 3) for the object 6. Note that step 1440 can be executed concurrently with or before step 1430. The cache is unlocked, in step 1450 and the status variable is returned to the application program in step 1460.

Figure 11:
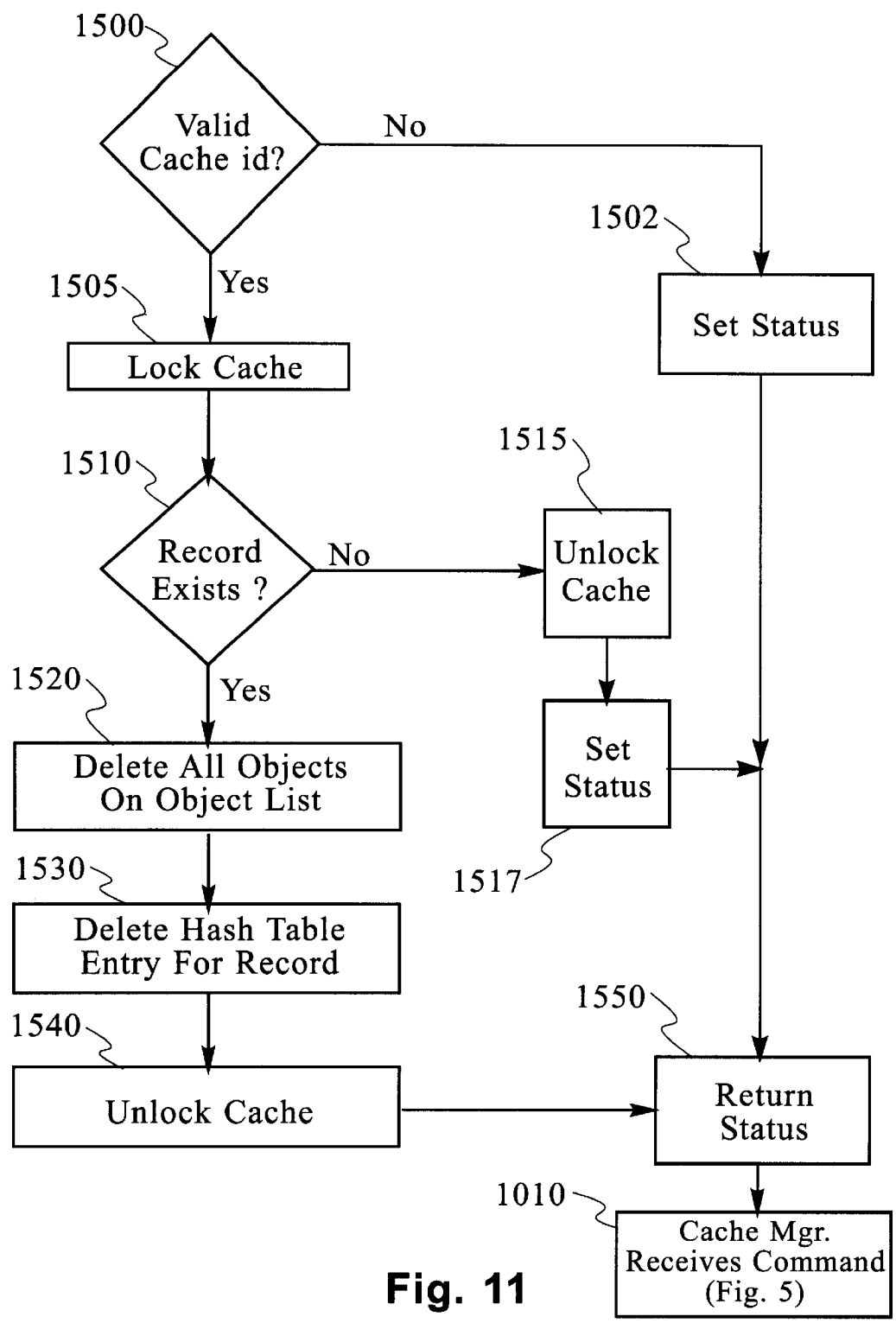
FIG. 11 depicts a block diagram of an API function which is invoked when a record changes.

FIG. 11 depicts an example of logic for the invalidate_record (cache_id, record_id) 450 command. As depicted, in step 1500, the cache manager 1 determines if the cache_id parameter specifies a cache 2 which is valid. If the cache is not valid, a status variable is set appropriately in step 1502, and returned, in step 1550 to the application program.

If in step 1500, the cache manager 1 determines the cache_id parameter specifies a cache 2 which is valid, the cache 2 is locked, in step 1505. In step 1510, the cache manager determines if the values of any objects 6 are dependent on a record associated with the record_id by seeing if the record has a hash table entry 25 (FIG. 2). If no hash table entry 25 is found for the record, the cache is unlocked in step 1515 and the status variable is set in step 1517.

If in step 1510, a hash table entry 25 is found for the record, the cache manager 1 scans the object list 8 for the record, in step 1520. Each object 6 having an object ID 9 on the object list 8 is deleted from the cache. As each object 6 is deleted, all references to the object 6 from other object lists 8 are also deleted. Such references can be found by traversing the record list 11 (FIG. 3) for the object 6 being deleted. If the deletion of any such reference results in an empty object list, the corresponding hash table entry is deleted. After each element of the object list 8 associated with the record_id 12 (corresponding to the record_id parameter) is examined, the element can be deleted. In step 1530, the hash table entry 25 for the record is deleted. The cache is unlocked in step 1540 and the status variable is returned to the application program, in step 1550.

A straightforward extension of the invalidate_record function which could be implemented by one skilled in the art would be to update one or more objects which depend on the record_id parameter instead of invalidating them.

Step 1099 represents other commands which the cache manager might process.

Those skilled in the art will appreciate that there are numerous extensions and variations within the scope and spirit of the present invention. For example, one variation is to allow the cache manager 1 to preserve and update the OIB 10 (FIG. 2) for an object 6 both before the object 6 is ever cached and after the object 6 has been removed from the cache. Using this approach, it would not be necessary to delete the record list 11 for an object 6 and remove the object 6 from all object lists 8 when the object 6 is removed from the cache. That way, dependency information could be preserved and even updated while the object 6 is not in the cache.

Another variation would be to allow the cache manager 1 to maintain and update a hash table entry 25 for a record both before any objects are added to the object list 8 and after the object list 8 becomes empty. In other words before the cache manager is aware of any dependency on the record and after all dependencies on the record which the cache manager is aware of become obsolete. This would be particularly valuable if hash table entries 25 include other information in addition to record ID's 12 and object lists 8.

Alternative Embodiment

Figure 12A:
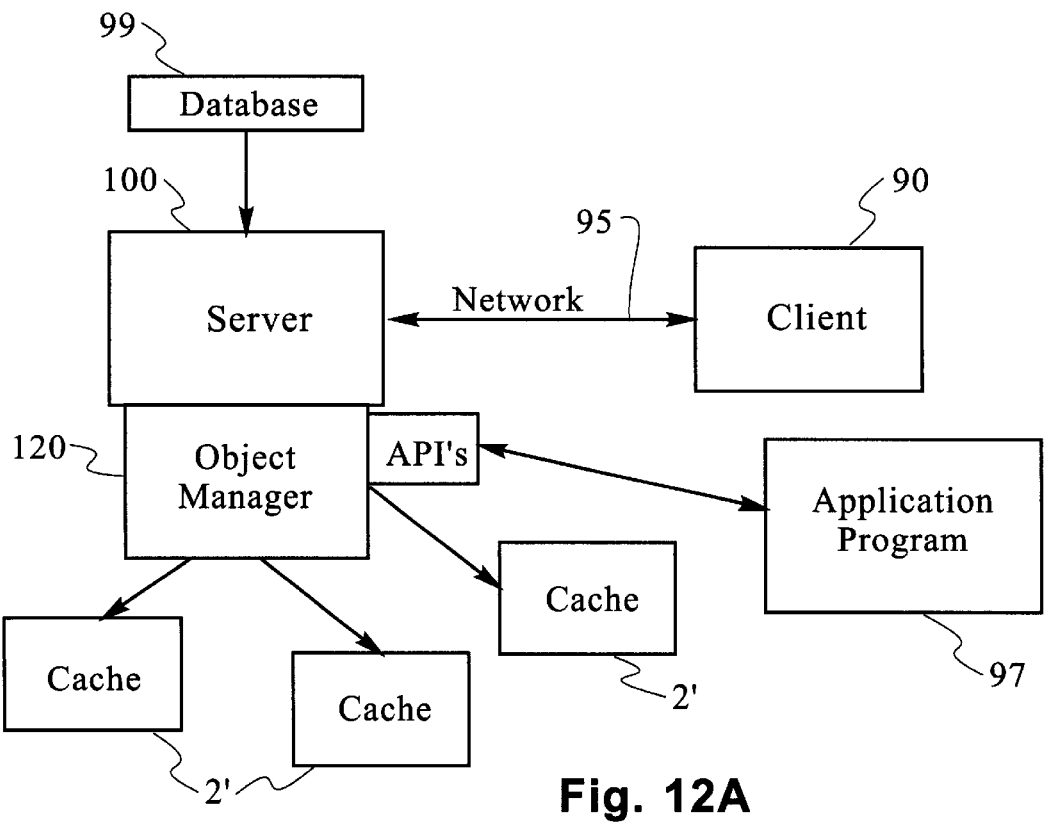
FIG. 12a depicts another example of a system having features of the present invention.
Figure 12B:
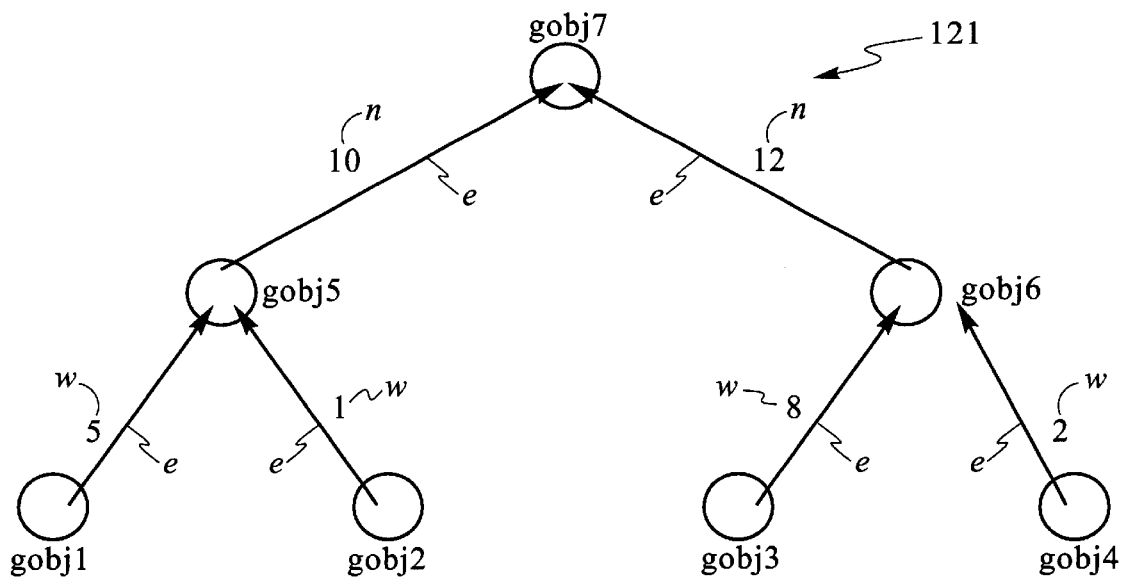
FIG. 12b depicts another example of an object dependence graph having features of the present invention.

FIG. 12a depicts another example of a system having features of the present invention. In this as well as the previous embodiment, the present invention can be used for improving the performance of server applications in a conventional client-server environment. One skilled in the art could easily adapt the present invention for other applications which are not client-server based as well. As depicted, a client-server architecture wherein a client 90 communicates with a server 100 over a network 95. A server 100 maintains one or more caches 2'. As is conventional, the server 100 uses the caches 2' to improve performance and lessen the CPU time for satisfying client 90 requests. Although FIG. 12a shows the caches 2' associated with a single server, the caches 2' could be maintained across multiple servers as well.

An application running on the server 100 creates objects and then stores those objects on one or more caches 2'. The system can also be architected such that the source of the underlying data in the database 99 and the cache 2' are geographically separated. In this embodiment, an object is data which can be stored in one or more caches 2'. The objects can be constructed from underlying data stored on a database 99. Underlying data include all data in the system which may affect the value of one or more objects. Underlying data are a superset of all objects in the system.

According to the present invention, the object manager 120 is preferably embodied as computer executable code ("program") tangibly embodied in a computer readable medium for execution on a computer such as the server 100 (or client 90). The object manager 120 helps determine how changes to underlying data affect the values of objects in the caches 2'. Although FIG. 12a shows the object manager residing on a single server, it could be distributed across multiple servers as well. The object manager 120 is preferably a long running process managing storage for one or more caches 2'. The term cache is very generic and can include any application (e.g., a client 90 application) in addition to caches in the conventional sense. One skilled in the art could easily adapt the present invention for an object manager which is one of the following:

1. Multiple distinct processes, none of which overlap in time; and
2. Multiple distinct processes, some of which may overlap in time. This includes multiple concurrent object managers so designed to improve the throughput of the system.

FIG. 12b depicts an example of an object dependence graph 121 having features of the present invention. The object dependence graph 121 (abbreviated by G) represents the data dependencies between graph objects gobj1 . . . gobjn. Here, gobj1, . . . , gobj7 represent different graph objects and the edges e in the graph represent data dependencies. For example, the edge from gobj1 to gobj5 indicates that if gobj1 has changed, then gobj5 has also changed. The weight w of the edge is an indication of how much a change to an object, which is the source of an edge, affects the object which is the target of the edge. For example, a change to gobj1 would imply a more significant change in gobj5 than a change in gobj2. This is because the weight w of the edge e from gobj1 to gobj5 is 5 times the weight w of the edge e from gobj2 to gobj5.

The object manager 120 is responsible for maintaining the underlying data structures which represent object dependence graphs (see FIGS. 12a–c and 16). Application programs communicate the structure of object dependence graphs to the object manager via a set of APIs (see FIG. 18a). The application also uses APIs to notify the object manager of underlying data which have changed. When the object manager 120 is notified of changes to underlying data, it must determine which other objects have changed and notify the caches 2' of the changes. It determines which other objects have changed by following edges in the object dependence graph (see FIG. 21).

For example, suppose that the object manager 120 is told that gobj1 has changed. By following edges in the object dependence graph 121 from gobj1, it determines that both gobj5 and gobj7 have also changed. As another example, suppose that the object manager is told that gobj7 has changed. Since there are no edges in the object dependence graph for which gobj7 is the source, the object manager concludes that no other objects are affected.

Figure 12C:
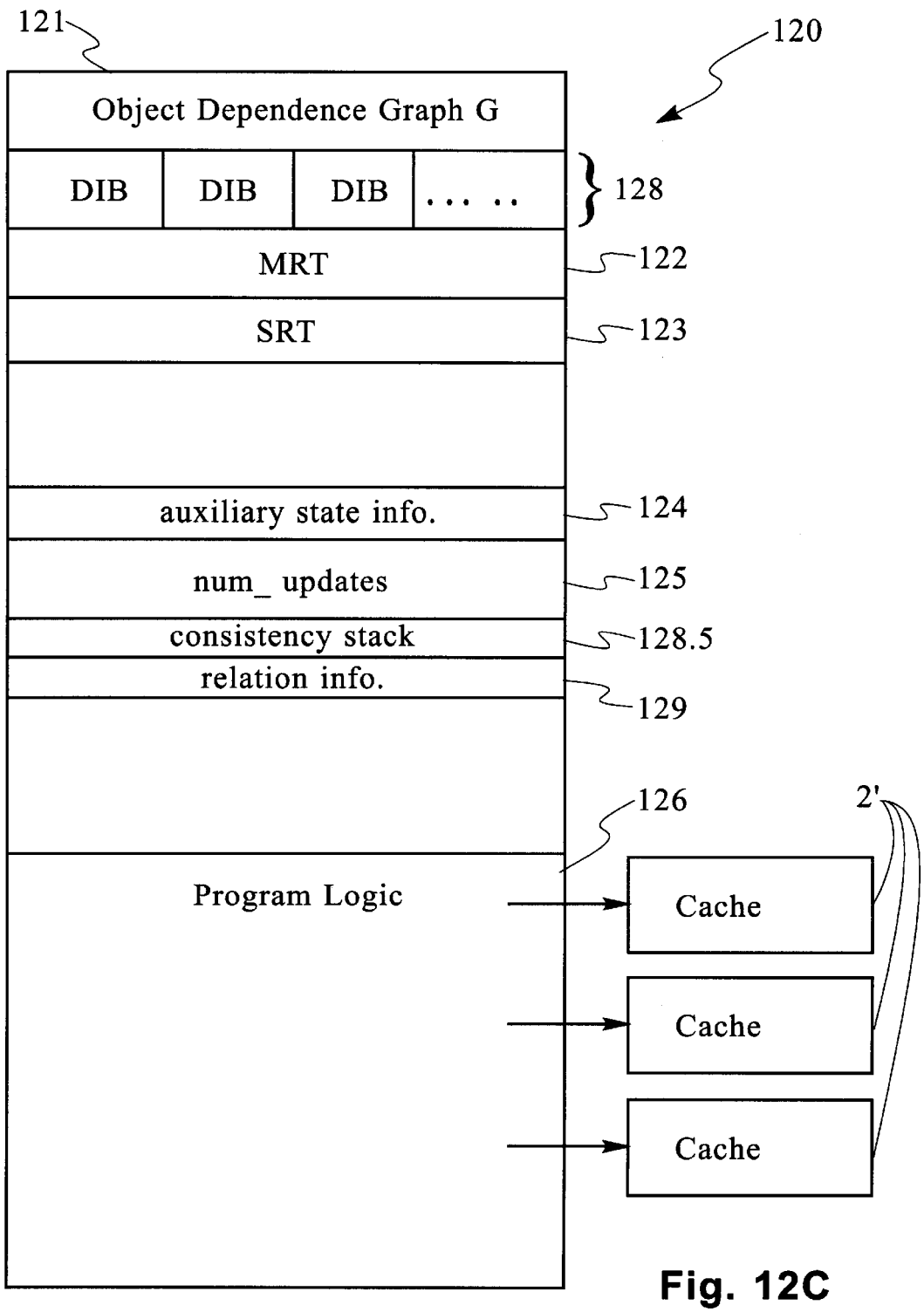
Figure 12D:
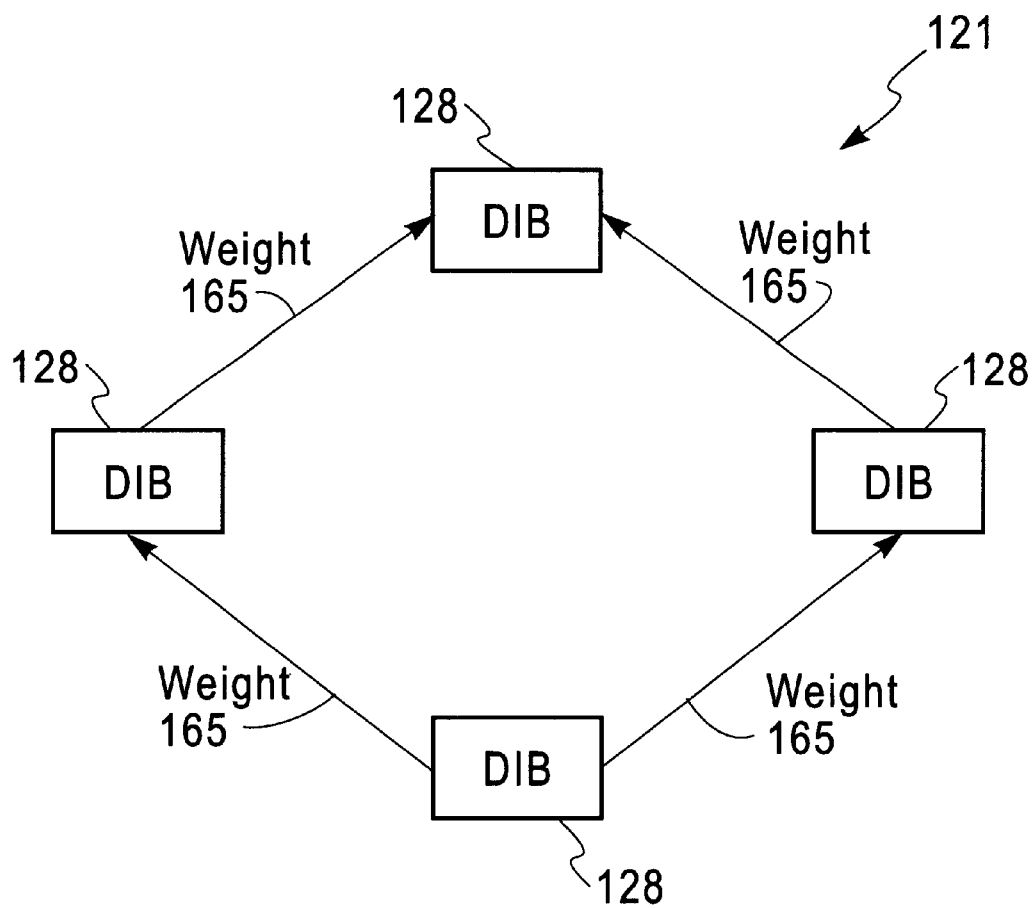
FIG. 12d is another depiction of an object dependence graph having features of the present invention.

FIG. 12c depicts an example of an object manager 120 having features of the present invention. As depicted, the object manager 120 includes several storage areas:

1. The object dependence graph G 121 (see FIG. 12*d*) which is implemented by multiple dependency information blocks (DIBs) 128. Those skilled in the art will appreciate that the DIBs can be stored using a variety of data structures. Preferably, conventional hash tables are used wherein the DIBs are indexed by object_ids 160. Hash tables are described, for example, in "The Design and Analysis of Computer Algorithms", Aho, Hopcroft, Ullman, Addison-Wesley, 1974.
  2. The multiple record tree (MRT) 122 (see FIGS. 27–28).
  3. The single record tree (SRT) 123 (see FIGS. 27–28).
  4. Auxiliary state information 124 which includes but is not limited to the following:
    a. num_updates 125: a counter num_updates 125, maintained by the object manager for tracking the number of updates the object manager has propagated through the graph.
    b. consistency stack 128.5 : Used for maintaining consistency during updates.
      c. relation info 129 (see FIGS. 27–28).
  5. program logic 126.

Figure 13:
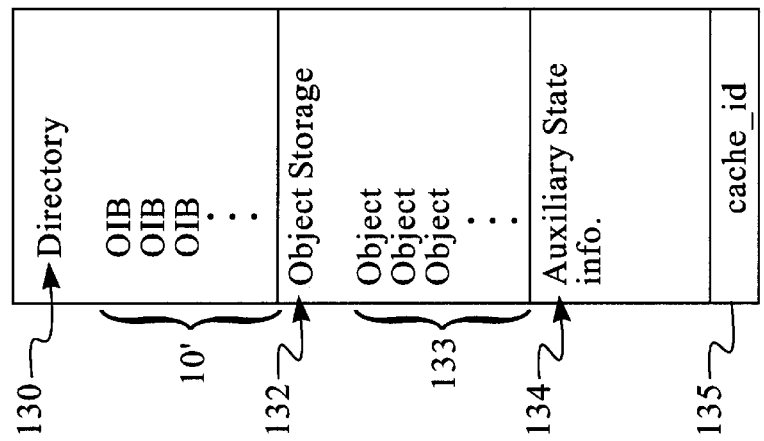
FIG. 13 depicts an example of a cache used in accordance with an embodiment of the present invention.

FIG. 13 depicts an example of the storage areas maintained by each cache 127. Each cache has a cache_id 135 field which identifies it. There are 3 main storage areas:
  1. Directory 130: Maintains information about objects. The directory 130 includes multiple object information blocks (OIBs) 10'. Information about an object may be retained in an OIB 10' (FIG. 14) after the object leaves the cache. Those skilled in the art will appreciate that the OIBs can be stored using a variety of data structures. Preferably, conventional hash tables are used wherein the OIBs are indexed by objec_id's 160.
  2. Object storage 132: Where objects contained in the cache are stored.
  3. Auxiliary state information 124: Includes other state information, e.g., the cache_id 135.

Figure 14:
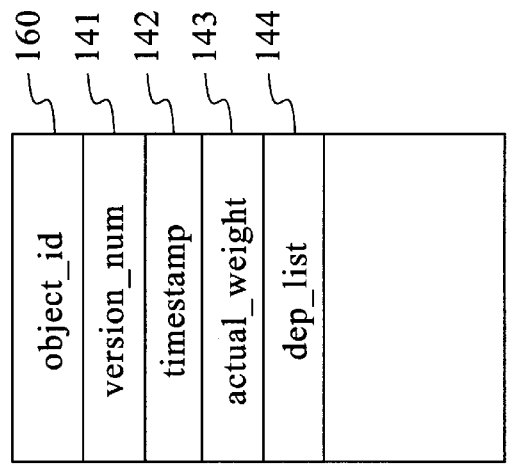
FIG. 14 depicts an example of an object information block (OIB) used in accordance with the present invention.

FIG. 14 depicts an example of an OIB 10'. The OIB preferably includes the following: object_id 160: assume for the purposes of the following discussion that an object has an object_id o1;
  version_num 141: allows the object manager to uniquely identify different versions of the same object;
  timestamp 142: a number which indicates how recently the object was calculated;
  actual_weight 143: the sum of the weights of all edges to o1 from a graph object o2 such that the cached version of o1 is consistent with the current version of o2; and
  dep_list 144: a list representing dependencies to the object o1.

Figure 15:
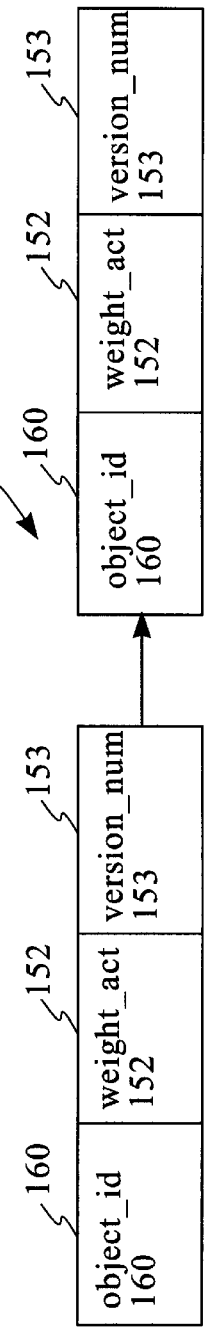
FIG. 15 depicts an example of a dependency list used in accordance the present invention.
Figure 16:
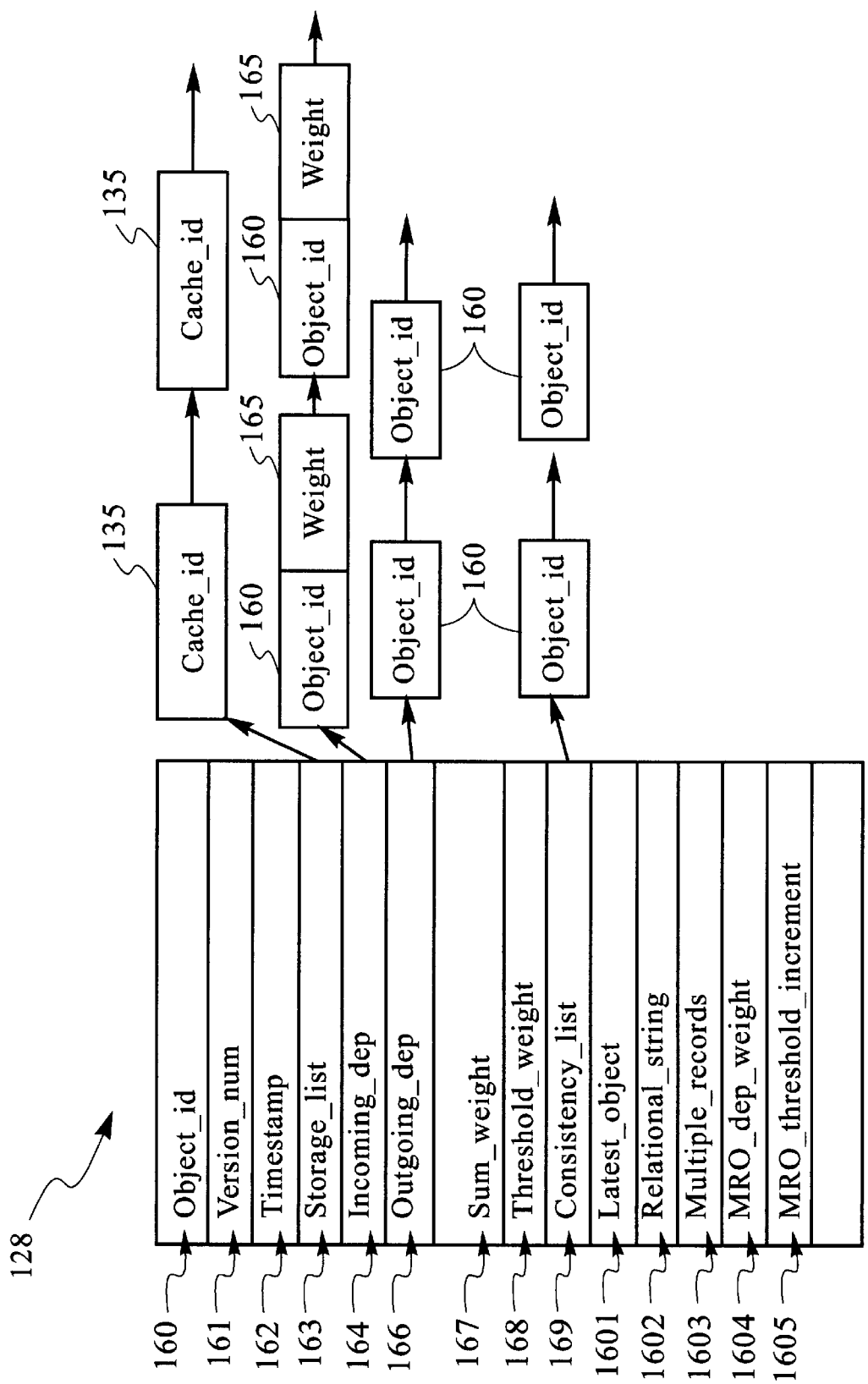
FIG. 16 depicts an example of a dependency information block (DIB) used in accordance with the present invention.

FIG. 15 depicts an example of a dep_list 144 element. As depicted, each list preferably includes:
  object_id 160: represents a graph object o2 which has a dependency edge to o1, i.e., o2 is the source and o1 the target;
  weight_act 152: a number representing how consistent the most recent version of o2 is with the cached version of o1. The preferred embodiment uses values of 0 (totally inconsistent) or the weight 165 (FIG. 16) for the corresponding edge in the dependency information block (DIB) 128 (see FIG. 16) (totally consistent). A straightforward extension would allow values in between these two extremes to represent degrees of inconsistency; and
  version_num 153: the version_num of o2 which is consistent with the cached version of o1;

FIG. 16 depicts an example of the dependency information block (DIB) 128 of FIG. 12. As depicted, the DIB 128 preferably includes the following fields:
  object_id 160: used by the application program to identify the graph object. Assume for the purposes of the following discussion that a graph object has an object_id o1;
  version_num 161: version number for the current version of the graph object;
  timestamp 162: timestamp for the current version of the graph object;
  storage_list 163 (for graph objects which are objects): list of cache_id's for all caches containing the object;
  incoming_dep 164: list of (object_id 160, weight 165) pairs for all graph objects o2 with dependency edges to o1. The weight 165 represents the importance of the dependency. For example, higher numbers can represent more important dependencies;
  outgoing_dep 166: list of all object_id's for which there exists a dependency edge originating from o1;
  sum_weight 167: the sum of the weights of all dependency edges going into o1;
  threshold_weight 168 (for graph objects which are objects): number representing when an object should be considered highly obsolete. Whenever the actual_weight 143 field in an OIB 10' (FIG. 14) falls below the threshold_weight 168 field for the object, the object is considered to be highly obsolete and should be invalidated or updated from the cache;
  consistency_list 169 (for graph objects which are objects): a list of object_id's 160 corresponding to other objects which must be kept consistent with the current object. Preferably, consistency is only enforced among objects within the same cache. A straightforward extension would be to enforce consistency of objects across multiple caches. Another straightforward extension would be one which required all objects on the list 169 to be in/out of the cache whenever the object_id is in/out of the cache;
  latest_object 1601 (for graph objects which are objects): a pointer to the latest version of the object, null if the object manager is unaware of such a copy. This field allows an object to be updated in multiple caches without recalculating its value each time;
  relational_string 1602: null if the graph object is not a relational object. Otherwise, this is of the form: relation_name (25, 30) for SRO's and relation_name (>=50) for MRO's. The following are only of relevance if relational_string 1602 is not null;
  multiple_records 1603: true if the graph object is a multiple record object (MRO), false if it is a single record object (SRO);

The following are only of relevance if multiple_records 1603 is true:
  mro_dep_weight 1604: the weight assigned to an implicit dependency from another relational object to o1; and
  mro_threshold_increment 1605: for each implicit dependency to o1, the amount the threshold_weight should be incremented.

Referring again to FIG. 12, the object manager preferably also maintains a counter num_updates 125 (initially zero) which tracks the number of updates the object manager has propagated through the graph. The object manager also maintains a data structure (initially empty) called the consistency stack 128.5 (FIG. 12*c*) which is used to preserve consistency among objects in caches.

The application program 97 preferably communicates with the object manager via a set of API functions. FIG. 17 depicts examples of several APIs in accordance with the present invention. Those skilled in the art will appreciate that other APIs can be implemented that are straightforward extensions in view of the present invention.

Figure 18:
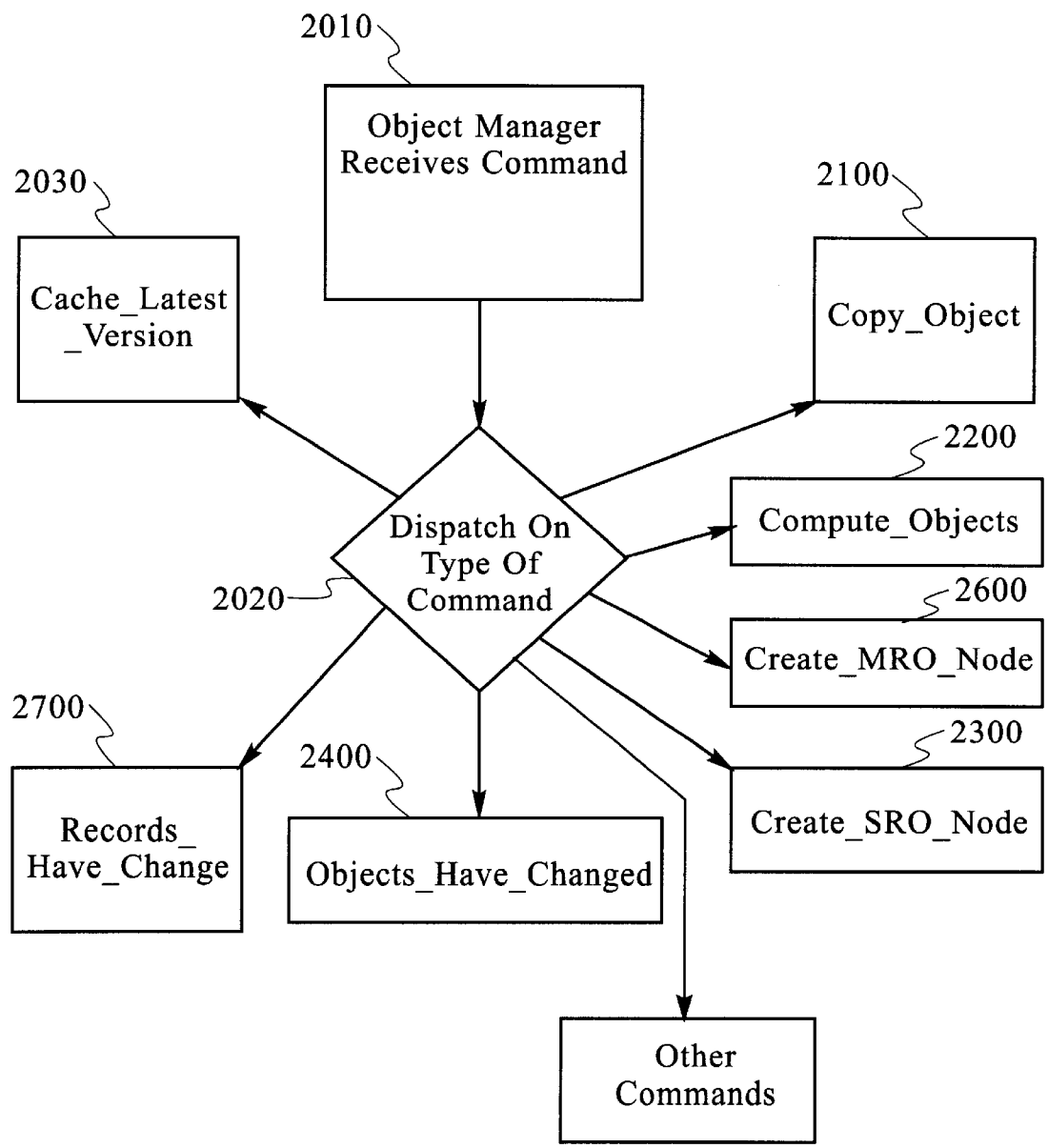
FIG. 18 depicts a block diagram of a method for implementing the API functions in FIG. 17.

FIG. 18 depicts an example of the object manager 120 logic for handling different API functions. These functions will be described in detail later. By way of overview, nodes in the object dependence graph G 121 can be created via the API call to the object manager: create_node (obj_id, initial_version_num, thresh_weight) 181. Dependencies between existing nodes in the graph can be created via the API call: add_dependency (source_object_id, target_object_id, dep_weight) 182. The consistency_list 169—corresponding to an object "obj_id"—can be set via the API call: define_consistency_list (obj_id, list_of_objects) 183. Nodes can be deleted from G via the API, delete_node (obj_id) 184. The API cache_latest_version (obj_id, cache) 185 adds the latest version of an object to a cache. The API copy_object (obj_id, to_cache_id, from_cache_id) 186 attempts to copy a version of an object from one cache to another cache. Objects are deleted from a cache via the API call: delete_object (obj_id, cache) 187.

An application program which changes the value of underlying data must inform the object manager. Two API calls for achieving this are: object_has_changed (obj_id) 188 where the obj_id parameter identifies a graph object; and objects_have_changed (list_of_objects) 189 where the list_of_objects parameter includes a list of (pointers to) graph objects.

A node corresponding to an SRO is created via the API call create_sro_node (obj_id, initial_version_num, thresh_weight, relation_name, list_of_attribute_values) 190.

MRO's are created via the API: create_mro_node (obj_id, initial_version_num, thresh_weight, relation_name, list_of_attribute_conditions, rel_default_weight, rel_default_threshold) 191.

The API compare_objects (obj_id, cache_id1, cache_id2) 192 can be used to determine how similar the versions of obj_id in cache_id1 and cache_id2 are. The API update_cache (cache) 193 ensures that all items in the cache are current. The API define_relation (relation_name, list_of_attributes) 194 identifies relations to the object manager. When one or more records change, the object manager can be informed of this via the APIs record_has_changed (relation_name, list_of_attribute_values) 195 and records_have_changed (relation_name, list_of_attribute_conditions) 196.

Nodes in the object dependence graph G 121 are created via the API call to the object manager: create_node (obj_id, initial_version_num, thresh_weight) 181. Those skilled in the art will appreciate that many additional APIs can be implemented in a straightforward manner within the spirit and scope of the present invention. For example, APIs can be added for modifying the object_id 160, version_num 161, and threshold_weight 168 fields after a node has been created.

Dependencies between existing nodes in the graph are created via an API call: add_dependency (source_object_id, target_object_id, dep_weight) 182.

Those skilled in the art will appreciate that many additional APIs can be implemented in a straightforward manner within the spirit and scope of the present invention. For example, APIs can also be added to delete dependencies and modify dependency weights.

The consistency_list 169—corresponding to an object "obj_id"—is set via an API call: define_consistency_list (obj_id, list_of_objects) 183. The consistency list for the obj_id is preferably not allowed to include the obj_id as a member. The APIs prevent this from occurring.

APIs can similarly be added within the spirit and scope of the present invention to modify the consistency lists 169 after their creation.

Changes to the dependency information block (DIB) 128 (FIG. 16) for an object, after an object has been cached may require updates to one or more caches 127. These are straightforward. In the event of a new dependency to a cached object o1 from a new graph object o2, the new dependence is obsolete if the object manager doesn't know when o2 was created, or the DIB timestamp 162 for o2>OIB timestamp 142 for o1. Nodes can be deleted from G via the API, delete_node (obj_id) 184.

Objects can be explicitly added to caches via the APIs: cache_latest_version (obj_id, cache) 185; and copy_object (obj_id, to_cache_id, from_cache_id) 186. These APIs create new OIB's 135 in the cache directory if they don't already exist for the object.

Figure 19:
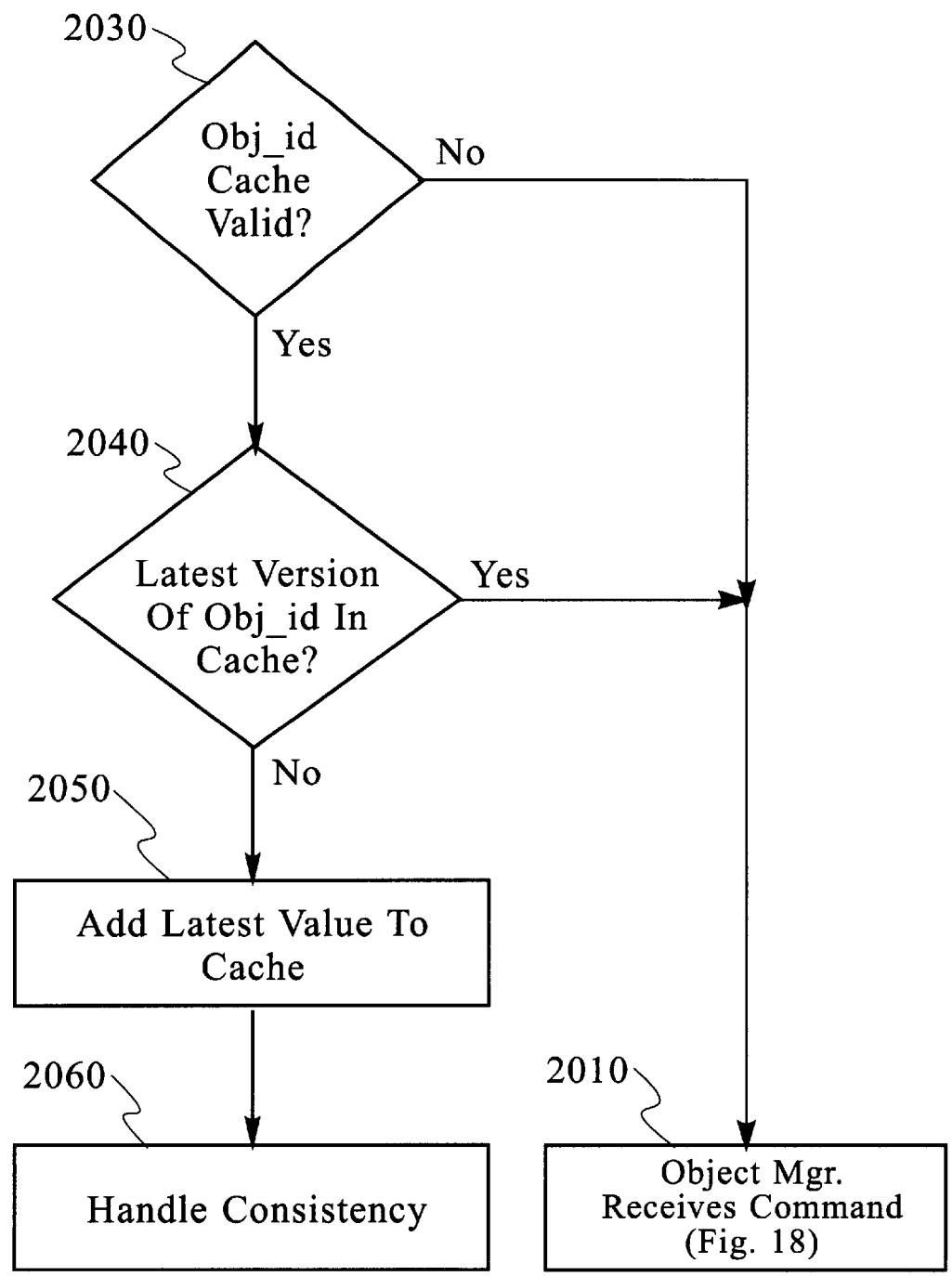
FIG. 19 depicts a block diagram of a cache API function which adds the latest version of an object to a cache.

FIG. 19 depicts an example of the API, cache_latest_version (obj_id, cache) 185. As depicted, in step 2030, it is verified that the obj_id and cache parameters specify existing objects and caches, respectively. If so, processing proceeds to step 2040. If not, an appropriate status message is returned and processing proceeds to step 2010. In step 2040, it is determined if the latest version of an obj_id is in the cache. If so, processing continues with step 2010. If not, in step 2050 an attempt is made to obtain the latest version of obj_id from the latest_object field 1601 in the dependency information block (DIB) 128 (FIG. 16). If this field is null, in step 2050, the latest value of obj_id (and possibly makes its value accessible through the latest_object field 1601 of the DIB) is calculated, and the version_num field 161 in the dependency information block (DIB) 128 (FIG. 16) is updated. In step 2050, either the new version of obj_id is recalculated entirely, or just portions of it, and the new parts merged with parts from existing versions. The latter method is often more efficient than the former.

An OIB 10' for obj_id is created in the directory 130 for the cache, if one doesn't already exist. If the cache previously contained no version of the obj_id, the cache is added to the storage_list 163 of obj_id. The version_num 141 and timestamp 142 fields of the OIB 10' (FIG. 14) are set to the version_num 161 and timestamp 162 fields of the dependency information block (DIB) 128 (FIG. 16). The actual_weight field 143 of the OIB 10' (FIG. 14) is set to the sum_weight field 167 of the DIB. For each (o2, weight_act, version_num) triplet belonging to the dep_list 144 of the OIB 10' (FIG. 14), the weight_act 152 is set to the weight 165 for the corresponding edge on the incoming_dep 164 of the DIB. The version_num 153 is set to the version_num 161 field contained in the DIB for o2. In step 2060, it is insured that consistency is preserved. This function recursively insures that all noncurrent objects obj2 on the consistency list 169 for obj_id are updated or invalidated whenever the timestamp 142 in the OIB 10' for obj2 is before the timestamp 162 in the DIB 128 for obj_id. If any such objects obj2 are updated in this process, a similar procedure is applied recursively to the consistency lists 169 for each said obj2. The ordering of Steps 2050 and 2060 is not critical to the correctness of this embodiment.

Figure 20:
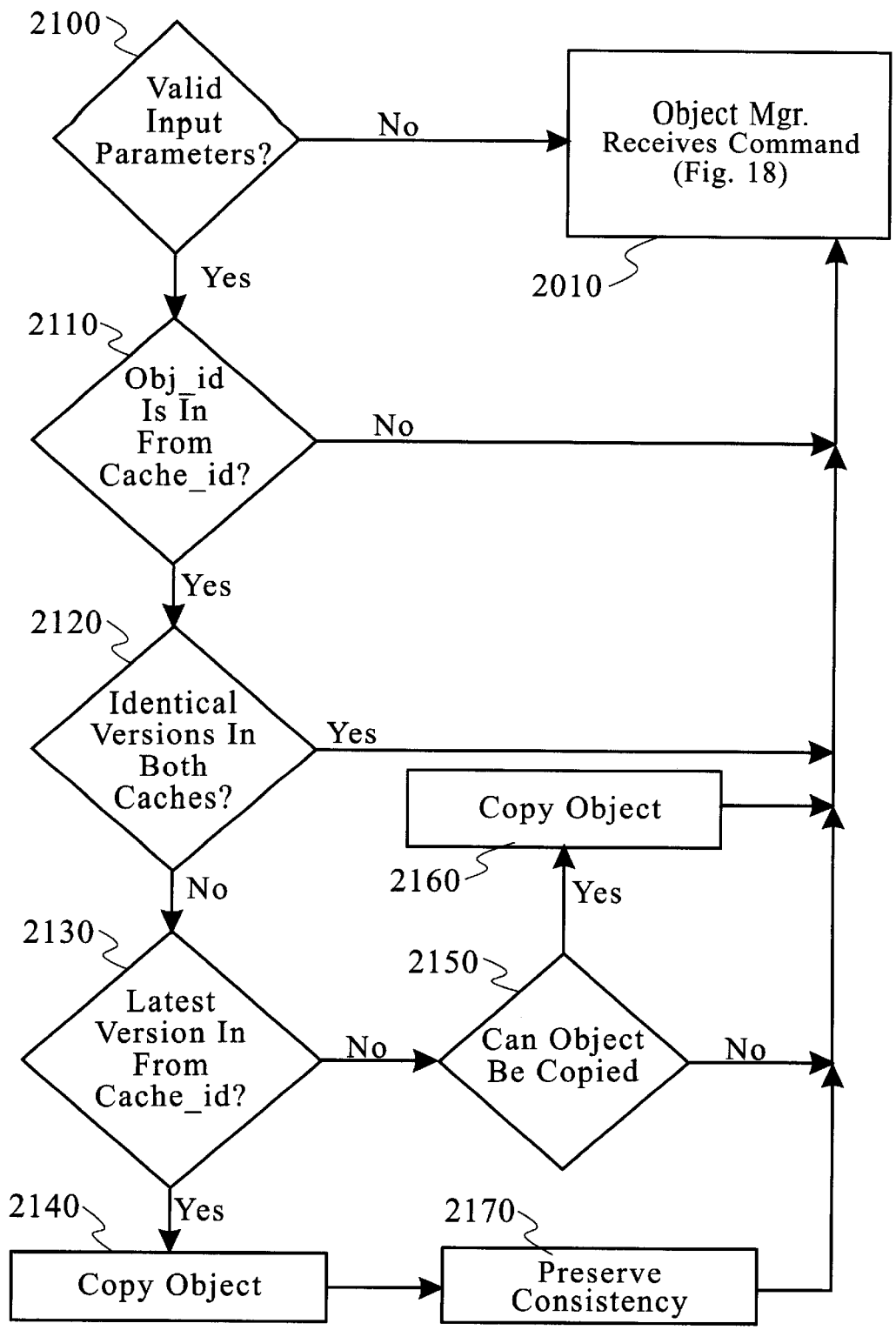
FIG. 20 depicts a block diagram of an API function which attempts to copy a version of an object from one cache to another.

FIG. 20 depicts an example of the API, copy_object (obj_id, to_cache_id from_cache_id) 186. As depicted, in step 2100 it is verified that the obj_id, to_cache_id, and from_cache_id parameters are all recognized by the object manager. If so, in step 2110 it is determined if from_cache_ id has a copy of obj_id. If not, nothing happens and processing proceeds to step 2010. A status variable is set appropriately for this (and other cases as well) and is returned to the application program to indicate what happened. Otherwise, processing continues to step 2120, in which it is determined if to_cache_id and from_cache_id include identical versions of obj_id. If so, no copying needs to take place, and processing continues to step 2010. Otherwise, step 2130 determines if from_cache_id contains the latest version of the obj_id. If so, in step 2140, the object is copied to the object storage 132 area of to_cache_id and the cache directory 130 is updated. An OIB 10' for obj_id is created in the directory 130 for to_cache_id if one doesn't already exist. If to_cache_id previously contained no version of obj_id, to_cache_id is added to the storage_list 163 of obj_id. In step 2170, consistency is preserved by insuring that all noncurrent objects on consistency lists 169 with OIB time stamps 142 prior to the DIB timestamp 162 of obj_id are either updated or invalidated. Otherwise, if the result of step 2130 is negative, in step 2150 the object will not be allowed to be copied unless: (1) all objects on the consistency list 169 for obj_id for which noncurrent versions are stored in to_cache_id have the same timestamp 142 as the timestamp 142 for the version of obj_id in from_cache_id; and (2) all objects on the consistency list 169 for obj_id for which current versions are stored in to_cache_id have the same or earlier timestamp 142 as the timestamp 142 for the version of obj_id in from_cache_id. If these conditions are satisfied, in step 2160 obj_id is copied from from_cache_id to to_cache_id.

An OIB 10' for the obj_id is created in the directory 130 for to_cache_id if one doesn't already exist. If to_cache_id previously contained no version of obj_id, to_cache_id is added to the storage_list 163 of obj_id.

A straightforward extension to the copy_object and cache_latest_version APIs would be flags which could prevent an object from being stored if other objects on the consistency list would also need to be updated. Another straightforward extension would be additional flags which would only place the object_id in a cache if the cache did not include any version of the object_id.

Another straightforward extension would be a system where the object manager maintained all previous versions of an object. We could then have APIs for adding a specific object identified by a particular (object_id, version_num) pair to a cache.

Objects are deleted from a cache via the API call: delete_object (obj_id, cache) 187. One skilled in the art will appreciate that it is straightforward to implement this function in accordance with this detailed description. An example of a function performed by this API call is the removal of cache from the storage_list field 163 of the dependency information block (DIB) 128 (FIG. 16) for the object identified by obj_id.

An application program which changes the value of underlying data must inform the object manager. Two API calls for achieving this are: object_has_changed (obj_id) 188 where the obj_id parameter identifies a graph object; and objects_have_changed (list_of_objects) 189 where the list_of_objects parameter includes a list of (pointers to) graph objects.

If the graph objects on list_of_objects affect many other graph objects in common, the objects_have_changed API will be more efficient than invoking the object_has_changed API, once for each graph object on a list.

Figure 21:
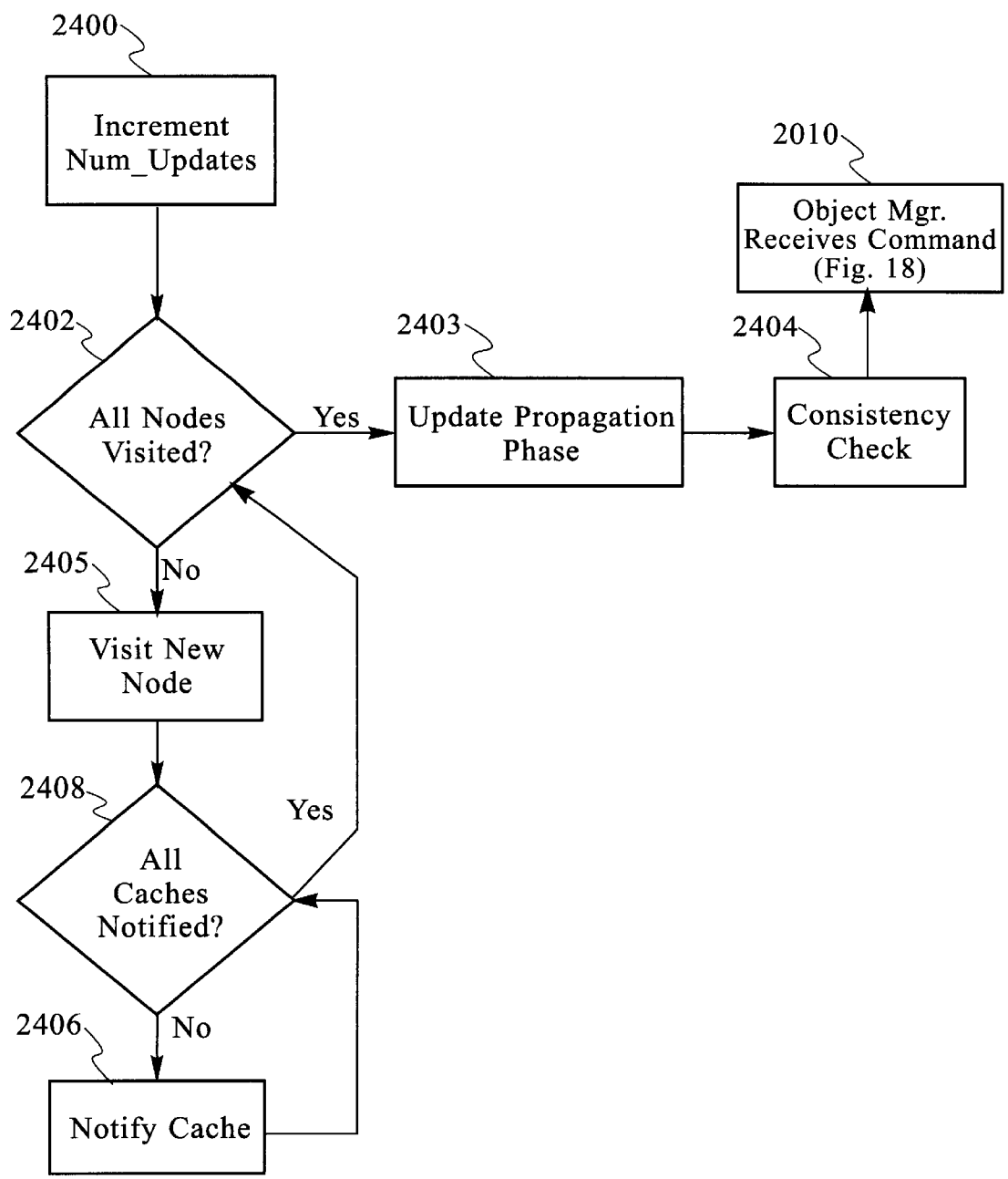
FIG. 21 depicts a block diagram of an API function which may be invoked when underlying data change.

FIG. 21 depicts an example of the API, objects_have_changed (list_of_objects) 189. Those skilled in the art will appreciate that it is straightforward to then implement the API, object_has_changed (obj_id).

For ease of exposition, we assume that each element of list_of_objects corresponds to a valid node in G and that no two elements on the list_of_objects refer to the same node. It would be straightforward to adapt this function from the detailed description for situations where this is not the case. As depicted, in step 2400 increment the counter num_updates 125 (FIG. 12c) by 1. In step 2402, it is determined if all nodes corresponding to the graph objects specified by the list_of_objects parameter have been visited. If so, in step 2403, the update propagation phase (see FIG. 22) is followed, in step 2404, by the consistency check phase (see FIG. 26). If not, in step 2405, a new node corresponding to a graph object on the list_of_objects is visited. Let obj_id be the object_id 160 for the node. The object manager increments the version_num field 161 in the dependency information block (DIB) 128 (FIG. 16) for obj_id by 1 and sets the timestamp field 162 to the value of num_updates 125. Steps 2406 and 2408 represent a loop which notifies each cache c1 containing obj_id (obtained from storage_list 163) to update or invalidate its version of obj_id. In step 2406, a function update_or_invalidate (c1, obj_id) (see FIG. 25) is invoked to cause this to happen.

Those skilled in the art will appreciate that it is straightforward to apply selectivity in step 2406 in deciding which caches must update or invalidate their copies of obj_id.

Figure 25:
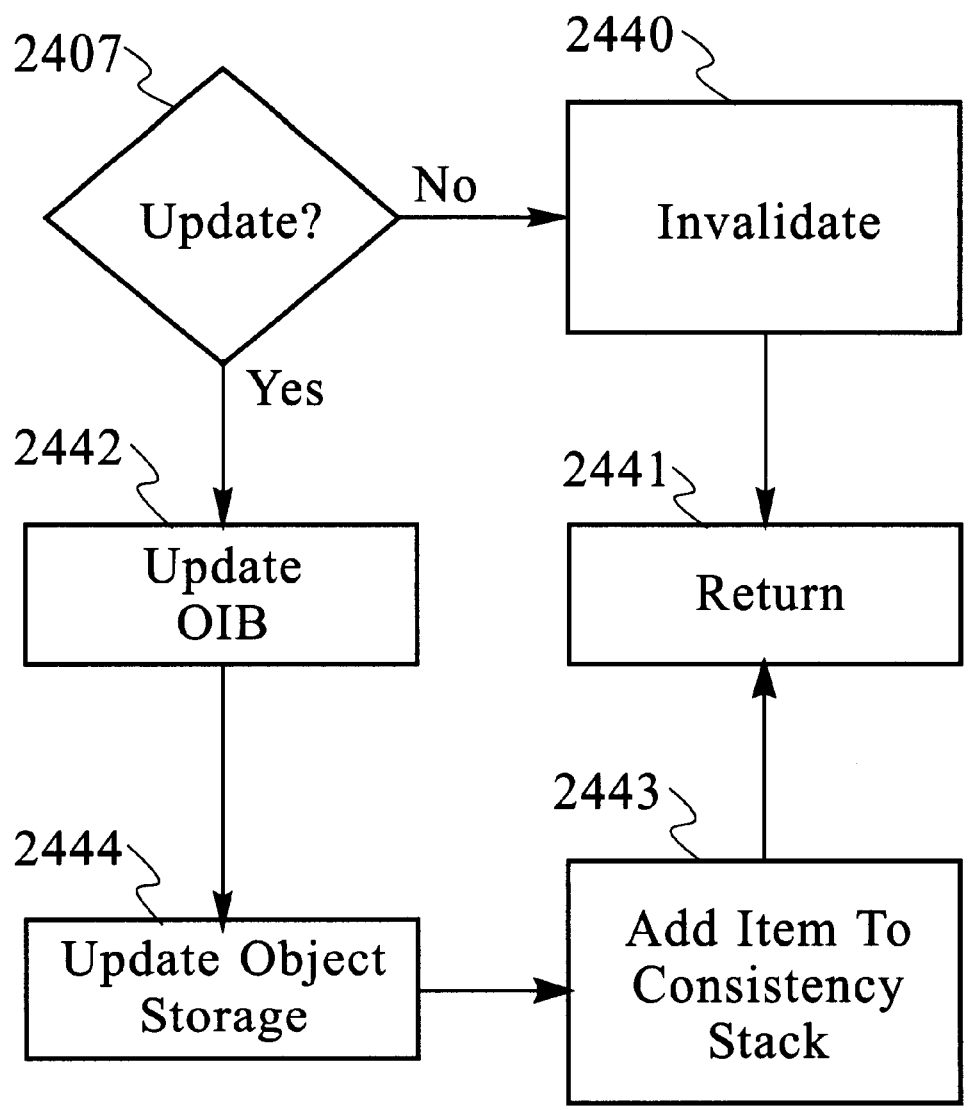
FIG. 25 depicts a block diagram of part of a method for updating or invalidating a cached version of an object in response to changes to underlying data.

FIG. 25 depicts an example of the update_or_invalidate (cacheid, objectid) logic. It is called whenever the version of objectid currently in cacheid must either be updated or invalidated (see e.g., step 2406, FIG. 21). As depicted, in step 2407 it is determined whether the objectid should be updated in the cacheid. If the answer is no, the objectid is invalidated from the cache in step 2440 and the procedure returns, in step 2441. If the answer is yes, in step 2442 the following changes are made to the OIB 10' (FIG. 14) for objectid:

1. The version_num 141 and timestamp 142 fields are set to the current version_num 161 and timestamp 162 fields contained in the dependency information block (DIB) 128 (FIG. 16).

2. The actual_weight field 143 is set to the sum_weight field 167 in the DIB.

3. The dep_list 144 (FIG. 15) is updated. Each member of the list 144 corresponds to a graph object o2 which has a dependency to the object identified by objectid. The weight_act 152 is set to the weight 165 field in the dependency information block (DIB) 128 (FIG. 16) corresponding to the same edge in G if these two quantities differ. In addition, version_num 153 is set to the version_num field 161 contained in the DIB for o2 if these two quantities differ.

In step 2444, the actual value of objectid contained in the object storage area 132 is updated. First, an attempt is made to obtain the updated version of objectid from the latest_object field 1601 in the dependency information block (DIB) 128 (FIG. 16). If this succeeds, step 2444 is over. If this fails (i.e., this pointer is nil), the updated version of objectid is calculated, e.g., by either calculating the new version of objectid entirely or just recalculating portions of it and merging the new parts with parts from existing versions. The latter method is often more efficient than the former. In either case, the object manager then has the option of updating the latest_object field 1601 in the DIB so that other caches which might need the latest version of the objectid can simply copy it instead of recalculating it.

In some cases, in step 2444 the actual value of the objectid can be updated with a later version of the objectid, preferably the latest easily accessible one (which would generally be the cached version with the highest version_num 141) which is not actually current. This is advantageous if calculating the current value of objectid is prohibitively expensive. Preferably, this type of update would not be allowed if either of the following are true:

1. the objectid is one of the objects on the list passed to objects_have_changed (list_of_objects); or
2. For the later version of objectid, it is still the case that actual_weight 143<threshold_weight 168.

Figure 26:
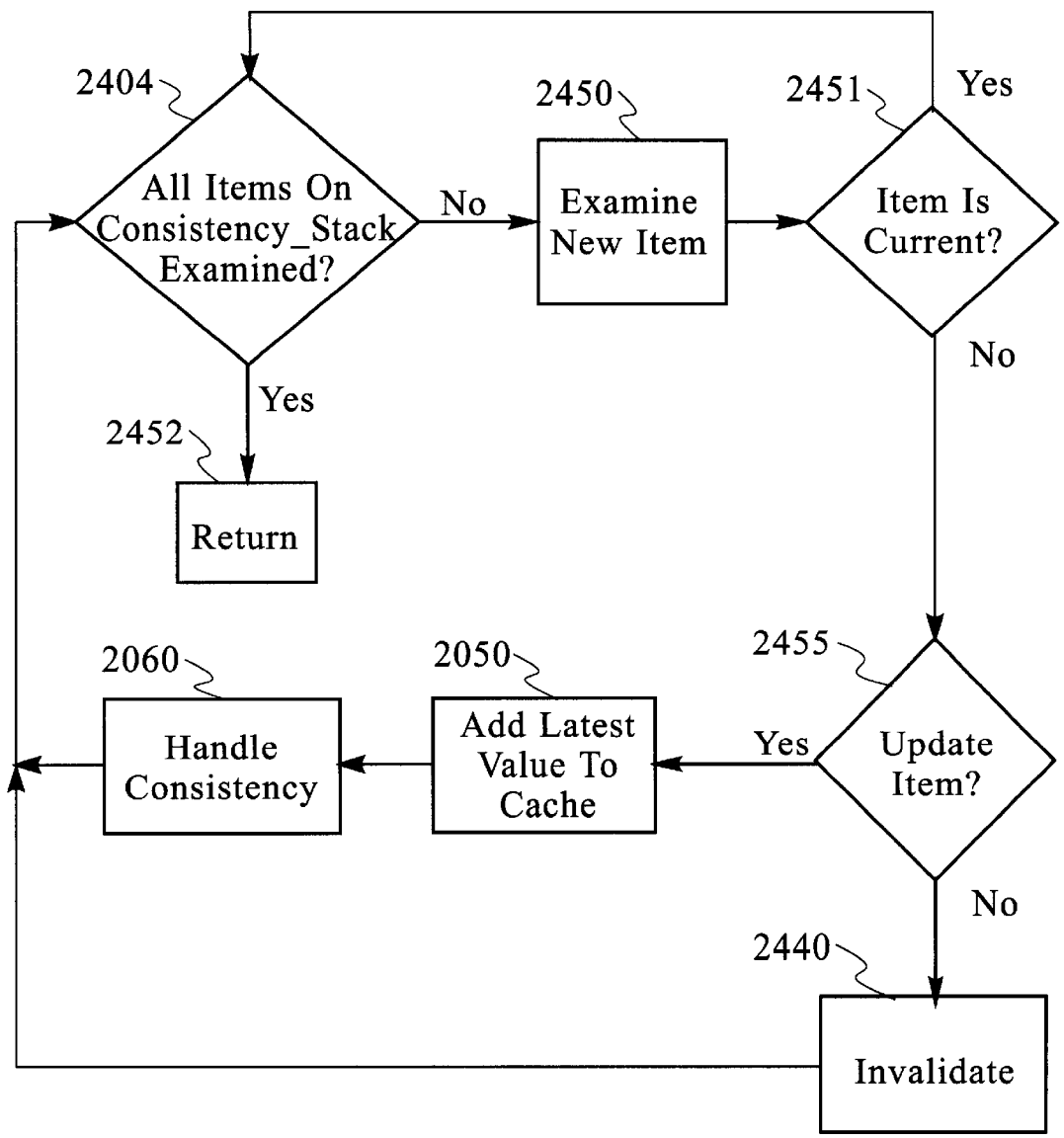
FIG. 26 depicts a block diagram of part of a method for maintaining consistency when one or more objects are added to one or more caches in response to changes to underlying data.

In step 2443, (object_id 160, cacheid) pairs are added to the consistency stack 128.5 (FIG. 12) for each object on the consistency_list 169 which is in the cache identified by cacheid. The object manager 120 makes sure that all cached items on the consistency stack 128.5 are consistent in the consistency check phase (FIG. 26).

The consistency stack could be implemented in several fashions; two possible structures are lists and balanced trees (Reference: Aho, Hopcroft, Ullman). Lists have the advantage that insertion is constant time. The disadvantage is that duplicate copies of items could end up on them. Trees have the advantage that no duplicate items need be stored. The disadvantage is that insertion is O(log(n)), where n is the number of items on the consistency stack.

Step 2443 may optionally apply more selectivity before adding an object to the consistency stack. Let object_id2 be an object on the consistency list 169 which is in cacheid. If cacheid contains a current version of object_id2, (object_id2, cacheid) doesn't have to be added to the consistency stack. The version is current if both of the following are true:

1. The vertex corresponding to object_id2 has already been visited in processing the current call to objects_have_changed (list_of_objects) 189. This is true if and only if the timestamp field 162 in the dependency information block (DIB) 128 (FIG. 16) for object_id2 is equal to num_updates 125; and
2. The version_num field 141 in the OIB 10' (FIG. 14) and 161 in the DIB for object_id2 are the same.

If step 2443 determines that both (1) and (2) are true, (object_id2, cacheid) is not added to the consistency stack. If (1) is true but (2) is false, step 2443 could recursively invoke update_or_invalidate on object_id2 and cacheid which would obviate the need for adding (object_id2, cache_id) to the dependency stack.

One skilled in the art could easily implement Steps 2442, 2443, and 2444 in any order or in parallel from the description.

Figure 22:
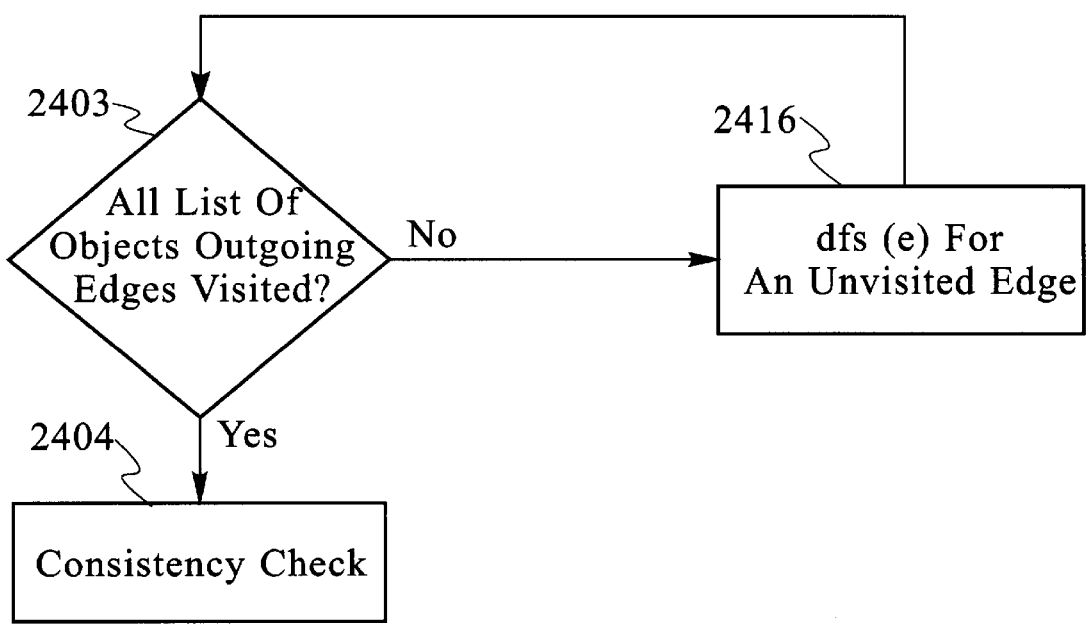
FIG. 22 depicts a block diagram of part of a method for propagating changes through the object dependence graph in response to changes to underlying data.

FIG. 22 depicts an example of the update propagation phase for objects_have_changed (list_of_objects) 189. The basic function performed by Steps 2403 and 2416 is to traverse all edges of the graph G accessible from the list_of_objects. The preferred technique is analogous to a depth-first search ("dfs") (reference: Aho, Hopcroft, Ullman). However, one skilled in the art could easily adapt the technique to work with other graph traversal methods such as a breadth-first search.

Figure 23:
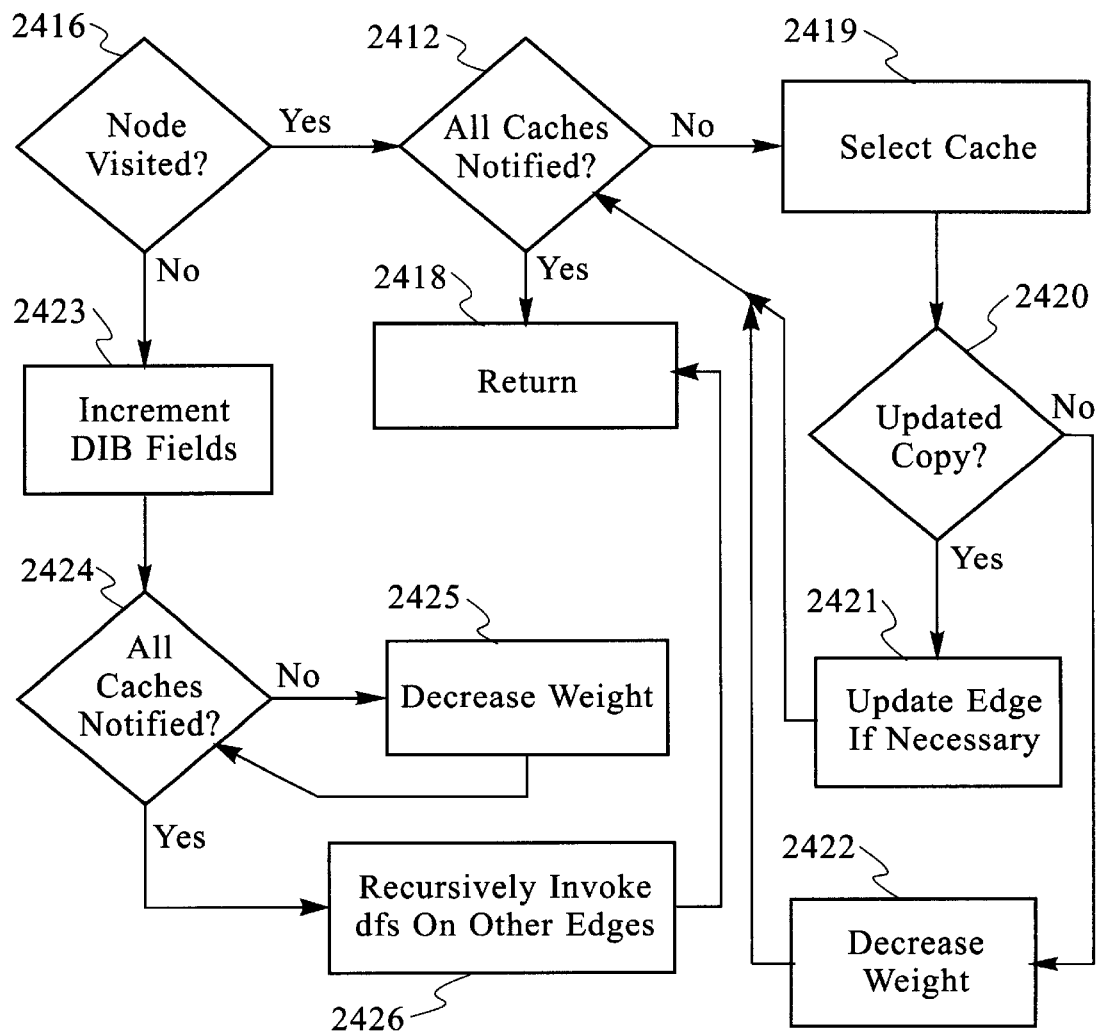
FIG. 23 depicts a block diagram of part of a method for propagating changes through the object dependence graph in a depth-first manner in response to changes to underlying data.

FIG. 23 depicts an example of a part of a method for propagating changes through the object dependence graph in a depth first manner, in response to changes to underlying data (dfs). Suppose an edge from a first node obj1 to a second node obj2 has just been traversed. In step 2416, it is determined if the node obj2 has been visited yet. The answer is yes if and only if the timestamp 162 (FIG. 16) for obj2=num_updates 125 (FIG. 12).

If the result from step 2416 is true, processing continues at step 2417. This step is part of a loop where all caches on storage_list 163 (FIG. 16) are examined to see if they include a copy of obj2. Recall that each object preferably has an object_id field and a version_number field. The object_id field corresponds to something which an application program would use to identify the object (e.g., the URL), while the version_number field allows multiple objects with the same object_id to be maintained and uniquely identified. For each such cache cacheid, in step 2420 it is determined if the version of obj2 is current by comparing the version_num field 141 in the OB 10' (FIG. 14) with the version_num field 161 in the dependency information block (DIB) 128 (FIG. 16). If the result from step 2420 is affirmative, in step 2421 it is ensured that on the dep_list 144 for obj2, the element corresponding to obj1 has a version_num 153=version_num 161 in the DIB for obj1.

Figure 24:
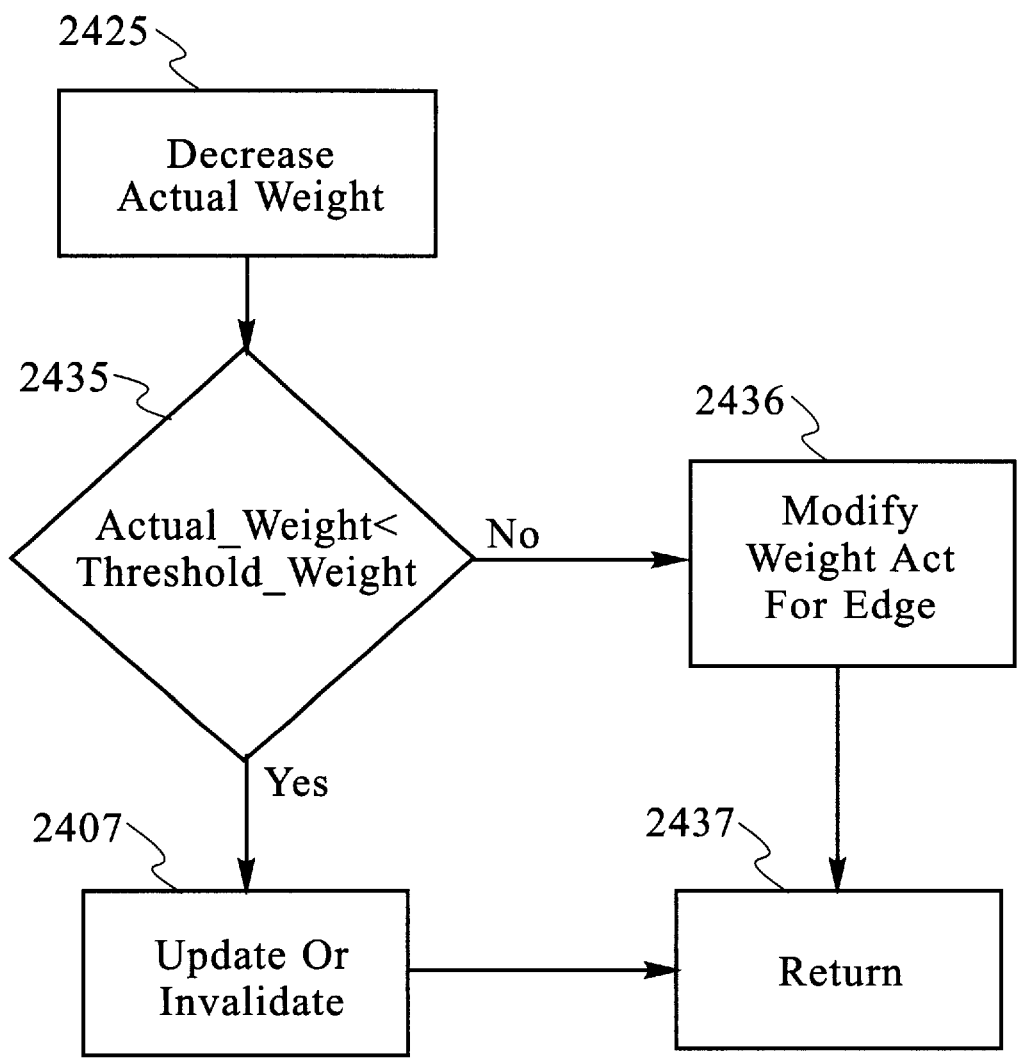
FIG. 24 depicts a block diagram of part of a method for propagating changes to a specific graph object in response to changes to underlying data.

If the result from step 2420 is negative, i.e., the version of obj2 is not current, a function decrease_weight (cacheid, obj1, obj2) is invoked (See FIG. 24). Recall that each edge can have a non negative number associated with it known as the weight which represents the importance of the data dependence. For example, high numbers can represent important dependencies, while low numbers represent insignificant dependencies. Recall also that objects can also have a value known as the threshold_weight associated with them. Whenever the sum of the weights corresponding to incoming data dependencies which are current falls below the threshold_weight, the object is considered to be highly obsolete. Such objects should be updated or invalidated for applications requiring recent versions of objects.

If the result of step 2416 is false, in step 2423 the version_num field 161 for obj2 is incremented and the timestamp field 162 is set to num_updates 125 (FIG. 12) which indicates that obj2 has been visited. Step 2424 is part of a loop where all caches which on the storage_list 163 are examined to see if they include a copy of obj2. For each such cache cacheid, in step 2425 the decrease_weight (cacheid, obj1, obj2) function is invoked. After this loop exits, in step 2426 the dfs logic (FIG. 23) is recursively invoked on all outgoing edges from obj2.

FIG. 24 depicts an example of the decrease_weight (cacheid, from_obj, to_obj) logic. As depicted, in step 2425 the actual_weight field 143 for to_obj is decremented by w where w is the weight_act field 152 corresponding to the edge from from_obj to to_obj. In step 2435, it is determined if the actual_weight 143<threshold_weight 168; if the answer is yes, the function update_or_invalidate cacheid (cacheid, to_obj) is invoked. If the answer is no, in step 2436 the weight_act field 152 is set corresponding to the edge from from_obj to to_obj to 0.

After the update propagation phase, the object manager must ensure that the consistency_lists 169 are in fact consistent. This is done in the consistency check phase depicted in FIG. 26. As depicted, step 2404 is part of a loop which examines each (object_id 160, cache_id 135) pair in the consistency stack 128.5 (FIG. 12c). For each such pair, in step 2451 it is determined if the version of object_id in the cache cache_id is current by comparing the version_num field 141 with the version_num field 161. If the answer is yes, processing returns to step 2404. Otherwise, the object must either be updated or invalidated. In step 2455 it is determined whether the object should be updated. If the answer is no, the object is invalidated in step 2440 described earlier (see FIG. 25). If the answer is yes, the latest value is added to the cache in step 2050 and the new consistency constraints are satisfied in step 2060 which were both described earlier (see FIG. 19). The ordering of steps 2050 and 2060 is not critical to the correctness of this example.

Another API, update_cache (cache) 193, ensures that all items in the cache are current. It does so by examining the OIB's for every object in the cache and invalidating or updating obsolete items. It ignores consistency lists because all objects will be current and therefore consistent after the function completes.

Relations

The present invention has special features for handling records (These records are not synonymous with records used in the preferred embodiment) which may be part of a relational database (see "Understanding the New SQL: A Complete Guide" by J. Melton and A. R. Simon, Morgan Kaufmann, 1993).

For example, suppose that a relation rel_name has the attributes age and weight, both of type integer. For the following: rel_name (age=25, weight=34) represents a single record; while rel_name (age=25) is a multirecord specifier (MRS) and represents all records belonging to rel_name for which age=25.

The present invention has features allowing objects which correspond to either single or multiple records to be managed. Such objects are known as relational objects. A single object can represent multiple records from the same relation. Such an object is known as a multiple record object (MRO) while an object corresponding to a single record is known as a single record object (SRO). An MRO obj1 contains (includes) another relational object obj2 if the set of records corresponding to obj2 is a subset of the set of records corresponding to obj1. The object manager automatically adds dependencies from a relational object to an MRO which contains it.

The object manager maintains a balanced tree known as the multiple record tree (MRT) 122 which contains pointers to all MRO nodes in G and is indexed alphabetically by the relational_string field 1602 in the dependency information block (DIB) 128 (FIG. 16). A balanced tree known as the single relation tree (SRT) contains pointers to all SRO nodes in G and is also indexed alphabetically by the relational_string field 1602 in the DIB. An alternative approach which is easy to implement from this description would be to maintain a single balanced tree for both single and multiple relations. Another variation would be to use data structures other than balanced trees for maintaining this information.

According to the present invention, before a relational object is created, the relation must be identified to the object manager via the API: define_relation (relation_name, list_of_attributes) 194.

Each element of the list_of_attributes argument is a pair containing the name and type of the attribute. The API define_relation 194 stores information about the relation in the relation info area 129 (FIG. 12).

Figure 27:
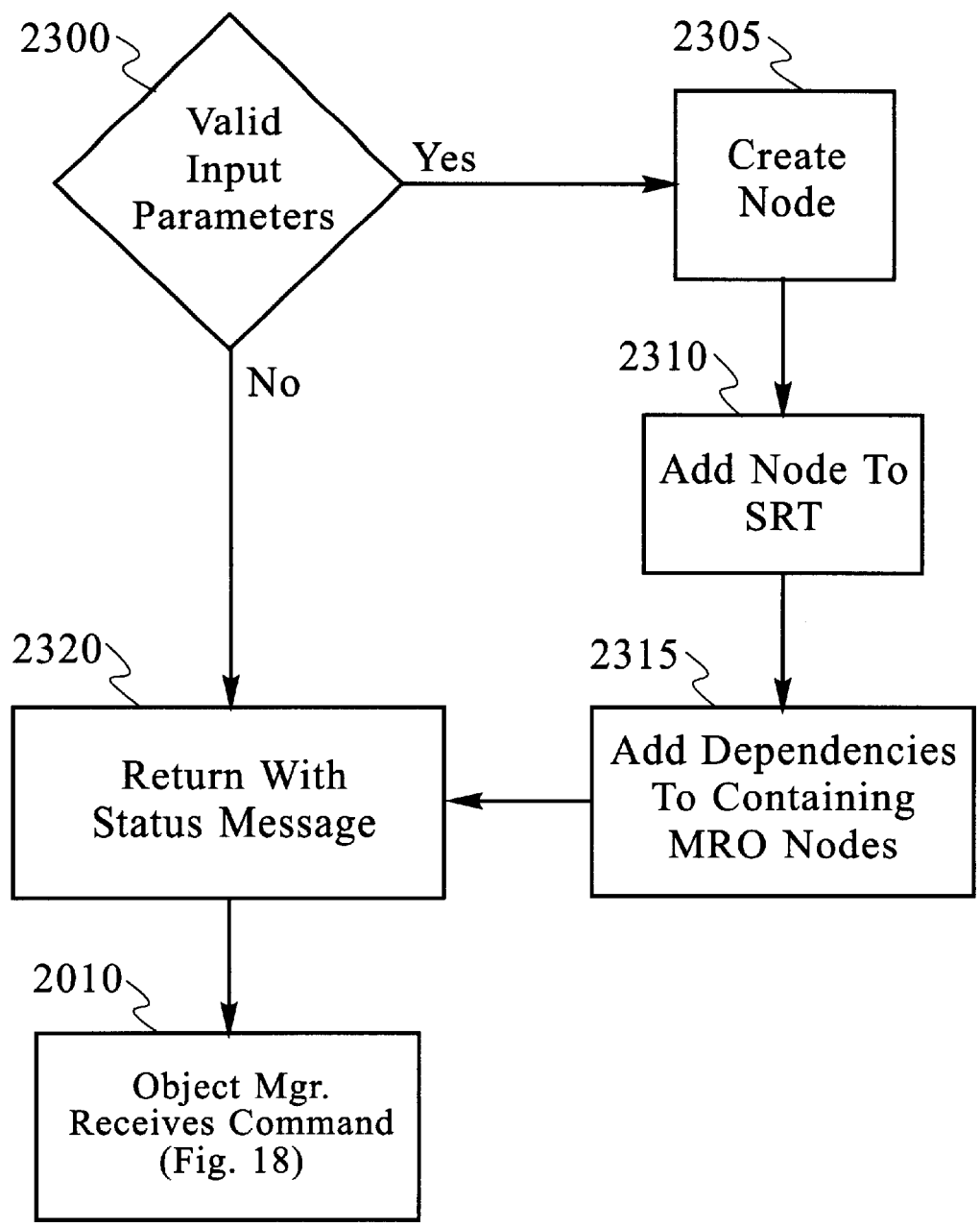
FIG. 27 depicts a block diagram of a cache API function for creating graph nodes corresponding to single record objects (SRO's)

FIG. 27 depicts an example of the logic for creating a node corresponding to a single record object (SRO). Recall that an object corresponding to a single record is known as a single record object (SRO). A balanced tree known as the single relation tree (SRT) contains pointers to all SRO nodes in G and is also indexed alphabetically by the relational_string field 1602 in the DIB (FIG. 16). A node corresponding to an SRO is created via the API create_sro_node (obj_id, initial_version_num, thresh_weight, relation_name, list_of_attribute_values) 190 (FIG. 18a). Referring now to FIG. 27, in step 2300 it is determined if all input parameters are valid (e.g., they are of the right type, etc). It is also verified that the relation "relation_name" was previously defined via a call to define_relation 194 by examining the relation info area 129. It is also verified that the list_of_attribute_values contains the correct number of values and that all values are of the correct type. It is also verified that a node for obj_id or a node corresponding to the same record doesn't already exist (it would be easy to modify the design so that if a node for obj_id already existed, the old node would be overwritten. It would also be easy to modify the design so that multiple nodes with the same obj_id could exist. It would also be easy to allow multiple nodes to correspond to the same record. If it is determined that all parameters are valid, processing continues with step 2305. Otherwise, create_sro_node returns at step 2320 with an appropriate status message.

In step 2305 a new node is created in G by initializing the object_id 160 to obj_id; version_num 161 to initial_version_num; threshold_weight 168 to thresh_weight, and relational_string 1602 to relation_name concatenated with all of the attribute values. The relation and attribute values comprising relational_string 1602 are preferably all separated by delimiters. That way, it is easy to identify the relation and each attribute value easily from the relational_string 1602. A multiple_records 1603 field (FIG. 16) is set to false. In step 2310, a pointer to the node is added to the SRT. The position of the new pointer in the SRT is determined from relational_string 1602. In step 2315 dependencies are added from the obj_id to each multiple record object (MRO) containing it. Such MRO's are found by examining the multiple record tree MRT 122. The MRT is preferably a balanced tree which contains pointers to all MRO nodes in G and is indexed alphabetically by the relational_string field 1602 in the dependency information block (DIB) 128 (FIG. 16). It is only necessary to examine MRO's for relation_name. All such MRO's can be identified in O(log (n)+m) instructions where n is the total number of MRO's and m is the number of MRO's for the relation_name.

For each MRO "obj2_id" containing obj_id, a dependency from obj_id to obj2_id is created. Referring again to FIG. 16, the dependency is preferably initialized with a weight of the mro_dep_weight 1604 for obj2_id. The threshold_weight 168 for obj2_id is incremented by mro_threshold_increment1605 for obj2_id. A straightforward extension to the algorithm would be to use other techniques for assigning weights to the dependency and modifying the threshold _weight 168. Returning now to FIG. 27, in step 2320, the process returns with a status message. The order of steps 2305, 2310, and 2315 can be varied. Furthermore, these steps can be executed concurrently.

Figure 28:
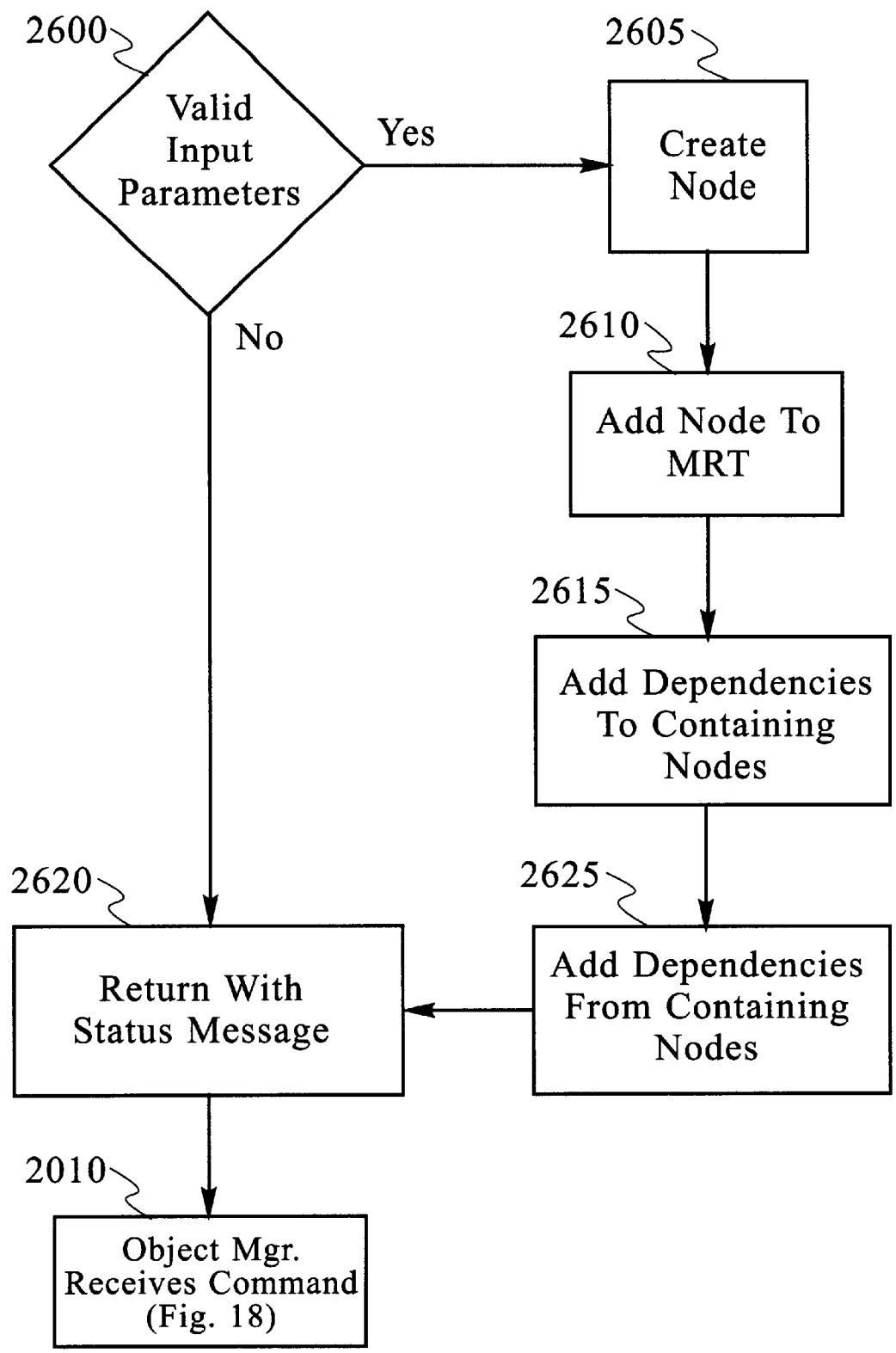
FIG. 28 depicts a block diagram of an API function for creating graph nodes corresponding to multiple record objects (MRO's)

FIG. 28 depicts an example of logic for creating multiple record objects (MROs). MRO's are created via the API: create_mro_node (obj_id, initial_version_num, thresh_weight, relation_name, list_of_attribute_conditions, rel_default_weight, rel_default_threshold) 191 (FIG. 18a); attribute conditions are of the form:=25; >96; >45 and <100; etc. An attribute condition can also be null, meaning that there is no restriction on the attribute value.

Recall that a single object can represent multiple records from the same relation. Such an object is known as a multiple record object (MRO) while an object corresponding to a single record is known as a single record object (SRO). An MRO obj1 contains another relational object obj2 if the set of records corresponding to obj2 is a subset of the set of records corresponding to obj1. The object manager automatically adds dependencies from a relational object to an MRO which contains it. The object manager also preferably maintains a balanced tree known as the multiple record tree (MRT) 122 which contains pointers to all MRO nodes in G and is indexed alphabetically by the relational_string field 1602 in the dependency information block (DIB) 128 (FIG. 16). A balanced tree known as the single relation tree (SRT) contains pointers to all SRO nodes in G and is also indexed alphabetically by the relational_string field 1602 in the DIB.

As depicted, in step 2600, it is determined if all input parameters are valid (e.g., they are of the right type, etc). In addition, it is verified that the relation "relation_name" was previously defined via a call to define_relation 194 API (FIG. 18a) by examining the relation info storage area 129 (FIG. 12). It is also verified that the list_of_attribute_conditions is valid; and that a node for obj_id or a node corresponding to the same set of records doesn't already exist. Those skilled in the art will appreciate that it would be easy to modify the design so that if a node for obj_id already existed, the old node would be overwritten. It would also be easy to modify the design so that multiple nodes with the same obj_id could exist. It would also be easy to allow multiple nodes to correspond to the same set of records. If the result of step 2600 is a determination that all parameters are valid, processing continues with step 2605. Otherwise, create_mro_node returns at step 2620 with an appropriate status message.

In step 2605, (with reference also to FIG. 16) a new node is created in G (FIG. 17) by initializing the object_id 160 to obj_id, version_num 161 to initial_version_num, threshold_weight 168 to thresh_weight, and relational_string 1602 to relation_name concatenated with all of the attribute conditions. The relation and attribute conditions comprising the relational_string 1602 are all separated by delimiters. That way, it is easy to identify the relation and each attribute condition easily from the relational_string 1602. The multiple_records 1603 field is set to true; the mro_dep_weight 1604 is set to rel_default_weight; and the mro_threshold_increment 1605 is set to rel_default_threshold.

In step 2610, a pointer to the node is added to the MRT. The position of the new pointer in the MRT is determined by relational_string 1602. In step 2615 dependencies are added from obj_id to each MRO containing it, in the same manner as step 2315.

For each object obj2_id contained by obj_id, in step 2625 a dependency is added from obj2_id to obj_id. Such dependent objects are found by searching both the MRT 122 and SRT 123 and considering all other relational objects for relation_name. Each dependency is assigned a weight of the mro_dep_weight 1604 for obj_id. For each such dependency, the threshold_weight 168 for obj_id is incremented by the mro_threshold_increment 1605 for obj_id. Those skilled in the art will appreciate that other techniques can be used for assigning weights to the dependency and modifying the threshold_weight 168. In step 2620, create_mro_node returns with a status message. The order of steps 2605, 2610, 2615, and 2625 can be varied. Furthermore, these steps can be executed concurrently.

Alternatively, the weight of a dependency from a relational object obj1 to an MRO obj2 which contains it could be based on the proportion and importance of records corresponding to obj2 which are also contained in obj1. This variant could be applied to Steps 2315, 2615, or 2625. Another alternative would be to selectively add dependencies between MRO's when neither MRO is a subset of the other but the two MRO's have one or more records in common.

Returning now to FIG. 16, those skilled in the art will appreciate that within the spirit and scope of the present invention APIs can be added to modify the relational_string 1602, multiple_records 1603, mro_dep_weight 1604, and mro_threshold_increment 1605 for a relational object after the object has been defined via the create_sro_node 190 or the create_mro_node 191 APIs.

When one or more records change, the object manager can be informed of this via the APIs (FIG. 18a) record_has_changed (relation_name, list_of_attribute_values) 195 and records_have_changed (relation_name, list_of_attribute_conditions) 196. These APIs automatically propagate changes throughout the dependence hierarchy.

Figure 29A:
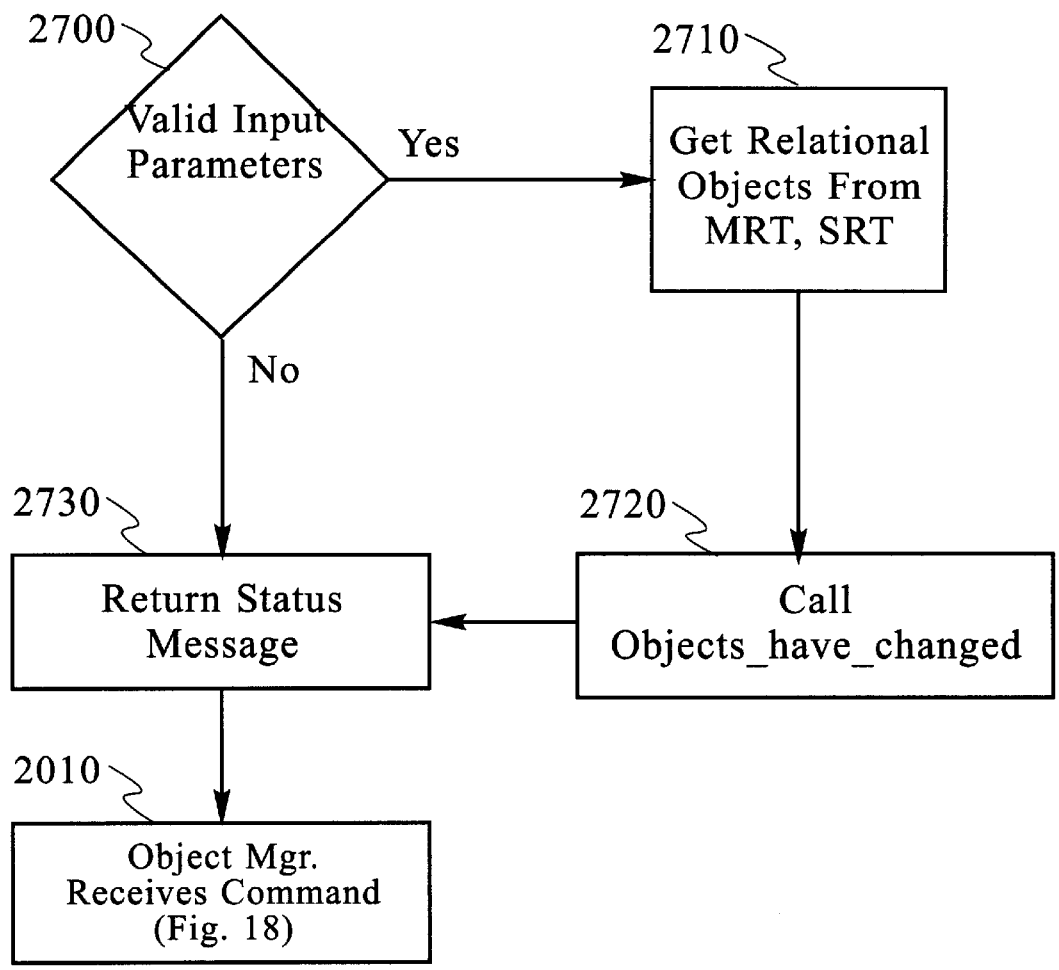
FIG. 29a depicts a block diagram of an API function which may be invoked when records change.

FIG. 29a depicts an example of how the records_have_changed (relation_name, list_of_atribute_conditions) 196 API can be implemented. Those skilled in the art will appreciate that it is straightforward to implement the record_has_changed (relation_name, list_of_attribute_values) 195 API therefrom.

As depicted, in step 2700 it is determined if the input parameters are valid. It is also verified that the relation relation_name was previously defined (via a call to the define_relation 194 API (FIG. 18a)) by examining the relation info area 129 (FIG. 12). It is also verified that the list_of_attribute_conditions is valid. If the input parameters are valid, processing proceeds to step 2710. Otherwise, in step 2730 the procedure is aborted with an appropriate status message.

In step 2710, all relational objects are found which include at least one record which has changed. This can be done by examining all relational objects on the MRT 122 and SRT 123 (FIG. 12) which correspond to the relation_name. In step 2720, the changes can be propagated to other nodes in G by invoking the objects_have_changed 189 API on the list of all objects identified in step 2710.

Finally, in step 2730, records_have_changed returns an appropriate status message.

A straightforward variant of the records_have_changed API would be to consider the proportion and importance of records in a relational object which have changed in determining how to propagate change information throughout G.

The API compare_objects (obj_id, cache_id1, cache_id2) 192 (FIG. 18b) can be used to determine how similar the versions of obj_id in cache_id1 and cache_id2 are. For example, the version_num 141 fields can be compared to see if the two versions are the same. If they are different, an indication can be provided of how much more recent one object is from the other, for example, by the difference in the version_num 141 and timestamp 142 fields (FIG. 14).

If the two versions of the object are different, a similarity score can be computed ranging from 0 (least similar) to <1 (1 would correspond to identical versions of the object). The similarity scores are preferably based on the sum of weights of incoming dependencies to obj_id from graph objects obj_id2, for which the version of obj_id2 consistent with obj_id in cache_id1, is identical to the version of obj_id2 consistent with obj_id in cache_id2. The similarity score (SS) can be calculated using the formula:

SS=common_weight/sum_weight 167 where common_weight= sum of weight 165 corresponding to edges from graph objects obj_id2 to obj_id where the version_num 153 fields corresponding to the edges are identical for both versions of obj_id. The compare_objects logic can also be used to determine whether the two versions are highly dissimilar or not. They are highly dissimilar if and only if common_weight<threshold_weight.

Extensions

A straightforward extension to the present invention would be to include threshold_weight fields in OIBs (FIG. 14) and to let caches 2' (FIG. 13) set these fields independently. Another straightforward extension to would be to allow different consistency lists for the same object corresponding to different caches.

A further extension would be a system where multiple dependencies from a graph object obj1 to another graph object obj2 could exist with different weights. Application programs could independently modify these multiple dependencies.

Still another extension would be to use other algorithms for determining when an object is obsolete based on the obsolete links to the object.

When a graph object changes, the preferred embodiment does not consider how the graph object changes when propagating the information through the dependence graph G. It only takes into account the fact that the graph object has changed. An extension would be to also consider how a graph object changes in order to propagate the changes to other graph objects. This could be done in the following ways:

1. By providing additional information about how a graph object has changed via parameters to functions such as the object_has_changed. This information would be used to modify links from the graph object to other graph objects which depend on its value and would be subsequently used to determine how successors to the graph object have changed.

2. When the object manager 120 determines that a graph object o2 has changed, the object manager could consider both: which predecessors of it have changed; and any information that it has recursively collected on bow the predecessors have changed. The object manager would then use this information to determine how o2 has changed. The information on how o2 has changed would be used to modify links to other graph objects which depend on o2 and would be subsequently used to determine how successors to o2 have changed.

Figure 29B:
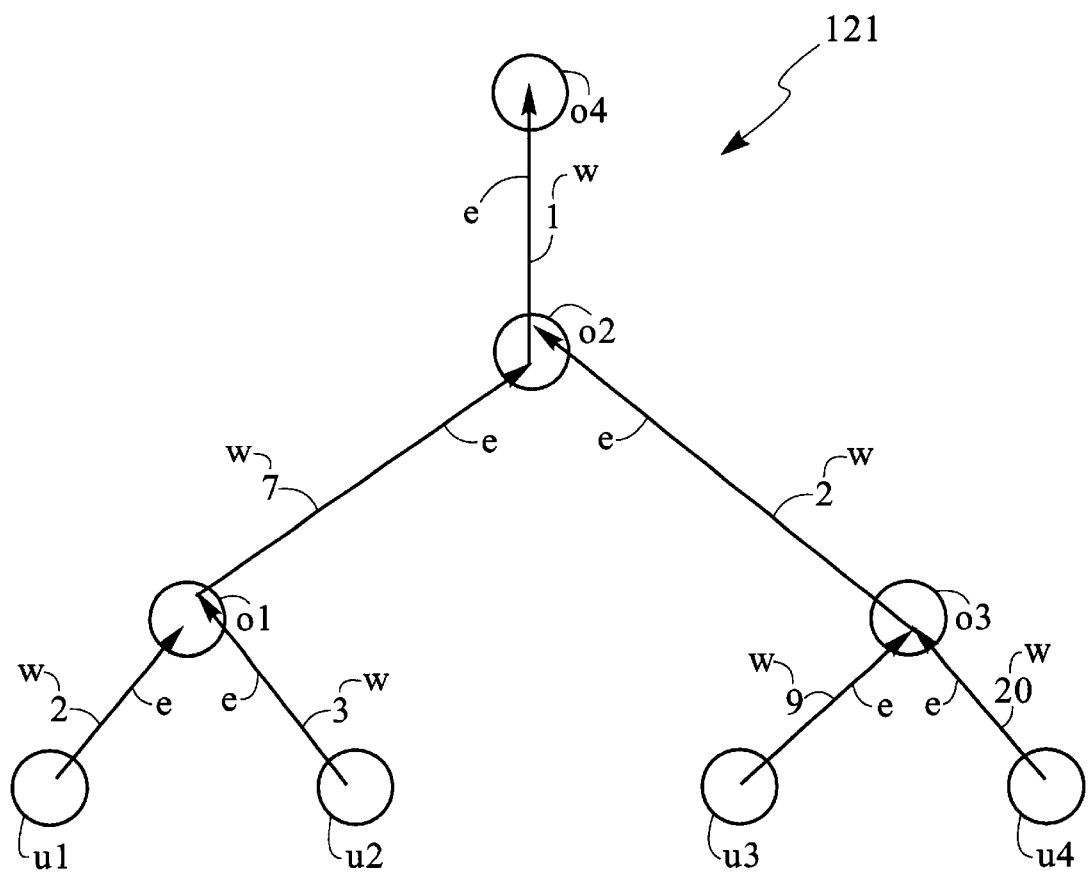
FIG. 29b depicts another example of an object dependence graph and how it can be used for propagating changes to graph objects.

For example, consider FIG. 29b. u2 and u3 are underlying data which have changed. The object manager propagates the change information to o1 and o3. When the object manager propagates change information to o2, it not only considers the weights of the edges from o1 and o3 to o2 in determining how to update or invalidate cached copies of o2. It also considers the nature of the changes to u2, u3, o1, and o3. This information may also be used to determine how to update or invalidate cached versions of o4.

Other Applications

The present invention can also be used in a system where an application has to make a decision on whether or not to update underlying data. By examining the object dependence graph, the system can determine the other objects affected by the changes to the underlying data. If this set is satisfactory, the changes could be made. Otherwise, the system could refrain from making the changes to the underlying data.

Those skilled in the art will appreciate that the present invention could also be used by a compiler, run-time system, or database in order to efficiently schedule operations. Different schedules could result in different changes to underlying data. By analyzing the object dependence graph, the program making scheduling decisions could determine a favorable method to schedule operations.

Detailed Description of a Scaleable Method for Maintaining and Consistently Updating Caches This embodiment of the present invention is designed to function on a collection of one or more physical (computer) systems connected by a network. There may be more than one instance of the present invention residing in this collection of systems. Although dictionary are also implied, the following definitions are provided for guidance to distinguish among multiple instances of the present invention.

Object Sources. Object Sources include one or more products such as are sold by IBM under the trademark DB2 and by Lotus under the trademarks LOTUS NOTES and DOMINO Server, or Other Sources 3030 including data or objects from which more complex objects (such as HTML pages) are built.

Trigger. Any means which can be used to cause actions to occur automatically in response to modification in the data. A trigger is a standard feature of many standard Object Sources such as are sold by IBM under the trademark DB2 and by Lotus under the trademarks LOTUS NOTES and DOMINO Server to cause actions to occur automatically in response to modification in the data. One embodiment of the present invention uses triggers in a novel way to keep objects built from data stored in an Object Source synchronized with the data.

Trigger Notification. This is a message sent to the present invention in response to a trigger being invoked within an Object Source.

Cache transactions. Include requests to a cache manager to read, update, or delete cache objects.

Trigger Monitor. An example of logic in accordance with the present invention for keeping the objects in a cache managed by a Cache manager synchronized with associated remote data. The Trigger Monitor can be a single long running process monitoring remote data sources for the purpose of keeping complex objects stored in a cache managed by a Cache manager synchronized with the underlying data.

Master Trigger Monitor. This an instance of a Trigger Monitor which receives Trigger Notifications.

Slave Trigger Monitor. This is an instance of a Trigger Monitor to which Trigger Notifications are forwarded from a Master trigger monitor 3000' ( that is, not from Object Sources directly).

Local Cache. This is a cache (or other standard object store such as a file system) which is updated by an instance of a Trigger Monitor residing on the same physical machine as the cache itself.

Remote Cache. This is a cache (or other standard object store such as a file system) which is updated by an instance of a Trigger Monitor residing on a different physical machine from the cache itself.

It is possible for the present invention to play the role of both Master 3000 (if it receives trigger events) and Slave 3000a (if it receives notifications of trigger events from some master).

Figure 30A:
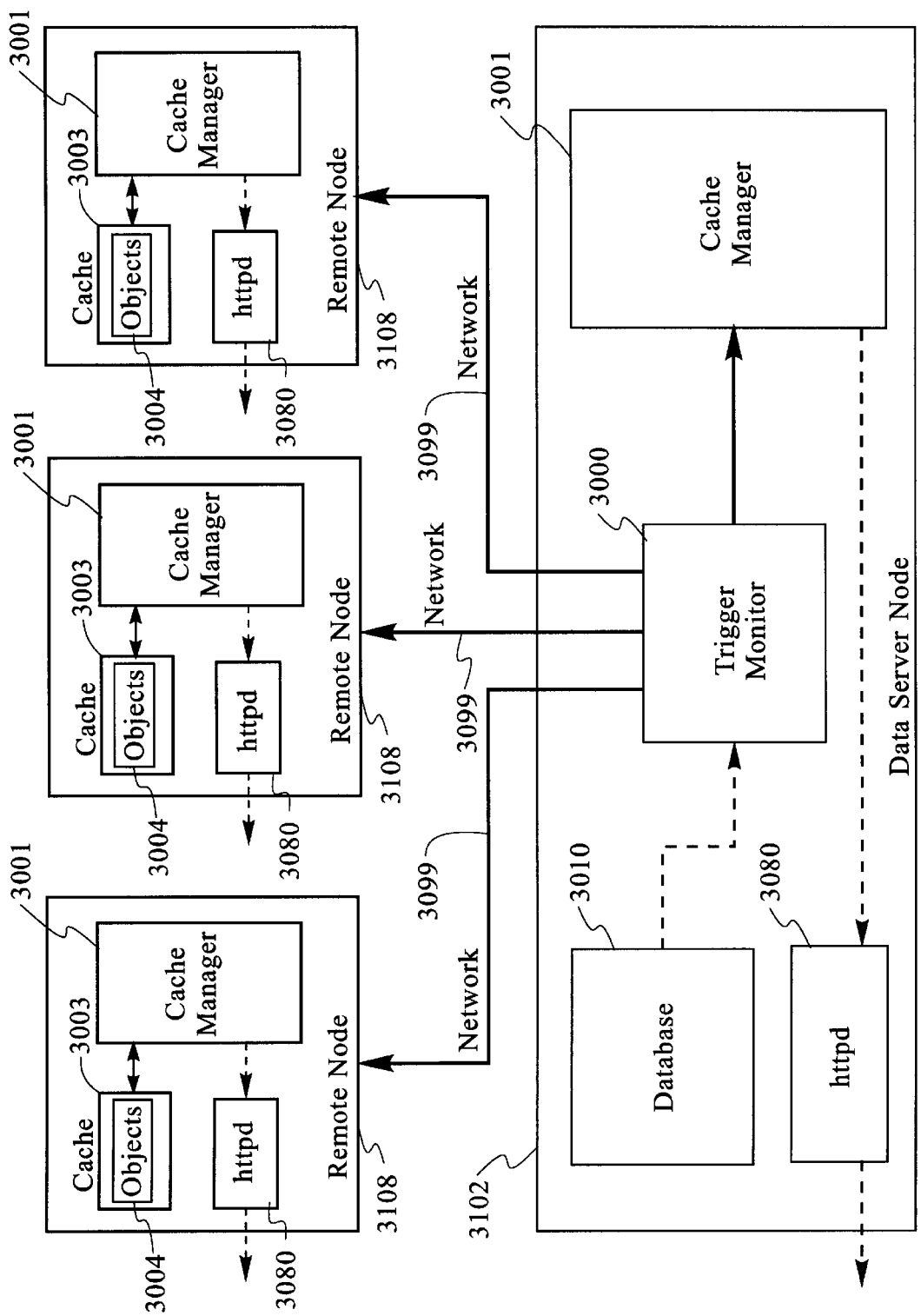
FIG. 30a depicts a block diagram example of a system having features of the present invention for scaleably maintaining and consistently updating caches.

Referring now to the drawings, FIG. 30a depicts a block diagram example of a system having features of the present invention. As depicted, the system includes (one or more) remote nodes 3108. The nodes 3108 can be servers providing Web pages to clients via Web servers (denoted as httpd 3080). Each Web server can provide a significant percentage of dynamic Web pages which are constructed from a database 3010. Each such server node 3108, because of the cost involved in generating Web pages, caches one or more objects 3004 including complex objects such as dynamic Web pages. Multiple requests for the same dynamic page can be satisfied from the cache 3003, thus reducing overhead.

The use of multiple server nodes 3108 increases the volume of requests that the system can service. It is possible, although not a requirement, that the servers nodes 3108 can be separated geographically by long distances.

In accordance with the present invention, when a change to an object source such as the database 3010 occurs which might affect the value of one or more objects 3004 stored in a cache 3003, a trigger monitor 3000 notifies each cache manager 3001 of the objects whose values have changed.

The trigger monitor 3000 might inform a cache manager 3001 that an object 3004 in its cache 3003 has changed. In this case, the cache manager 3001 could invalidate its copy of the object 3004. Alternatively, the trigger monitor 3000 could inform a cache manager 3001 that an object 3004 has changed and also provide the new value of the object 3004. Those skilled in the art will appreciate that the new value for the object 3004 could be computed on the data server node 3102 as well as the remote node 3108 or some intermediate, e.g., proxy node. In either alternative case, the cache manager would also have the option of dynamically updating the object 3004, e.g., storing the new version, without having to invalidate it.

Figure 30B:
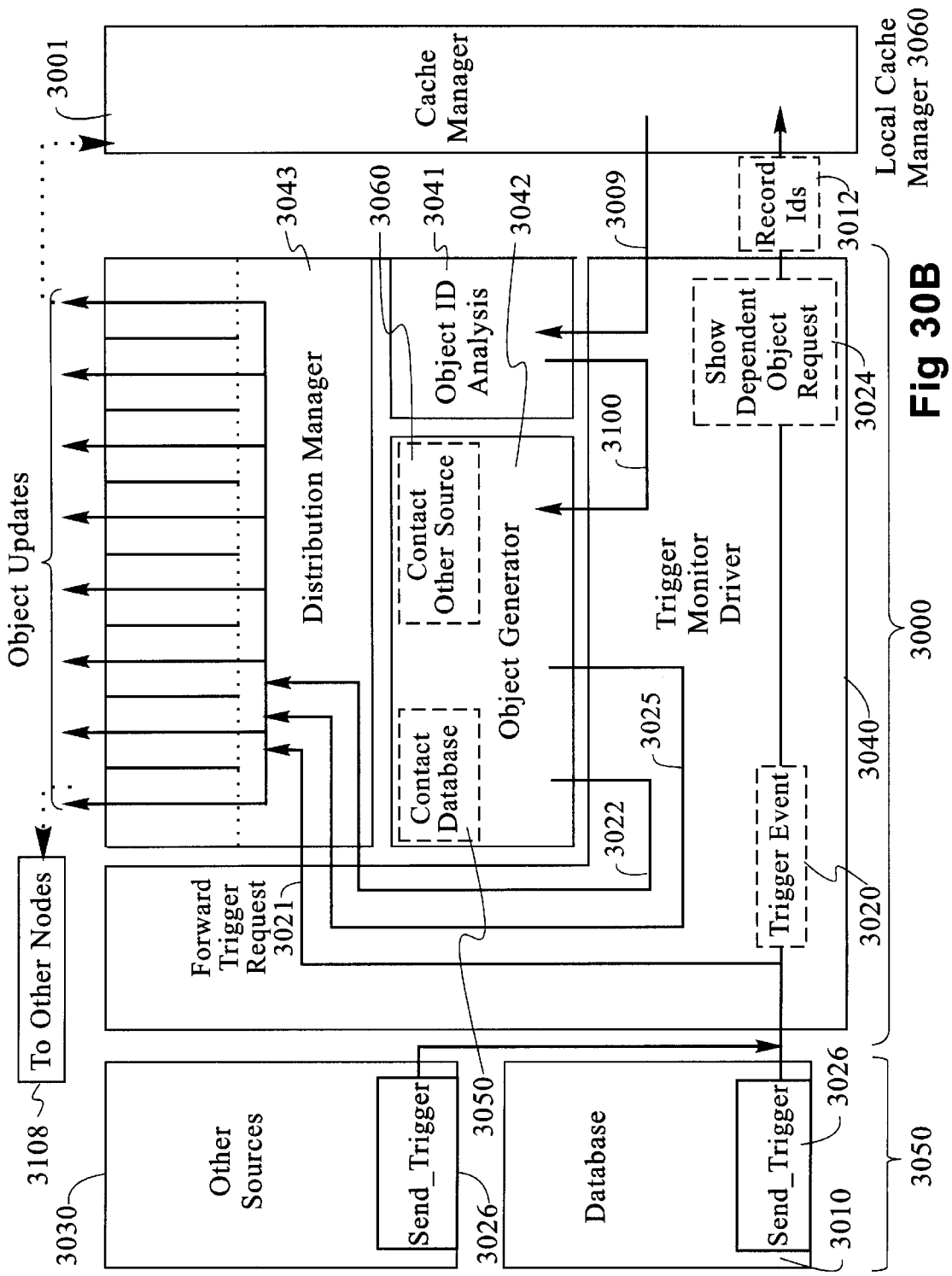
FIG. 30b depicts a more detailed example of the Trigger Monitor of FIG. 30a instantiated as a Master Trigger Monitor.

FIG. 30b depicts a more detailed example of the Trigger Monitor 3000. Here, the Trigger Monitor 3000 is instantiated as a Master Trigger Monitor 3000'. As depicted, the maintenance of caches 3003 including complex object 3004s is done by a process (or collection of processes) according to the present invention called the Trigger Monitor 3000. The Trigger Monitor 3000 is preferably a single long running process monitoring data sources 3050 for the purpose of keeping the contents of a Cache manager 3001 synchronized with the underlying data. A Master trigger monitor 3000' is an instance of a Trigger Monitor 3000 which receives Trigger Events 3020. The Master Trigger Monitor 3000' includes: a Trigger Monitor Driver 3040; Object Id Analysis 3041 logic; Object Generator 3042 logic; and a Distribution Manager 3043.

The Master Trigger Monitor 3000' works in conjunction with Object Sources 3050, cache manager 3001 (known as a local cache manager), and zero or more other (Slave) Trigger Monitors 3000" (FIG. 30c) and a remote cache manager 3002, which reside on other physical machines. Object Sources 3050 include one or more entities; for example a database 3010 such as is sold by IBM Corp. under the trademark DB2; or any Other Sources 3030 such as a server sold by Lotus Corp. under the trademark DOMINO, from which more complex objects (such as HTML pages) are built.

When an Object Source 3050 detects a change, a trigger is invoked. The trigger, which is a standard feature of many standard Object Sources 3050 such as the above, is typically used to cause actions to occur automatically in response to modification of the data. The present invention uses triggers in a novel way to keep object 3004 built from data stored in an Object Source synchronized with the data. Associated with the trigger is a send_trigger 3026 API (see FIG. 30d) which causes a message to be sent to the Trigger Monitor Driver 3040. In response, the Trigger Monitor Driver 3040 can then generate a transaction (see FIG. 30e) called a Trigger Event 3020.

The Trigger Event 3020 can be translated (by conventional means) into a Record ID 3012 and forwarded to a Cache Manager 3001 for translation. The Cache Manager 3001 returns a corresponding list of Object IDs 3009 which are enqueued to the Object Id Analysis (OIA) component 3041. The OIA 3041 generates, by well known means, a set of Object Disposition Blocks (ODB) 3100 (described below), one for each Object ID 3009.

Figure 31:
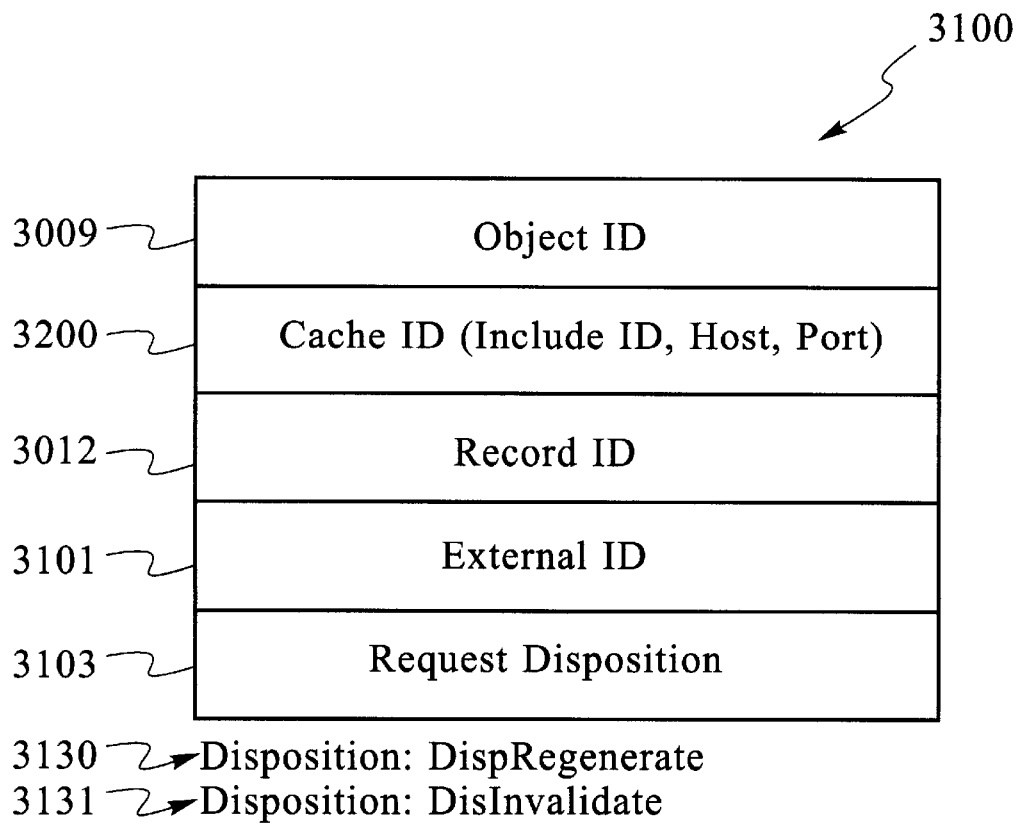
FIG. 31 depicts an example of the Object Disposition Block (ODB) of FIG. 30b.

FIG. 31 depicts an example of the Object Disposition Block (ODB) 3100. The Object ID 3009 is used to identify an object 3004 in the cache 3003 when subsequently replacing or deleting the objects. The Cache Id 3200 is used to identify which of the caches 3003 the objects 3004 belongs in. The External ID 3101 is an additional identifier by which the Object Generator 3042 might know the object. The Request Disposition 3103 is used by the Object Generator to generate an Update Object Request 3022 or a Delete Remote Object Request 3025 (FIG. 30e). If the request disposition 3103 is a DispRegenerate 3130, the objects 3004 represented by the ODB 3100 are regenerated by the system and distributed. If the request disposition 3103 is a DispInvalidate 3131, the objects 3004 are deleted from all systems.

Figure 32:
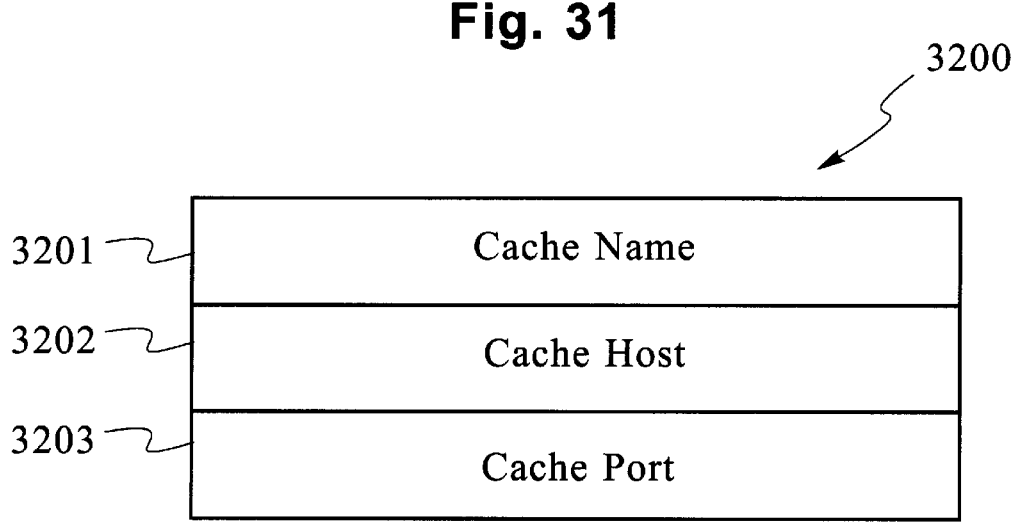
FIG. 32 depicts an example of the cache ID of FIG. 31.

FIG. 32 depicts an example of the cache ID 3200. As depicted, the Cache ID preferably includes a cache name 3201, a cache host 3202 identifier and cache port 3203 identifier.

Returning now to FIG. 30b, the ODB 3100 is sent to the Object Generator 3042. The Object Generator examines the ODB 3100 and does one of the following: a) generates a Delete Remote Object Request 3025; b) establishes connections with the Object Sources 3050, rebuilds the object 3004, and creates an Update Object Request 3022.

The TMD 3040 then passes the Delete Remote Object Request 3025 or the Update Object Request 3022 to the Distribution Manager 3043.

The Distribution Manager 3043 establishes a connection with each configured Remote Cache Manager 3002 or Slave Trigger Monitor 3000" (FIG. 30c), and delivers each the request. If the request is a Forward Trigger Request 3021, the request is sent to the Slave Trigger Monitor 3000" (FIG. 30a). If the request is an Update Object Request 3022, the new object is sent to the Remote Cache manager 3001 via the cache_object 410 API (FIG. 4). If the request is a Delete Remote Object Request 3025 the object 3004 is purged from each Remote Cache manager 3001 via the delete_object 420 API (FIG. 4).

Figure 30C:
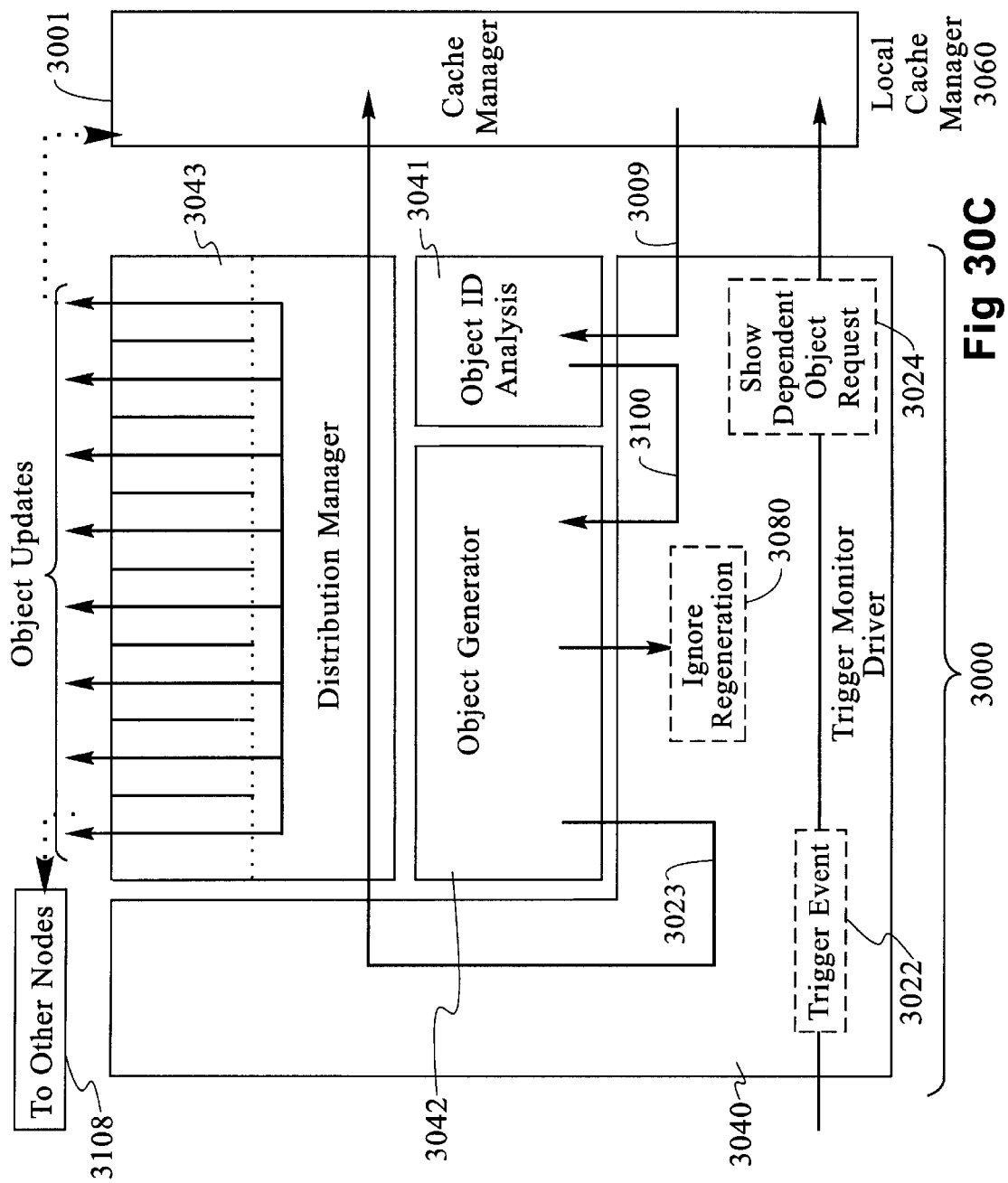
FIG. 30c depicts an example of the Trigger Monitor instantiated as a Slave Trigger Monitor.

FIG. 30c depicts another example of the Trigger Monitor 3000. Here, the Trigger Monitor 3000 is instantiated as a Slave Trigger Monitor 3000". If the Master Trigger Monitor 3000' is maintaining exactly one system, or if an object 3004 is to be regenerated (that is, not deleted), it can be fully maintained using the process described in FIG. 30b. If the Trigger Monitor 3000 is maintaining multiple systems, it is possible that the object 3004 exists in some but not all caches. In particular, the object 3004 may not exist in the same cache as the Trigger Monitor 3000 which received the Trigger Event 3020. To handle this case a Slave Trigger Monitor 3000" (FIG. 30c) is run on each configured node. As depicted, the Slave Trigger Monitor 3000" receives a Forward Trigger Request 3021. This is processed identically to a Trigger Event 3020 until it arrives in the Object Generator 3042. If the Object Disposition Block 3100 has a Request Disposition 3103 equal to DispRegenerate 3130, the request is discarded. If the Request Disposition 3101 is DispInvalidate 3131 a Delete Local Object Request 3023 is built and sent to the Slave's Local Cache.

Referring again to FIG. 30a, the trigger monitor 3000 is preferably embodied as a single long running process, monitoring the object sources 3050. One skilled in the art could easily adapt the present invention to consist of one or more processes per component, some of which may overlap in time to improve throughput of the system. One skilled in the art could also easily adapt the present invention to use multiple threads of operation in a single process, each thread implementing one or more of the components, some of which may overlap in time, if the underlying system provides support for threaded processes.

Conventional mechanisms such as multiphase commit and persistent data objects are preferably used when receiving Trigger Events 3020 and Forward Trigger Requests 3021 to provide a guarantee to the object sources 3050 that these requests, once delivered, remain in the system until completion. Conventional mechanisms such as retry, and multiphase commit are preferably used to provide a guarantee that enqueued outbound requests (depicted in FIG. 30e) remain in the system until completion.

The Object Id Analysis (OIA) component 3041 translates the Object IDs 3009 into Object Disposition Blocks 3100 (FIG. 31). The OIA 3041 may be specified and interfaced as a configuration option, an API, or in any other standard way. One skilled in the art could easily build such a mechanism.

The Object Generator 3042 translates the information in an Object Disposition Block (3100) into the transaction types depicted in FIG. 30c and described below. The trigger monitor 3000 provides an interface to this component using configuration options, APIs, or any other standard technique. Examples of Object Generators 3042 are the products sold by: IBM under the trademark NET.DATA; Lotus Corporation under the trademark DOMINO Server; or any Web server from which HTML pages can be fetched.

FIG. 30d depicts an example of the send_trigger API. As depicted, the send_trigger 3026 API enables the Object Sources 3050 to communicate with the Trigger Monitor Driver 3040. The send_trigger 3026 API sends a message including sufficient information (message parameters) to uniquely identify the trigger and construct a Trigger Event 3020. One skilled in the art could easily define and specify that information using standard techniques (such as variable-length parameter lists).

FIG. 30e depicts examples of transaction types used in accordance with the present invention. As depicted, several transactions 3020 . . . 3025 can be generated within the system:

A Trigger Event 3020 is generated in response to receipt of a message sent via the send_trigger 3026 API. The Trigger Event 3020 is a structure which maintains sufficient information to translate the data sent by the send_trigger 3026 API into one or more Show Dependent Object Requests 3024 and to properly track and guide itself through the system.

A Forward Trigger Request 3021 is generated in response to receipt of a Trigger Event 3020 sent via the send_trigger 3026 API. The Forward Trigger Request 3021 is a structure which maintains sufficient information to generate one or more Show Dependent Object Requests 3024 and to properly track and guide itself through the system.

An Update Object Request 3022 is generated by the Object Generator 3042 to cause new objects to be distributed to Remote Cache Managers 3002 via the Distribution Manager 3043. The Update Object Request is a structure which maintains sufficient information to replace an object 3004 in any arbitrary cache 3003.

A Delete Local Object Request 3023 is generated by the Object Generator to cause a local Cache 3003 to delete an object 3004. The Delete Local Object Request 3023 is a structure which maintains sufficient information to delete an object 3004 from the Local Cache manager 3001.

A Show Dependent Object Request 3024 is generated by the Trigger Monitor Driver 3040 in response to a Trigger Event 3020 to request the dependency information from the Local Cache Manager 3001. The Show Dependent Object Request 3024 is a structure which maintains sufficient information to analyze a Trigger Event 3020 or a Forward Trigger Request 3021 and invoke the API show_dependent_objects 3024 to acquire Object IDs 3009 from the Local Cache Manager 3001.

A Delete Remote Object Request 3025 is generated by the Object Generator 3042 to cause an object 3004 to be deleted from remote cache managers 3002 via the Distribution Manager 3043. The Delete Remote Object Request 3025 is a structure which maintains sufficient information to delete an object 3004 from an arbitrary cache 3003.

Figure 33A:
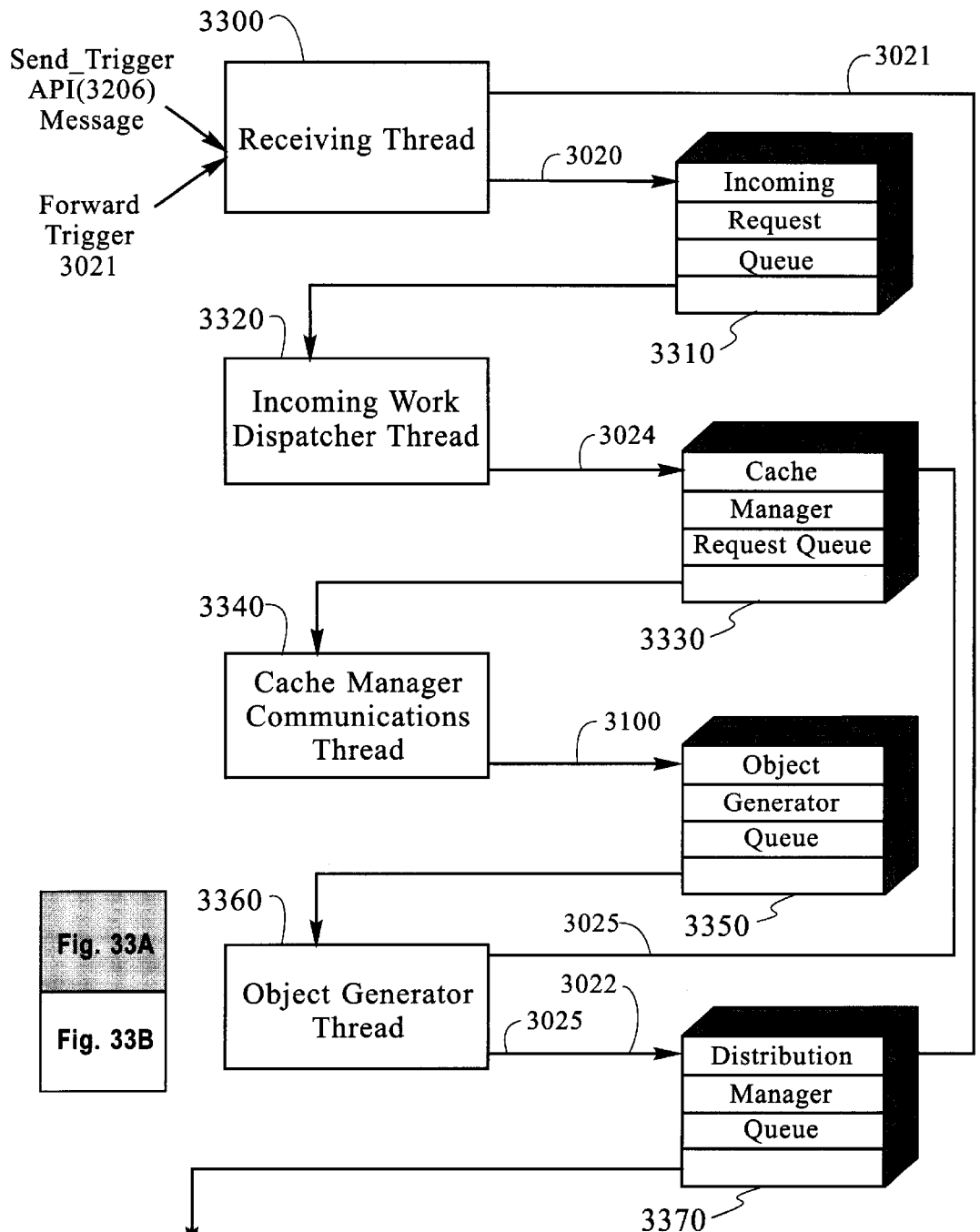
FIG. 33 depicts an example of a high-level organization and communication paths of the Trigger Monitor Driver and the Distribution Manager.
Figure 33B:
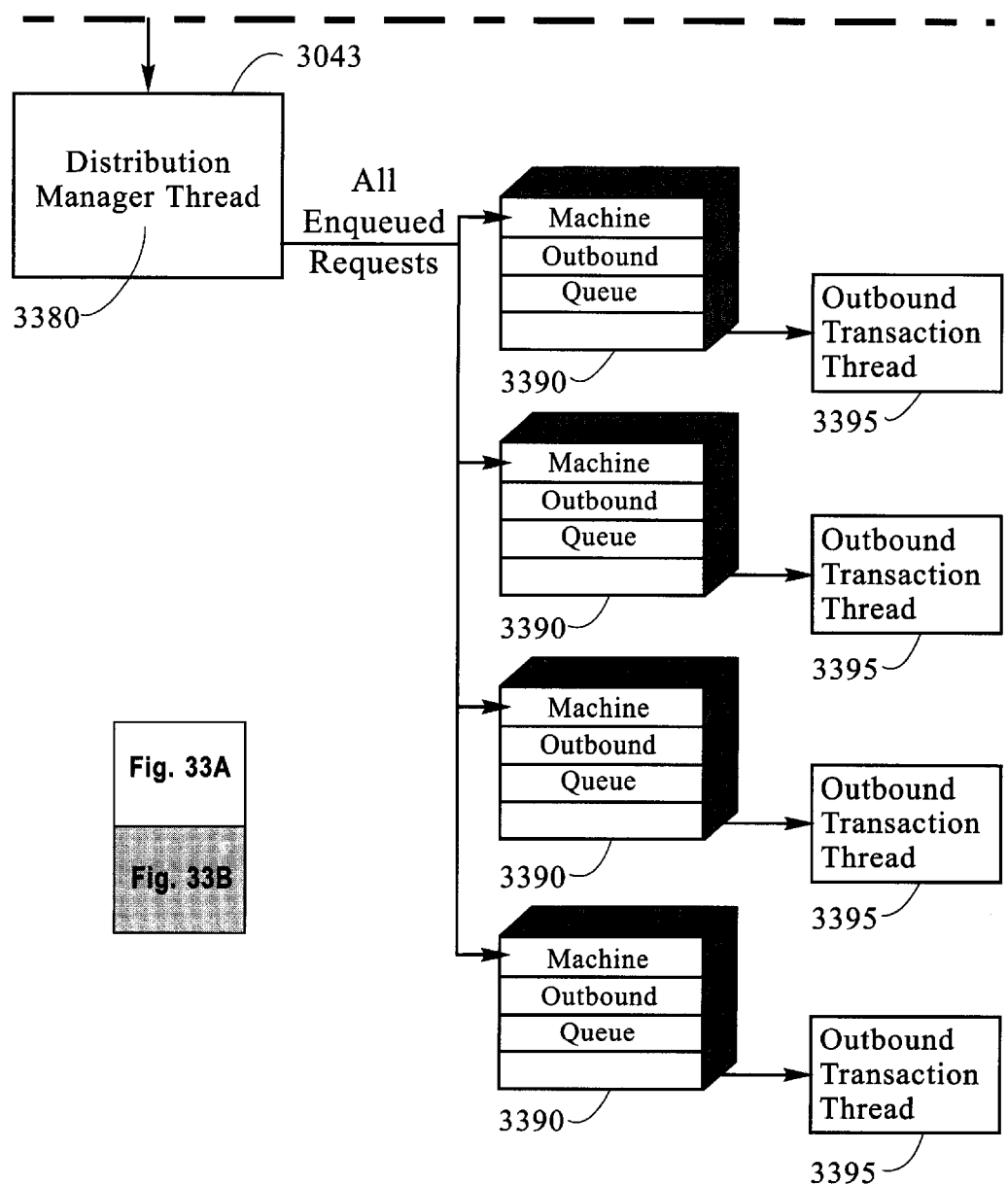

FIG. 33 depicts an example of a high-level organization and communication paths of the Trigger Monitor Driver 3040 and the Distribution Manager 3043. The preferred organization consists of several independently executing threads of control:

A Receiving Thread 3300 receives requests including Trigger Event 3020 and Forward Trigger Request 3021 and saves them to some persistent store. An Incoming Work Dispatcher Thread 3320 dequeues incoming requests from 3300 and enqueues them for processing. A Cache Manager Communications Thread 3340 sends the Delete Local Object Request 3023 and Show Dependent Object Request 3024 requests to the Local Cache Manager 3060. An Object Generator Thread 3360 coordinates generation of the object requests: Delete Remote Object Request 3025; and Update Object Request 3022, and enqueues them for distribution. A Distribution Thread 3080 (which is a main component of the Distribution Manager 3043) dequeues requests from the Distribution Manager Queue 3370 and enqueues them to all outbound machines. The Outbound Transaction threads 3395 contact remote machines and forward the work enqueued on the Machine Outbound Queues 3390.

As is conventional, these threads can communicate via several FIFO queues: the Incoming Request Queue 3310; the Cache Manager Request Queue 3330; the Object Generator Queue 3350; the Distribution Manager Queue 3370; and the Machine Outbound Queues 3390 (one per distributed cache).

Figure 34:
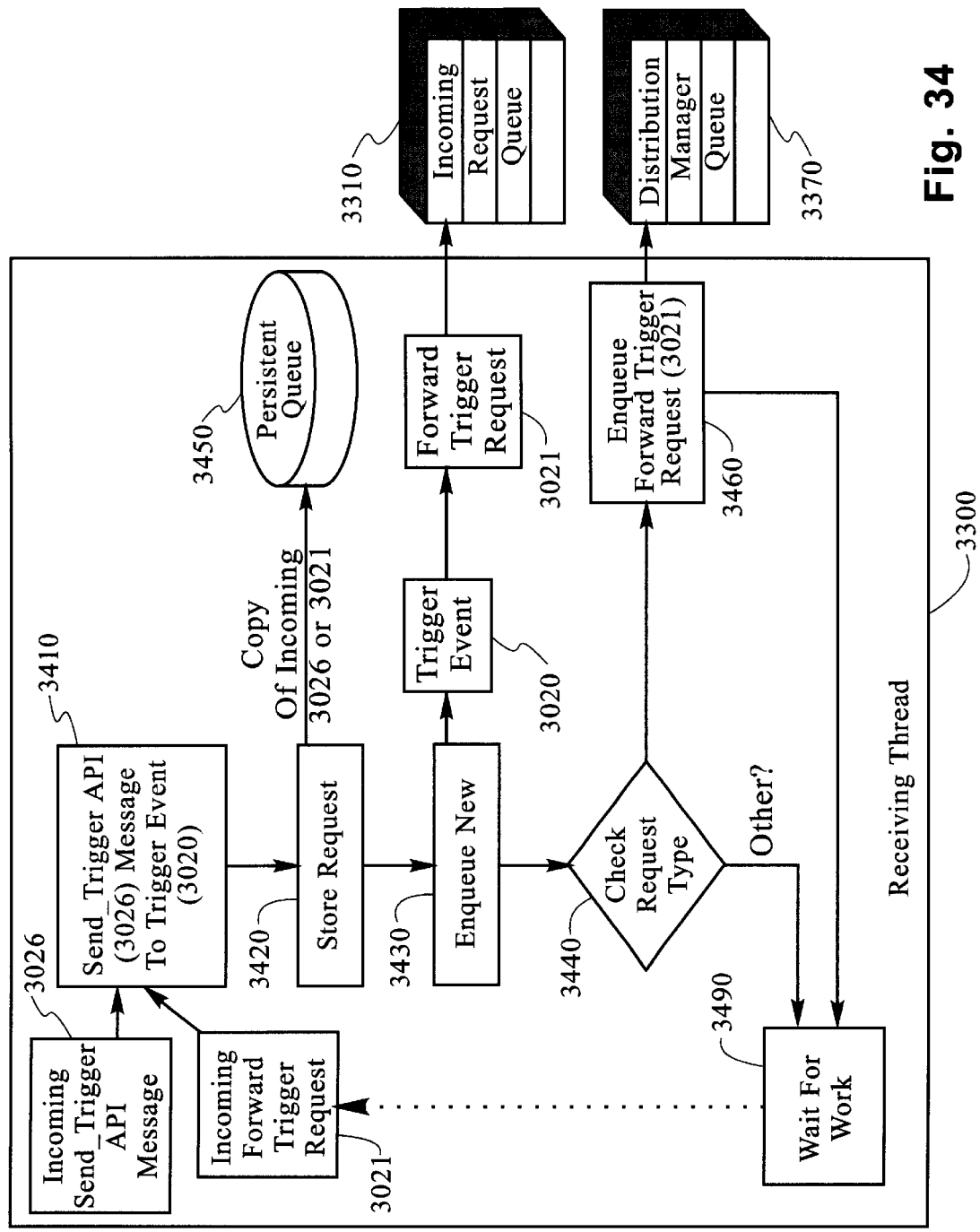
FIG. 34 depicts an example of the Receiving Thread logic of FIG. 33.

FIG. 34 depicts an example of the Receiving Thread 3300 logic. As depicted, in step 3410, an incoming message (either the send_trigger API 3026 or a Forward Trigger Request 3021) enters the system and is converted to a Trigger Event 3020. In step 3420, the message is written by the receiving thread 3300 to a persistent queue 3450 and enqueued in step 3430 to the Incoming Request Queue 3310. In step 3440, the request type is checked. In step 3460, if it is a Trigger Event 3020, a Forward Trigger Request 3021 is enqueued to the Distribution Manager Queue 3370. In step 3490, the receiving thread 3300 returns to waiting 3490 for work.

Figure 35:
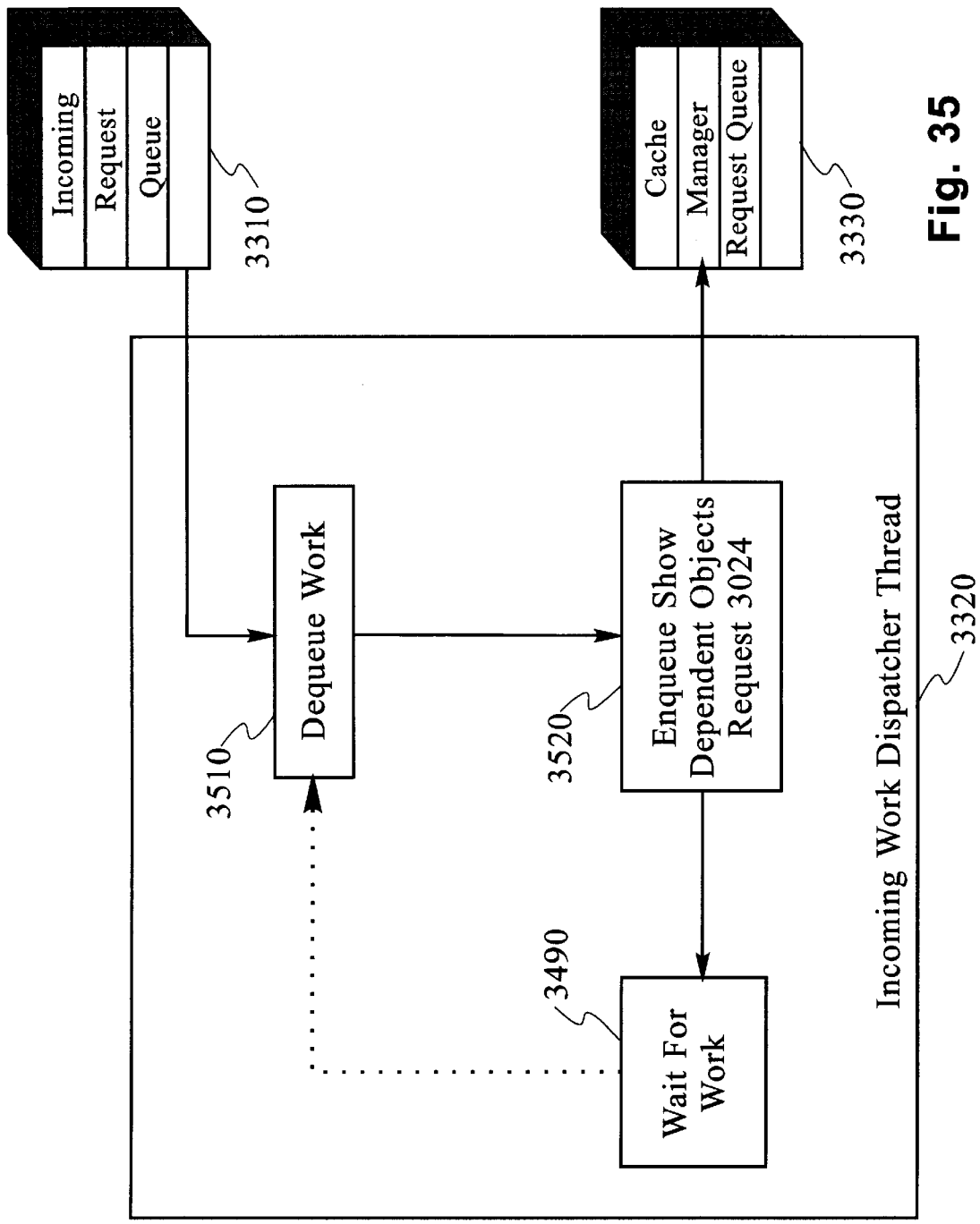
FIG. 35 depicts an example of the Incoming Work Dispatcher Thread logic of FIG. 33.

FIG. 35 depicts an example of the Incoming Work Dispatcher Thread 3320 logic. As depicted, in step 3510, the incoming work dispatcher thread 3320 dequeues the work request. In step 3520, a Show Dependent Object Request 3024 is enqueues to the Cache Manager Request Queue 3330. In step 3590, the receiving thread 3300 returns to waiting for work.

Figure 36:
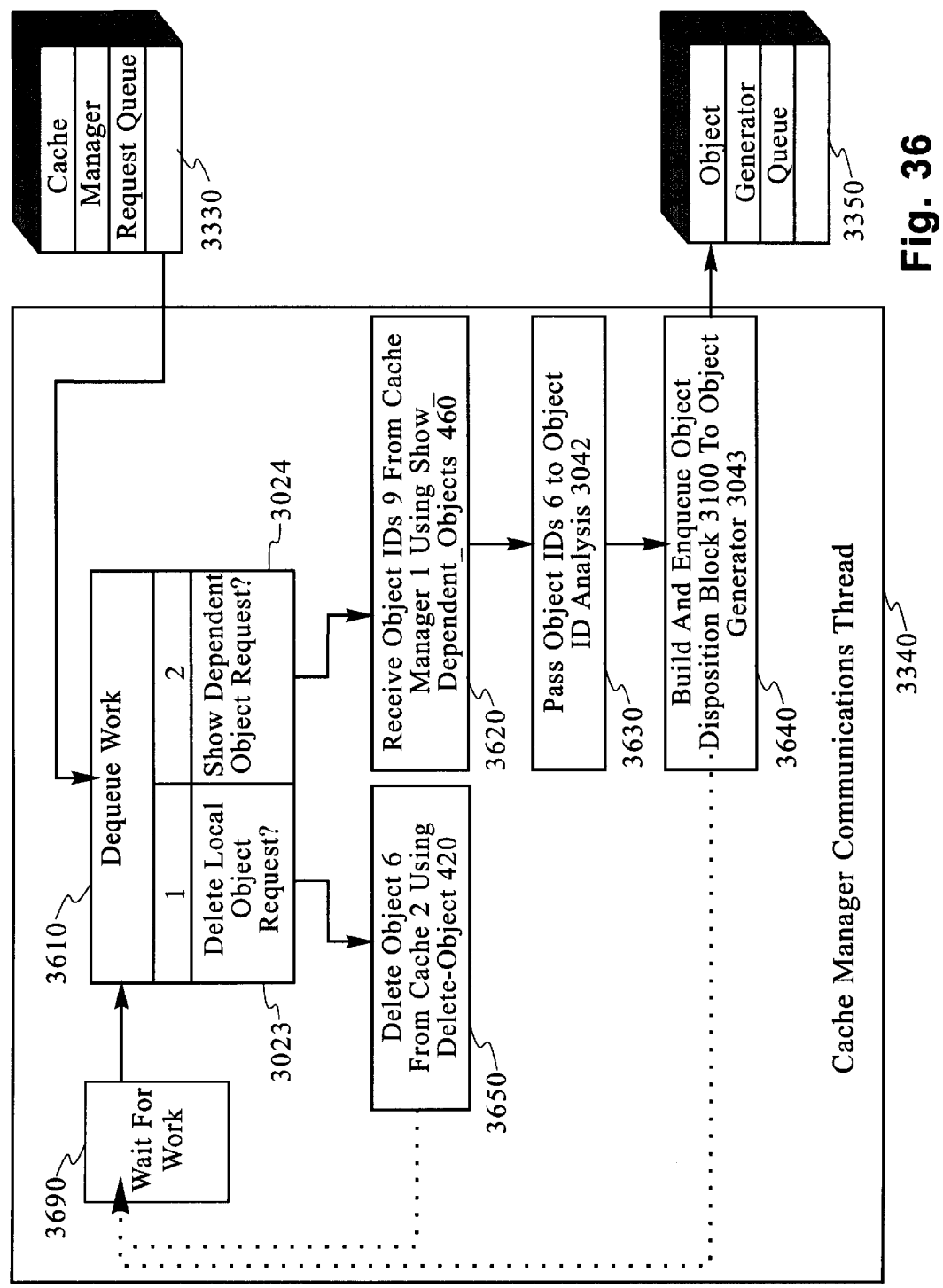
FIG. 36 depicts an example of the Cache Manager Communications Thread logic of FIG. 33.

FIG. 36 depicts an example of the Cache Manager Communications Thread 3340 logic. As depicted, in step 3610, the cache manager communications thread 3340 dequeues a next request and establishes communications with the Local Cache Manager 3001. In step 3023, if the request is a Delete Local Object Request, in step 3650, the delete_object 420 API is used to delete the object from the local cache 3003. In step 3024, if the request is a Show Dependent Object Request, in step 3620 the show_dependent_objects 460 API is used to fetch the Object IDs 3009. In step 3630, the Object IDs 3009 are passed to the Object ID Analysis 3042 component which builds an Object Disposition Block 3100. Instep 3640, the Object Disposition Block 3100 is enqueued to the Object Generator 3043. Finally, in step 3690, the Cache Manager Communications Thread 3340 returns to waiting for work 3690.

Figure 37:
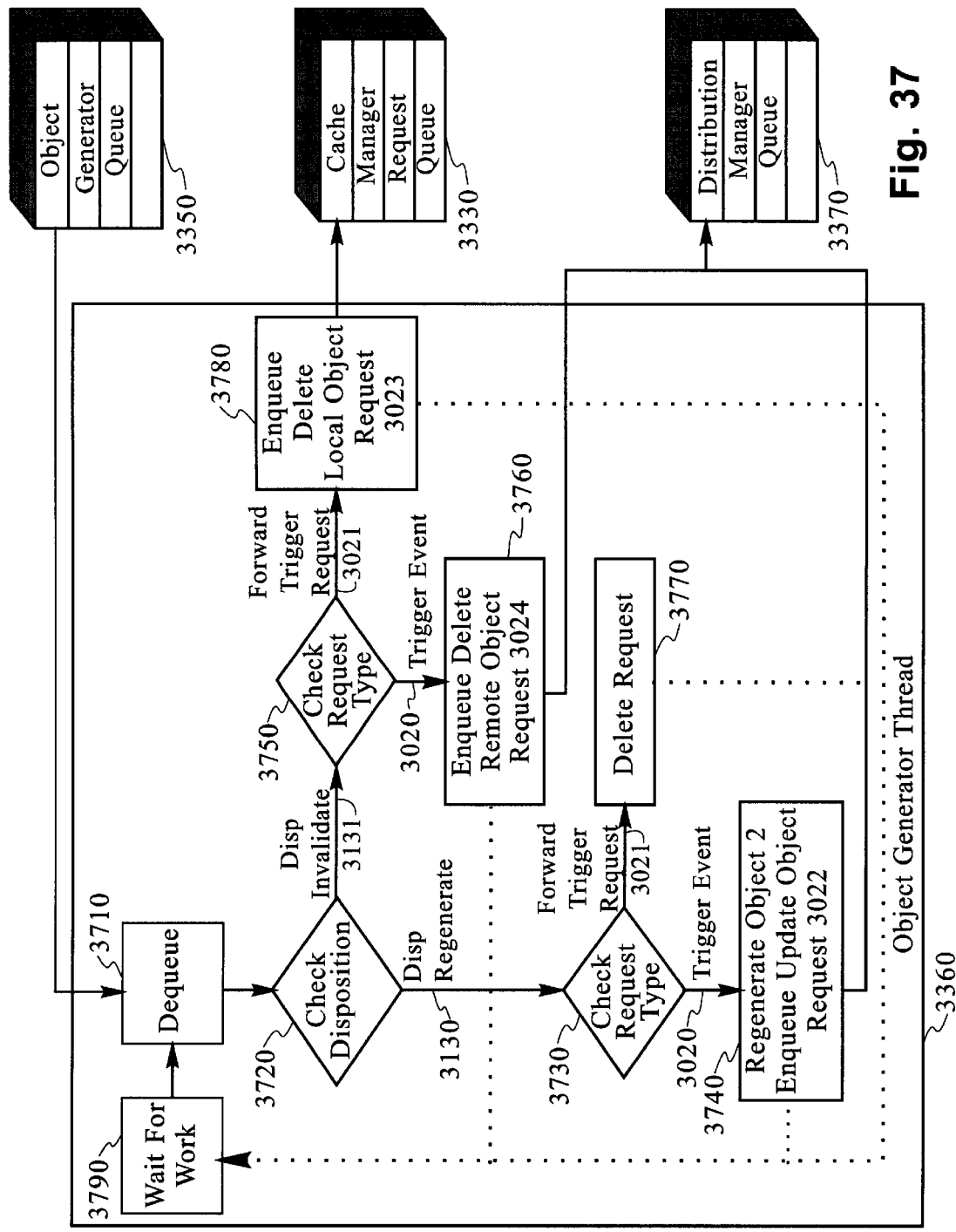
FIG. 37 depicts an example of the Object Generator Thread logic of FIG. 33.

FIG. 37 depicts an example of the Object Generator Thread 3360 logic. As depicted, in step 3710, the object generator thread 3360 dequeues a next request from the queue 3350. Instep 3720, the Disposition of the object is checked. If it is a DispInvalidate 3131 proceed to step 3750; if a DispRegenerate 3130 proceed to step 3730. In step 3730, the RequestType is checked. If it is a Forward Trigger Request 3021 proceed to step 3770; if it is a Trigger Event 3020 proceed to step 3740. In step 3740, the Data Sources 3050 are contacted to regenerate the objects 3004. The new objects 3004 are enqueued with an Update Object Request 3022 to the Distribution Manager Queue 3370. The process then returns to step 3790 to wait for work.

In step 3750, the RequestType is checked. If it is a Forward Trigger Request 3021 proceed to step 3780; if it is a Trigger Event 3020 proceed to step 3760. In step 3760, a Delete Remote Object Request 3024 is built and enqueued to the Distribution Manager Queue 3370. The process then returns to step 3790 to wait for work.

In step 3770, the request is deleted from the system. The process then returns to step 3790 to wait for work.

In step 3780, a Delete Local Object Request 3023 is enqueued to the Cache Manager Request Queue 3330. The process then returns to step 3790 to wait for work.

Figure 38:
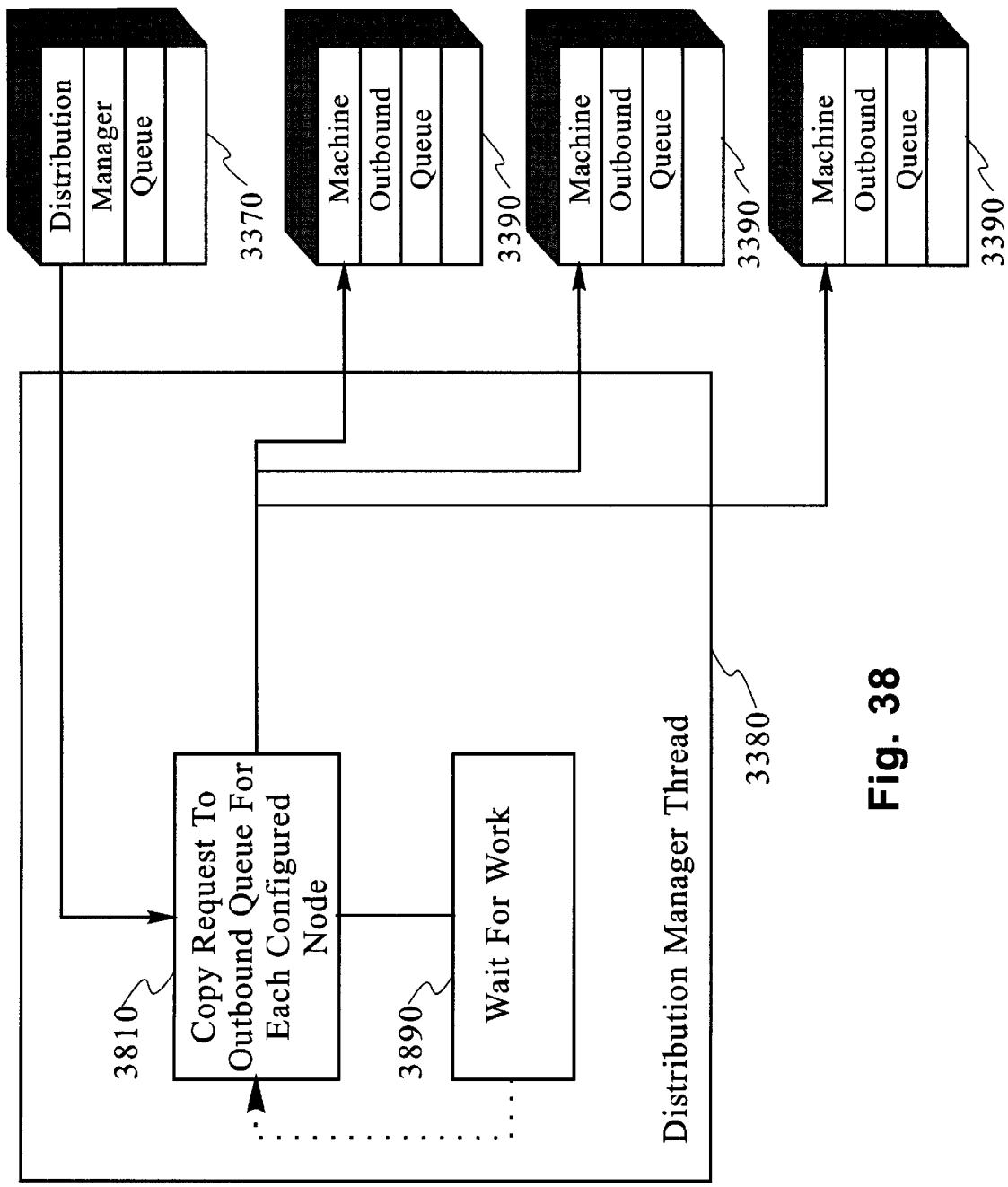
FIG. 38 depicts an example of the Distribution Manager Thread logic of FIG. 33.

FIG. 38 depicts an example of the Distribution Manager Thread 3380 logic. As depicted, in step 3810 the Distribution Manager Thread 3380 dequeues work from the Distribution Manager Queue 3370 and enqueues a copy of the request to each of the Machine Outbound Queues 3390. The process then returns to step 3790 to wait for work.

Figure 39:
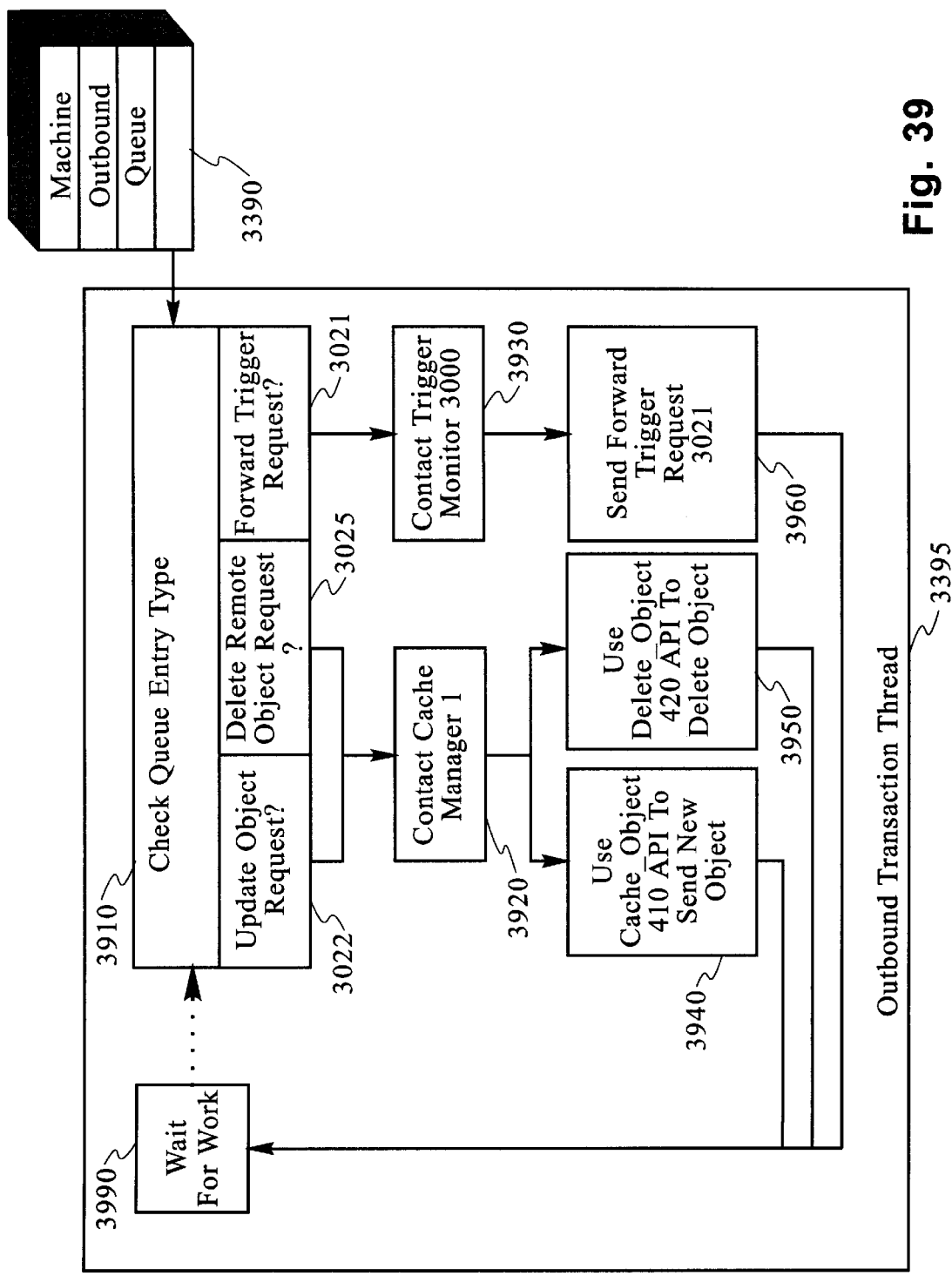
FIG. 39 depicts an example of the Outbound Transaction Thread logic of FIG. 33.

FIG. 39 depicts an example of the Outbound Transaction Thread 3395 logic. There is one Outbound Transaction Thread 3395 for each machine participating in the distributed update scheme. As depicted, in step 3910 the thread dequeues work from the Machine Outbound Queue 3390 and checks the request type. In step 3920, if it is an Update Object Request 3022 or Delete Remote Object Request 3025 the process continues at step 3920; if it is a Forward Trigger Request 3021, the process continues at step 3930. In step 3930, if it is a Forward Trigger Request 3021 the process continues at step 3930.

In step 3920 the remote Cache manager 3001 is contacted. In step 3940, if the request is an Update Object Request 3022, the cache_object API 410 is used to send the new objects 3004 to the remote cache manager 3002. The process then returns to step 3990 to wait for work. In step 3950, if the request is a Delete Remote Object Request 3025, the delete_object API 420 is used to delete the objects 3004 from the remote cache manager 3002. The process then returns to step 3990 to wait for work.

In step 3930, the remote Trigger Monitor 3000*a* is contacted. In step 3960, the Forward Trigger Request 3021 is sent to the remote Trigger Monitor 3000. The process then returns to step 3990 to wait for work. The process then returns to step 3790 to wait for work.

Extensions and Variations

Other exits not iterated here may be required for full analysis of Trigger Events 3020 and translation into actions (such as Update Object Request 3022 or Delete Remote Object Request 3025), depending on the specific application of this invention.

Figure 40:
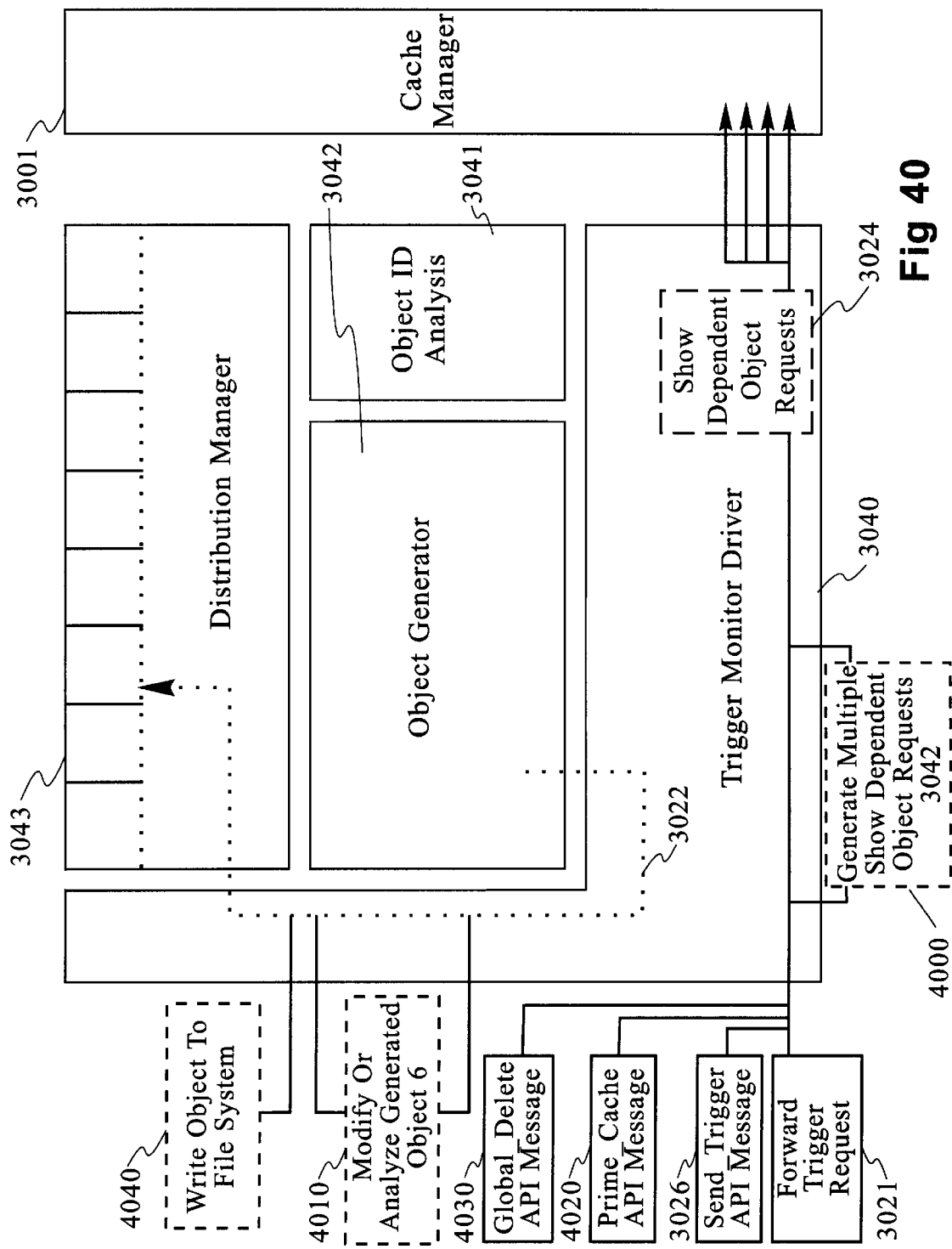
FIG. 40 depicts examples of extensions and variations for analysis and translations of Trigger Events.

For example, referring now to FIG. 40:
a) it may be useful to translate 4000 a single Trigger Event 3020 into a set of multiple Show Dependent Object Requests 3024 via an exit;
b) it may be useful to modify or analyze 4010 an objects 3004 as created by the Object Generator 3042, prior to enqueing that objects 3004 in an Update Object request 3022; and
c) it may be useful to write an objects 3004 to the file system instead of, or in addition to, writing the objects 3004 to cache 3003.

Another use of the Trigger Monitor 3000 would be to reuse its ability to generate and distribute objects for the purpose of handling objects which may not currently exist in cache:
a) a prime_cache API 4020 could be used to generate and distribute an objects 3004 given an object ID 3009, regardless of whether that objects 3004 is currently known to any cache 3003; and
b) a global_delete API 4030 could be used to insure that some specific objects 3004 is removed from all caches 1 in the system without knowing whether that object actually exists anywhere.

The Trigger Monitor 3000 may be implemented to enforce strict FIFO ordering and processing of requests, or to permit full asynchronous processing of requests, or to process requests according to any well known scheduling scheme, or any combination of the above.

Maintaining Consistency

As discussed herein before, while dictionary meanings are also implied by terms used herein, the following glossary of some terms is provided for guidance:

A transaction manager is a program which manages state. Examples include: cache managers managing caches; database management systems such as DB2; and transaction processing systems such as CICS.

A transaction is a request made by another program to a transaction manager.

A state-changing transaction is a transaction which modifies state managed by the transaction monitor. Requests to a cache manager to read, update, or delete cache objects would constitute transactions.

Reads and modifications of data are known as accesses.

A lock is an entity which limits the ability of processes to read or write shared data. When a process acquires a read lock on a piece of data, other processes can access the data but no other processes may modify the data. When a process acquires a write or exclusive lock on the data, no other processes may read or modify the data. Several methods for implementing locks exist in the prior art. See e.g., "Computer Architecture: A Quantitative Approach," 2nd edition, by Hennessy and Patterson, Morgan Kaufmann, 1996.

Let S be a set of transactions which modify data d on a system containing one or more transaction managers. S is performed consistently if:
(1) for any request r1 not in S which accesses all or part of d, all parts of d accessed by r1 are either in a state before modification by any transaction in S or in a state after modification by all transactions in S.
(2) For any requests r1 and r2 not in S where r2 is received by the system either at the same as r1 or after r1 and both r1 and r2 access a subset d' of d,
    (a) if the version of d' accessed by r1 has been modified by transactions in S, then the version of d' accessed by r2 has also been modified by transactions in S.
    (b) if the version of d' accessed by r2 has not been modified by transactions in S, then the version of d' accessed by r1 has also not been modified by transactions in S.

A timestamp is an attribute which can be assigned to events such as a transaction being received by a system or a lock being acquired. Common methods for implementing time stamps in the prior art include clock times and numbers which order events.

Another feature of the present invention is the ability to make a set of consistent updates to one or more caches. The present invention is of use for a set of requests S to one or more cache managers 3001 where the following properties are desirable:

(1) For any program p accessing the system, S must be made atomically. That is, p cannot have a view of the system where some requests in S have been satisfied and others have not.

(2) For any two requests r1 and r2 received by appropriate cache managers 3001 at the same time, r1 and r2 see the same view of the system with respect to S. That is, either both r1 and r2 see a view of the system before requests in S have been satisfied, or both r1 and r2 see a view of the system after requests in S have been satisfied.

(3) For any two requests r1 and r2 where r2 is received by a cache manager 3001 after r1 is received by a cache manager, if r1 has a view of the system after requests in S have been satisfied, then r2 must see the same view of the system. If r2 sees a view of the system before requests in S have been satisfied, then r1 must see the same view.

Figure 41:
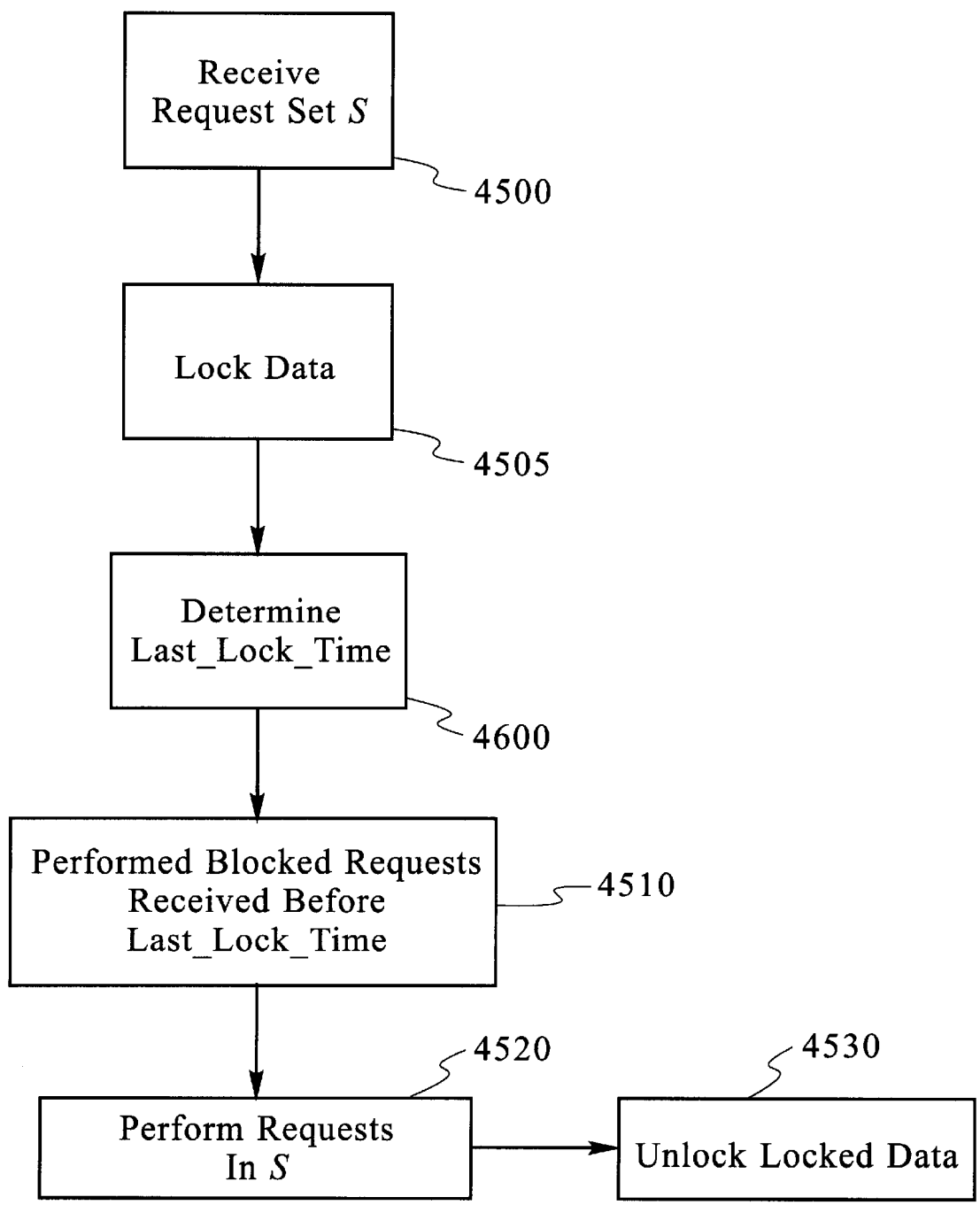
FIG. 41 depicts an example of logic for making a set of requests consistently to a system consisting of one or more caches.

FIG. 41 depicts an example of logic for making a set S of requests consistently to a system including one or more caches. Preferably, each request in S is directed to one cache manager 3001. The set of cache managers C receiving a request from S may have one or more members.

As depicted, in step 4500, the set of requests S is received by the system. Each request is directed to a specific cache manager 3001.

In step 4505, the cache managers lock data. For each cache manager j receiving a request from S, the cache manager j acquires write locks for data modified by a request in S and read locks for data read but by a request in S but not written by a request in S. Data locked in this step will subsequently be referred to as locked data.

In step 4600, the system determines the time the last lock was acquired, last_lock_time. If the set of cache managers C receiving a request from S has only one member, this step can easily be implemented using prior art. If C has multiple members, last_lock_time is determined in the manner described in FIG. 42.

In step 4510, requests received before last_lock_time which are waiting on locked data are performed. In step 4520, requests in S are performed. In step 4530, locks are removed from locked data which allows requests received after last_lock_time which are waiting on locked data to be performed. Steps 4510, 4520, and 4530 must be performed in order.

An alternative embodiment to that depicted in FIG. 41 is to use a single lock to prevent requests from accessing data accessed by a request in S. The preferred embodiment allows much higher levels of concurrency than this alternative approach.

Figure 42:
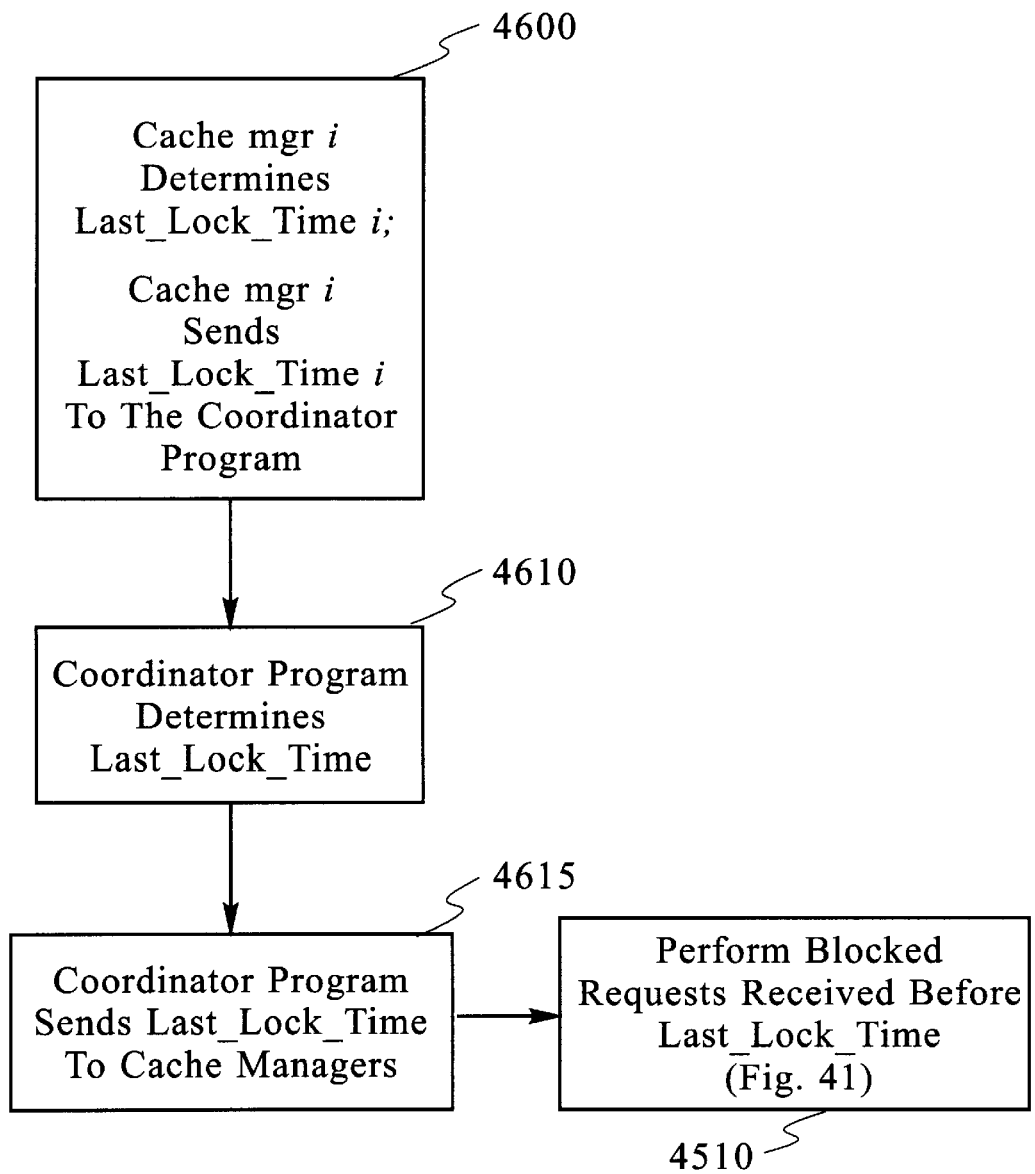
FIG. 42 depicts an example of logic for determining a last_lock_time if the set of cache managers receiving a request has multiple members.

FIG. 42 depicts an example of logic for determining a last_lock_time if the set of cache managers C receiving a request from S has multiple members. As depicted, in step 4600, each member of C denoted cache mgr i determines the time at which it acquired the last lock in step 4505, last_lock_time_i; cache mgr i then sends last_lock_time_i to a program known as a coordinator program. In step 4610, the coordinator program receives last_lock_time_i values from all cache managers in C and sets last_lock_time to the latest last_lock_time_i value it receives. In step 4615, the coordinator program sends last_lock_time to all cache managers in C.

A variation on the example depicted in FIG. 42 would be for each cache mgr i in C to exchange values of last_lock_time_i with other cache managers in C in step 4600 instead of sending last_lock_time_i to a coordinator program. In step 4610, each cache mgr i in C would determine last_lock_time from the last_lock_time_i values it receives. Step 4615 would not be necessary. The preferred embodiment requires less communication and fewer comparisons when C is large and is thus more scaleable than the variation just described.

One skilled in the art could easily adopt the present invention to achieve consistency in other systems containing one or more transaction managers wherein the transaction managers do not have to be cache managers.

Now that the invention has been described by way of a detailed description, with alternatives, various enhancements, variations, and equivalents will become apparent to those of skill in the art. Thus it is understood that the detailed description has been provided by way of example and not as a limitation. The proper scope of the invention is properly defined by the claims.

We claim:

1. In a system including a plurality of caches storing objects and one or more remote data sources storing underlying data which may affect a current value of one or more of said objects, a method for updating said plurality of caches, comprising the steps of:

recognizing when at least part of said underlying data stored in at least one of said remote data sources has changed, said underlying data including data which affects values of the one or more objects;

communicating to said plurality of caches, one or more of: information about said at least part of said underlying data which has changed; and information which includes the identity of at least one object whose value has changed as the result of said underlying data which has changed; and information which allows the identity to be determined of at least one object whose value has changed as the result of said underlying data which has changed, the step of communicating being initiated other than by the plurality of caches; and updating all of the plurality of caches of the system affected by a change, in response to said communicating step;

wherein the communicating and updating to the plurality of caches, objects and underlying data affected by the change is provided by maintaining an object dependence graph (G) which may change over time and which includes a plurality of graph objects and edges indicating one or more data dependencies between graph objects, said graph objects including records indicating underlying data and said edges including dependencies between the underlying data and the one or more objects, the object dependence graph for providing relationships between the objects to enable updates to all objects affected by the change.

2. The method of claim 1 wherein said step of updating a cache comprises storing a new version of an object in the cache or deleting an object from the cache.

3. The method of claim 1, further comprising the steps of:

maintaining correspondences between the underlying data and one or more objects; and identifying the at least one object whose value has changed due to changes in the underlying data.

4. The method of claim 1, wherein at least part of said underlying data and one or more objects are the same.

5. The method of claim 3 wherein said step of identifying the at least one object whose value has changed due to changes to the underlying data is in response to said communicating step.

6. The method of claim 3 wherein said communicating step is in response to said step of identifying the at least one object whose value has changed due to changes to the underlying data.

7. The method of claim 1, wherein said updating step comprises consistently performing a set of multiple transactions to a single cache.

8. The method of claim 7 wherein said step of consistently performing a set of multiple transactions further comprises preventing access to parts of the cache being modified using a single lock.

9. The method of claim 7 wherein said step of consistently performing a set of multiple transactions further comprises preventing access to parts of the cache being modified using multiple locks.

10. The method of claim 7 wherein said step of consistently performing a set of multiple transactions is based on a last lock time stamp.

11. The method of claim 1, wherein the communicating step further comprises the step of:

communicating to a cache, one or both of: a new value of an object whose value has changed as a result of said underlying data which has changed; and information which allows the new value to be determined; and said updating step comprises storing said new value of said object in the cache.

12. The method of claim 1, wherein said updating step further comprises consistently performing a set of one or more transactions across multiple caches.

13. The method of claim 12 wherein said step of consistently performing a set of one or more transactions further comprises preventing access to parts of the caches being modified using a single lock.

14. The method of claim 12 wherein said step of consistently performing a set of one or more transactions further comprises preventing access to parts of the caches being modified using multiple locks.

15. The method of claim 12 wherein said step of consistently performing a set of one or more transactions is based on a last lock time stamp.

16. A program storage device readable by machine, tangibly embodying a program of instructions executable by the machine to perform method steps according to any of claims 1, 2, 3, 5, 6–15.

17. The method of claim 1, further comprising the step of checking the object dependence graph to determine objects affected by changes in the underlying data.

18. A method for updating a plurality of caches on one or more remote data sources of a system, which stores data, and data for one or more objects, comprising the steps of:

recognizing when underlying data stored in at least one of the remote data sources of the system has changed, the underlying data including data which affects values in the one or more objects;

identifying all caches in the system affected by the changes in the underlying data;

providing updates to the identified caches by directly sending the underlying data to the caches wherein the updates are unsolicited by the plurality of caches; and maintaining an object dependence graph (G) which may change over time and which includes a plurality of graph objects and edges indicating one or more data dependencies between graph objects, said graph objects including records indicating underlying data and said edges including dependencies between the underlying data and the one or more objects to track updates to all objects in the plurality of caches affected by the changes.

19. The method as recited in claim 18, further comprising the step of storing a new version of an object in the caches.

20. The method as recited in claim 18, wherein the step of providing updates to the identified caches includes the step of deleting an object from the caches.

21. The method as recited in claim 18, wherein the step of recognizing includes the steps of:

monitoring changes in underlying data in the system by employing a trigger monitor.

22. The method as recited in claim 21, wherein the step of monitoring changes in underlying data in the system by employing a trigger monitor includes the step synchronizing underlying data stored in the caches with cache managers at the remote data sources to determine changes in the underlying data.

23. The method as recited in claim 21, wherein the step of monitoring changes in underlying data in the system by employing a trigger monitor includes employing a master trigger monitor at a first location and one or more slave trigger monitors remotely disposed relative to the first location, the slave trigger monitors for locally monitoring activity of the system.

24. A program storage device readable by machine, tangibly embodying a program of instructions executable by the machine to perform method steps according to any of claims 18, 19, 20, 21, 22 or 23.

25. The method of claim 18, further comprising the step of checking the object dependence graph to determine objects affected by changes in the underlying data.

* * * * *